(12) United States Patent
Hiroki

(10) Patent No.: US 12,360,568 B2
(45) Date of Patent: *Jul. 15, 2025

(54) ELECTRONIC DEVICE

(71) Applicant: SEMICONDUCTOR ENERGY LABORATORY CO., LTD., Atsugi (JP)

(72) Inventor: Masaaki Hiroki, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,388

(22) Filed: May 3, 2024

(65) Prior Publication Data

US 2024/0281035 A1 Aug. 22, 2024

Related U.S. Application Data

(63) Continuation of application No. 18/133,631, filed on Apr. 12, 2023, now Pat. No. 11,977,415, which is a continuation of application No. 17/748,284, filed on May 19, 2022, now Pat. No. 11,644,870, which is a continuation of application No. 16/851,593, filed on
(Continued)

(51) Int. Cl.
*G06F 1/16* (2006.01)
*G02B 27/01* (2006.01)

(52) U.S. Cl.
CPC ............ *G06F 1/1652* (2013.01); *G06F 1/163* (2013.01); *G06F 1/1637* (2013.01); *G02B 27/017* (2013.01)

(58) Field of Classification Search
CPC ...... G06F 1/1652; G06F 1/163; G06F 1/1637; G06F 27/017
See application file for complete search history.

(56) References Cited

U.S. PATENT DOCUMENTS 5,194,857 A 3/1993 Gomez
5,416,730 A 5/1995 Lookofsky
(Continued)

FOREIGN PATENT DOCUMENTS

CA 2656760 9/2009
CN 001147870 A 4/1997
(Continued)

OTHER PUBLICATIONS

Specification U.S. Appl. No. 29/486,857.
Chinese Office Action(Application No. 202010073733.3) Dated May 27, 2021.

*Primary Examiner* — Michael P McFadden
(74) *Attorney, Agent, or Firm* — NIXON PEABODY LLP; Jeffrey L. Costellia

(57) ABSTRACT

A sturdy electronic device is provided. A reliable electronic device is provided. A novel electronic device is provided. An electronic device includes a first board, a second board, a display portion having flexibility, and a power storage device having flexibility. The first board and the second board face each other. The display portion and the power storage device are provided between the first board and the second board. The display portion includes a first surface facing the power storage device. The first surface includes a first region not fixed to the power storage device. The first region overlaps with a display region of the display portion.

12 Claims, 28 Drawing Sheets

Related U.S. Application Data

Apr. 17, 2020, now Pat. No. 11,347,270, which is a continuation of application No. 16/238,587, filed on Jan. 3, 2019, now Pat. No. 10,627,866, which is a continuation of application No. 14/936,770, filed on Nov. 10, 2015, now Pat. No. 10,185,363.

(56) References Cited

U.S. PATENT DOCUMENTS

| | | | |
|---|---|---|---|
| 5,555,490 A | 9/1996 | Carroll | |
| 5,572,401 A | 11/1996 | Carroll | |
| 5,838,412 A * | 11/1998 | Ueda | H05K 1/028 |
| | | | 349/150 |
| 5,844,824 A | 12/1998 | Newman et al. | |
| 6,097,607 A | 8/2000 | Carroll et al. | |
| 6,262,889 B1 | 7/2001 | Newman et al. | |
| 6,304,459 B1 | 10/2001 | Toyosato et al. | |
| 6,599,659 B1 | 7/2003 | Endo et al. | |
| 6,664,005 B2 | 12/2003 | Kezuka et al. | |
| 6,943,773 B2 | 9/2005 | Wong et al. | |
| 7,368,803 B2 | 5/2008 | Gally et al. | |
| 7,394,452 B2 | 7/2008 | Wong et al. | |
| 7,405,924 B2 | 7/2008 | Gally et al. | |
| 7,612,761 B2 | 11/2009 | Wong et al. | |
| 7,671,839 B2 | 3/2010 | Wong et al. | |
| 7,722,245 B2 | 5/2010 | Baba et al. | |
| 7,722,248 B1 | 5/2010 | Chapman et al. | |
| 7,764,046 B2 | 7/2010 | Osada | |
| 7,944,172 B2 | 5/2011 | Osada | |
| 8,040,456 B2 | 10/2011 | Yamazaki et al. | |
| 8,192,863 B2 | 6/2012 | Best et al. | |
| 8,211,574 B2 | 7/2012 | Suzuki et al. | |
| 8,218,105 B2 | 7/2012 | Yamazaki et al. | |
| 8,319,725 B2 | 11/2012 | Okamoto et al. | |
| 8,367,440 B2 | 2/2013 | Takayama et al. | |
| 8,415,208 B2 | 4/2013 | Takayama et al. | |
| 8,427,420 B2 | 4/2013 | Yamazaki et al. | |
| 8,482,909 B2 | 7/2013 | Douglas | |
| 8,634,041 B2 | 1/2014 | Yamazaki et al. | |
| 8,785,030 B2 | 7/2014 | Ueda | |
| 8,847,556 B2 | 9/2014 | Osada | |
| 8,852,796 B2 | 10/2014 | Kim | |
| 8,929,085 B2 | 1/2015 | Franklin et al. | |
| 9,088,006 B2 | 7/2015 | Yamazaki et al. | |
| 9,113,553 B2 | 8/2015 | An et al. | |
| 9,257,560 B2 | 2/2016 | Adachi et al. | |
| 9,274,562 B2 | 3/2016 | Franklin et al. | |
| 9,400,521 B2 | 7/2016 | Heck et al. | |
| 9,551,893 B2 | 1/2017 | An et al. | |
| 9,557,874 B2 | 1/2017 | Franklin et al. | |
| 9,627,648 B2 | 4/2017 | Yamazaki et al. | |
| D789,928 S | 6/2017 | Hiroki | |
| 9,807,876 B2 | 10/2017 | Catchpole | |
| 9,971,448 B2 | 5/2018 | Franklin et al. | |
| 10,003,047 B2 | 6/2018 | Yamazaki et al. | |
| 10,031,360 B2 | 7/2018 | An et al. | |
| 10,134,904 B2 | 11/2018 | Adachi et al. | |
| 10,185,363 B2 * | 1/2019 | Hiroki | G06F 1/1637 |
| 10,318,061 B2 | 6/2019 | Franklin et al. | |
| 10,381,599 B2 | 8/2019 | Yamazaki et al. | |
| 10,739,908 B2 | 8/2020 | Franklin et al. | |
| 10,903,453 B2 | 1/2021 | Yamazaki et al. | |
| 2002/0118284 A1 | 8/2002 | Newman et al. | |
| 2002/0171559 A1 | 11/2002 | Yang | |
| 2005/0088365 A1 | 4/2005 | Yamazaki et al. | |
| 2005/0174302 A1 | 8/2005 | Ishii | |
| 2005/0189906 A1 | 9/2005 | Sun | |
| 2006/0146514 A1 | 7/2006 | Douglas | |
| 2006/0202618 A1 | 9/2006 | Ishii et al. | |
| 2006/0209218 A1 | 9/2006 | Lee et al. | |
| 2008/0084657 A1 | 4/2008 | Baba et al. | |
| 2008/0275327 A1 | 11/2008 | Faarbaek et al. | |
| 2009/0071952 A1 | 3/2009 | Kuwabara | |
| 2009/0086425 A1 | 4/2009 | Lai et al. | |
| 2009/0231798 A1 * | 9/2009 | Skinner | G06F 1/185 |
| | | | 361/736 |
| 2010/0029327 A1 | 2/2010 | Jee | |
| 2010/0066668 A1 | 3/2010 | Wong et al. | |
| 2010/0239907 A1 | 9/2010 | Izumi | |
| 2010/0248008 A1 * | 9/2010 | Sugawara | H01M 50/569 |
| | | | 429/159 |
| 2011/0086680 A1 | 4/2011 | Kim et al. | |
| 2011/0234162 A1 * | 9/2011 | Kinoshita | H01M 10/482 |
| | | | 320/116 |
| 2012/0038613 A1 | 2/2012 | Choi | |
| 2012/0069511 A1 | 3/2012 | Azera | |
| 2012/0202101 A1 | 8/2012 | Ueda | |
| 2012/0244408 A1 | 9/2012 | Huang et al. | |
| 2013/0044215 A1 | 2/2013 | Rothkopf et al. | |
| 2013/0083496 A1 * | 4/2013 | Franklin | G09G 3/2092 |
| | | | 361/752 |
| 2013/0134051 A1 | 5/2013 | Takahashi et al. | |
| 2013/0177798 A1 | 7/2013 | Ueda | |
| 2013/0181955 A1 | 7/2013 | Okamoto et al. | |
| 2013/0214324 A1 | 8/2013 | Takayama et al. | |
| 2013/0224562 A1 | 8/2013 | Momo | |
| 2013/0252065 A1 | 9/2013 | Ueda | |
| 2013/0252088 A1 | 9/2013 | Kuriki et al. | |
| 2013/0252089 A1 | 9/2013 | Kuriki | |
| 2013/0273405 A1 | 10/2013 | Takahashi et al. | |
| 2013/0300284 A1 * | 11/2013 | Nishido | H10K 59/127 |
| | | | 313/511 |
| 2013/0314346 A1 | 11/2013 | Yamazaki et al. | |
| 2014/0153177 A1 | 6/2014 | Lin et al. | |
| 2014/0221855 A1 | 8/2014 | Mccaffrey | |
| 2014/0288381 A1 | 9/2014 | Faarbaek et al. | |
| 2014/0346491 A1 * | 11/2014 | Yamazaki | H10K 59/874 |
| | | | 257/40 |
| 2015/0022957 A1 | 1/2015 | Hiroki et al. | |
| 2015/0111088 A1 | 4/2015 | Hiroki et al. | |
| 2015/0138699 A1 * | 5/2015 | Yamazaki | H01M 50/124 |
| | | | 361/679.03 |
| 2015/0138736 A1 | 5/2015 | Catchpole | |
| 2015/0177789 A1 * | 6/2015 | Jinbo | H10K 59/40 |
| | | | 313/511 |
| 2015/0181087 A1 * | 6/2015 | Mistry | G06F 3/017 |
| | | | 348/158 |
| 2015/0185766 A1 * | 7/2015 | Otsuka | A61B 5/02422 |
| | | | 361/679.03 |
| 2015/0286277 A1 * | 10/2015 | Kim | G06F 1/163 |
| | | | 345/156 |
| 2015/0327413 A1 * | 11/2015 | Chuang | H05K 7/06 |
| | | | 29/829 |
| 2016/0037625 A1 * | 2/2016 | Huitema | G09F 21/02 |
| | | | 361/749 |
| 2016/0062392 A1 * | 3/2016 | Townsend | G04G 17/083 |
| | | | 361/679.03 |
| 2016/0073519 A1 | 3/2016 | Hiroki | |
| 2016/0094079 A1 | 3/2016 | Hiroki et al. | |
| 2016/0239135 A1 | 8/2016 | Kawaguchi et al. | |
| 2017/0329368 A1 * | 11/2017 | Rho | H04M 1/0268 |
| 2018/0260072 A1 | 9/2018 | Franklin et al. | |
| 2019/0374163 A1 | 12/2019 | Faarbaek et al. | |
| 2020/0363900 A1 | 11/2020 | Franklin et al. | |
| 2020/0395576 A1 | 12/2020 | Yamazaki et al. | |
| 2021/0022683 A1 | 1/2021 | Faarbaek et al. | |

FOREIGN PATENT DOCUMENTS

| | | |
|---|---|---|
| CN | 001318779 A | 10/2001 |
| CN | 002485917 Y | 4/2002 |
| CN | 001769957 A | 5/2006 |
| CN | 001828778 A | 9/2006 |
| CN | 001853292 A | 10/2006 |
| CN | 102436784 A | 5/2012 |
| CN | 102445774 A | 5/2012 |
| CN | 203119972 U | 8/2013 |
| CN | 103424913 A | 12/2013 |
| CN | 103827771 A | 5/2014 |
| EP | 0767417 A | 4/1997 |
| EP | 0962853 A | 12/1999 |
| EP | 1148410 A | 10/2001 |

(56) References Cited

FOREIGN PATENT DOCUMENTS

| | | | |
|---|---|---|---|
| EP | 1259003 A | 11/2002 |
| EP | 1308826 A | 5/2003 |
| EP | 1315113 A | 5/2003 |
| EP | 1640328 A | 3/2006 |
| EP | 1640329 A | 3/2006 |
| EP | 1667255 A | 6/2006 |
| EP | 1909253 A | 4/2008 |
| EP | 2043335 A | 4/2009 |
| EP | 2105825 A | 9/2009 |
| EP | 2294937 A | 3/2011 |
| EP | 2412306 A | 2/2012 |
| EP | 2418558 A | 2/2012 |
| EP | 2664957 A | 11/2013 |
| EP | 3299927 A | 3/2018 |
| EP | 3940503 A | 1/2022 |
| JP | 58-197655 A | 11/1983 |
| JP | 59-189554 A | 10/1984 |
| JP | 07-006771 A | 1/1995 |
| JP | 10-326602 A | 12/1998 |
| JP | 2000-173559 A | 6/2000 |
| JP | 2000-285904 A | 10/2000 |
| JP | 2001-052762 A | 2/2001 |
| JP | 2001-078820 A | 3/2001 |
| JP | 2001-093581 A | 4/2001 |
| JP | 2001-102090 A | 4/2001 |
| JP | 2001-197130 A | 7/2001 |
| JP | 2001-211914 A | 8/2001 |
| JP | 2003-174153 A | 6/2003 |
| JP | 2003-330384 A | 11/2003 |
| JP | 2005-129393 A | 5/2005 |
| JP | 2005-332591 A | 12/2005 |
| JP | 2006-516911 | 7/2006 |
| JP | 2006-331874 A | 12/2006 |
| JP | 2007-066619 A | 3/2007 |
| JP | 2007-078670 A | 3/2007 |
| JP | 2007-234466 A | 9/2007 |
| JP | 2008-096543 A | 4/2008 |
| JP | 2008-532596 | 8/2008 |
| JP | 2009-016275 A | 1/2009 |
| JP | 2010-135231 A | 6/2010 |
| JP | 2010-282181 A | 12/2010 |
| JP | 2010-282183 A | 12/2010 |
| JP | 2011-060576 A | 3/2011 |
| JP | 2011-197130 A | 10/2011 |
| JP | 2013-040805 A | 2/2013 |
| JP | 2013-048041 A | 3/2013 |
| JP | 2013-048042 A | 3/2013 |
| JP | 2014-120175 A | 6/2014 |
| KR | 2000-0053010 A | 8/2000 |
| KR | 2013-0125715 A | 11/2013 |
| KR | 2014-0069302 A | 6/2014 |
| KR | 2014-0122669 A | 10/2014 |
| KR | 10-2354101 | 1/2022 |
| TW | 201443617 | 11/2014 |
| WO | WO-1995/016948 | 6/1995 |
| WO | WO-1998/020403 | 5/1998 |
| WO | WO-2000/025193 | 5/2000 |
| WO | WO-2002/093475 | 11/2002 |
| WO | WO-2004/068990 | 8/2004 |
| WO | WO-2006/094513 | 9/2006 |
| WO | WO-2013/048925 | 4/2013 |
| WO | WO-2013/172538 | 11/2013 |
| WO | WO-2013/175212 | 11/2013 |

\* cited by examiner

ELECTRONIC DEVICE

BACKGROUND OF THE INVENTION

1. Field of the Invention

The present invention relates to an electronic device, a display device, a light-emitting device, a power storage device, a driving method thereof, or a manufacturing method thereof.

Note that electronic devices in this specification mean all devices which operate by being supplied with electric power, and electronic devices including power sources, electronic devices and electro-optical devices including power sources such as storage batteries, information terminal devices including storage batteries, and the like are all electronic devices. Electronic devices also mean all devices which process information. Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a liquid crystal display device, a light-emitting device, a lighting device, a power storage device, a memory device, an imaging device, a method for driving any of them, or a method for manufacturing any of them.

2. Description of the Related Art

Display devices used while being worn on human bodies, such as display devices mounted on heads, have recently been developed and are referred to as head-mounted displays or wearable displays. It is desired that electronic devices used while being worn on human bodies, such as hearing aids, have a light weight and a small size.

Along with a decrease in weight of electronic devices, it is demanded that storage batteries included in electronic devices also have a light weight and a small size.

Electronic book terminals including flexible display devices are disclosed in Patent Documents 1 and 2.

REFERENCES

[Patent Document 1] Japanese Published Patent Application No. 2010-282181
[Patent Document 2] Japanese Published Patent Application No. 2010-282183

SUMMARY OF THE INVENTION

In order that a user can comfortably wear a display device used while being worn on a human body, the display device needs to have a light weight and a small size, and in addition, the whole electronic device including a driver device for the display device and a power source needs to have a light weight.

Furthermore, a display device used while being worn on a human body and an electronic device including the display device need to be easily carried around and to be sturdy.

When the display device and an electronic device including the display device are worn on a human body and removed therefrom repeatedly, external stress such as bending is repeatedly applied to them. Consequently, a display portion, an external portion, a power storage device included in the display device or the electronic device, or the like is broken in some cases.

An object of one embodiment of the present invention is to provide a sturdy electronic device. Another object of one embodiment of the present invention is to provide a reliable electronic device. Another object of one embodiment of the present invention is to provide a novel electronic device.

Another object of one embodiment of the present invention is to provide a sturdy display device. Another object of one embodiment of the present invention is to provide a reliable display device. Another object of one embodiment of the present invention is to provide a novel display device.

Another object of one embodiment of the present invention is to provide an electronic device used while being worn on a human body. Another object of one embodiment of the present invention is to provide an electronic device used while being worn on an arm.

Another object of one embodiment of the present invention is to provide a display device used while being worn on a human body. Another object of one embodiment of the present invention is to provide a display device used while being worn on an arm.

Another object of one embodiment of the present invention is to provide a power storage device used while being worn on part of a human body. Another object of one embodiment of the present invention is to provide a power storage device used while being worn on an arm.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the present invention is an electronic device which includes a first board, a second board, a display portion having flexibility, and a power storage device having flexibility. The first board and the second board face each other. The display portion and the power storage device are provided between the first board and the second board. The display portion includes a first surface facing the power storage device. The first surface includes a first region not fixed to the power storage device. The first region overlaps with a display region of the display portion.

Another embodiment of the present invention is an electronic device which includes a first board, a second board, a display portion having flexibility, and a power storage device having flexibility. The first board and the second board face each other. The display portion and the power storage device are provided between the first board and the second board. There is a space between the display portion and the power storage device.

Another embodiment of the present invention is an electronic device which includes a first board, a second board, a display portion having flexibility, a power storage device having flexibility, and an adhesive layer. The display portion includes a circuit board having flexibility. The first board and the second board face each other. The display portion and the power storage device are provided between the first board and the second board. The display portion is fixed to the first board with the adhesive layer provided therebetween. The power storage device is at least partly in contact with the second board. A region of the power storage device is apart from the first board.

Another embodiment of the present invention is an electronic device which includes a first board, a second board, a display portion having flexibility, and a power storage device having flexibility. The first board and the second board face each other. The display portion and the power storage device are provided between the first board and the second board. A shock-absorbing buffer member is provided between the display portion and the power storage device.

The electronic device of any of the above embodiments is preferably worn such that the second board is in contact with an arm of a user.

In any of the above embodiments, it is preferable that the display portion include a first end portion and a second end portion; the power storage device include a third end portion and a fourth end portion; the first end portion and the third end portion be fixed to each other; and the distance between the second end portion and the fourth end portion change as the shape of the electronic device changes.

Another embodiment of the present invention is an electronic device which includes a first housing having flexibility, a second housing having flexibility, a display portion having flexibility, and a power storage device having flexibility. The first housing includes a first surface having a light-transmitting property. The display portion is provided inside the first housing. A region of the display portion is in contact with the first surface. The power storage device is provided inside the second housing. In the above embodiment, the electronic device is preferably worn such that the second housing is in contact with an arm of a user.

According to one embodiment of the present invention, a sturdy electronic device can be provided. According to one embodiment of the present invention, a reliable electronic device can be provided. According to one embodiment of the present invention, a novel electronic device can be provided.

According to one embodiment of the present invention, a sturdy display device can be provided. According to one embodiment of the present invention, a reliable display device can be provided. According to one embodiment of the present invention, a novel display device can be provided.

According to one embodiment of the present invention, an electronic device used while being worn on part of a human body can be provided. According to one embodiment of the present invention, an electronic device used while being worn on an arm can be provided.

According to one embodiment of the present invention, a power storage device used while being worn on part of a human body can be provided. According to one embodiment of the present invention, a power storage device used while being worn on an arm can be provided.

According to one embodiment of the present invention, a display device used while being worn on a human body can be provided. According to one embodiment of the present invention, a display device used while being worn on an arm can be provided.

Note that the descriptions of these effects do not disturb the existence of other effects. One embodiment of the present invention does not necessarily achieve all the effects. Other effects will be apparent from and can be derived from the description of the specification, the drawings, the claims, and the like.

DETAILED DESCRIPTION OF THE INVENTION

Embodiments of the present invention will be described in detail below with reference to the drawings. However, the present invention is not limited to the description below, and it is easily understood by those skilled in the art that modes and details disclosed herein can be modified in various ways. Furthermore, the present invention is not construed as being limited to the description of the embodiments.

Note that a display device in this specification includes any of the following modules in its category: a module in which a connector such as a flexible printed circuit (FPC) or a tape carrier package (TCP) is attached to a display panel (a display device); a module having a TCP provided with a printed wiring board at the end thereof; and a module having an integrated circuit (IC) directly mounted on a substrate over which a display element is formed, by a chip on glass (COG) method.

In this specification, the term "parallel" indicates that the angle formed between two straight lines is greater than or equal to −10° and less than or equal to 10°, and accordingly also includes the case where the angle is greater than or equal to −5° and less than or equal to 5°. In addition, the term "substantially parallel" indicates that the angle formed between two straight lines is greater than or equal to −30° and less than or equal to 30°. The term "perpendicular" indicates that the angle formed between two straight lines is greater than or equal to 80° and less than or equal to 100°, and accordingly also includes the case where the angle is greater than or equal to 85° and less than or equal to 95°. In addition, the term "substantially perpendicular" indicates that the angle formed between two straight lines is greater than or equal to 60° and less than or equal to 120°.

In this specification, trigonal and rhombohedral crystal systems are included in a hexagonal crystal system.

An electronic device of one embodiment of the present invention preferably includes a semiconductor device, a display device, a liquid crystal display device, a light-emitting device, a lighting device, a power storage device, a memory device, an imaging device, or the like.

Embodiment 1

In this embodiment, an example of an electronic device 100 that can be worn on part of a human body will be described.

<Example of Electronic Device 100>

Figure 1:
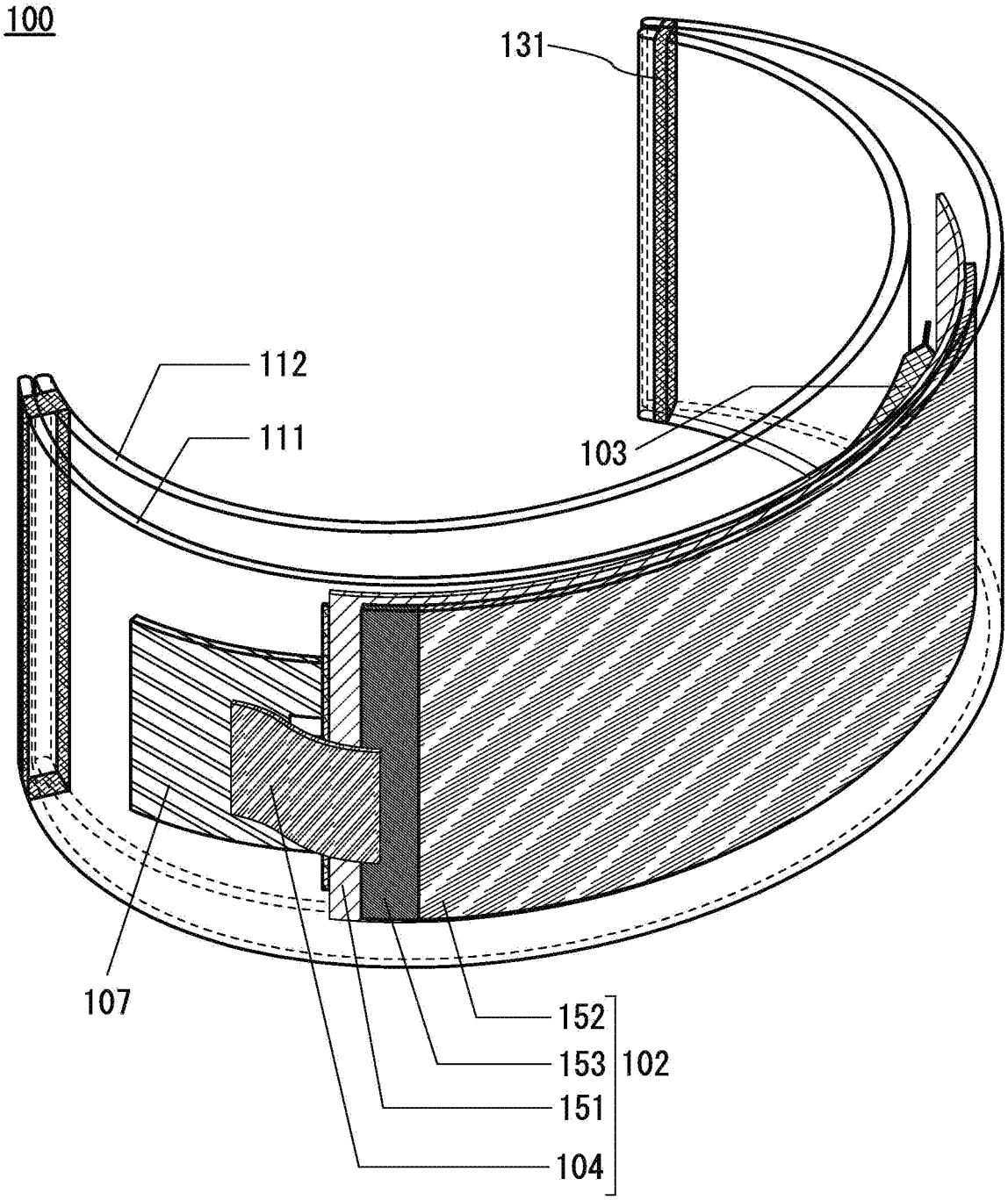
FIG. 1 is a perspective view of an electronic device of one embodiment of the present invention.

FIG. 1 is an example of a perspective view of the electronic device 100.

The electronic device 100 illustrated in FIG. 1 includes a display portion 102, a board 112, and a power storage device 103 which is at least partly in contact with the board 112. The power storage device 103 is preferably positioned along a region of the board 112 where the radius of curvature is large. In the electronic device 100 illustrated in FIG. 1, the power storage device 103 and the display portion 102 are positioned so as to at least partly overlap with each other. With such a structure, the inside of the electronic device can have high layout flexibility.

The display portion 102 preferably includes a circuit board 104. The electronic device 100 may further include a circuit board 107. The circuit board 107 is preferably electrically connected to the power storage device 103 and the circuit board 104. The circuit board 107 may include, for example, a driver circuit for driving the display portion 102. The circuit board 107 is preferably provided with a converter circuit for feeding power from the power storage device. In some cases, the display portion 102 and the circuit board 107 are collectively referred to as a display module.

The electronic device 100 preferably includes a board 111. In the case where the electronic device 100 includes the board 111, the board 111 and the board 112 are preferably fixed to each other with fasteners 131. The fasteners 131 may have a band-like shape as illustrated in FIG. 1 or may have a screw-like shape. For example, the board 111 and the board 112 may be provided with screw holes and fixed to each other with the fasteners 131 having a screw-like shape.

The board 111 and the board 112 may be fixed to each other by swaging. For example, the electronic device 100 may be fixed by inserting the fasteners 131 into the holes provided in the board 111 and the board 112 and deforming (swaging) the fasteners 131. As the fasteners 131, for example, rivets or the like can be used.

For the fasteners 131, a material such as a metal, a ceramic, or a resin can be used. As the metal, a material that is hard to rust when passivated is preferably used, and for example, stainless steel, magnesium, aluminum, or titanium can be used.

Figure 2A:
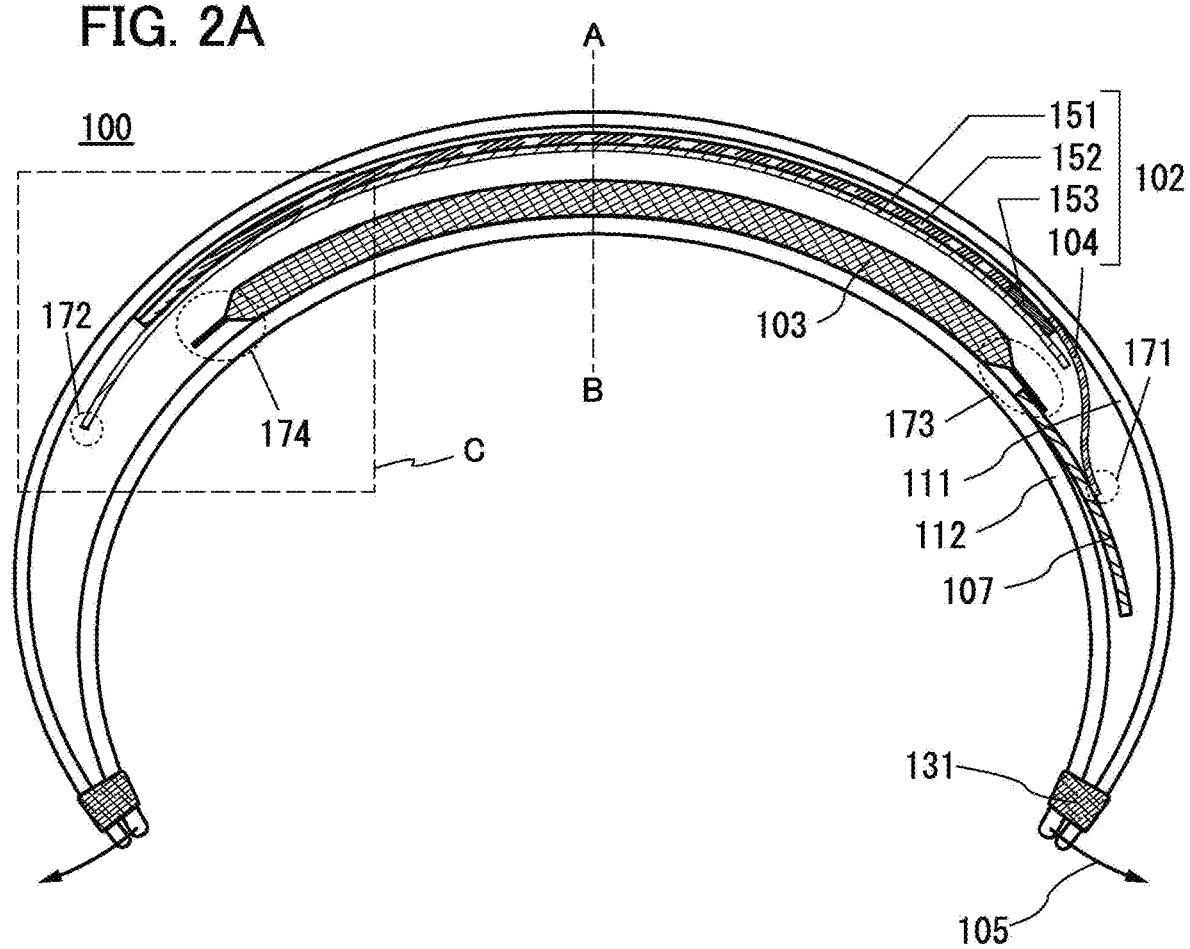
FIGS. 2A to 2D are cross-sectional views illustrating electronic devices of one embodiment of the present invention.
Figure 2B:
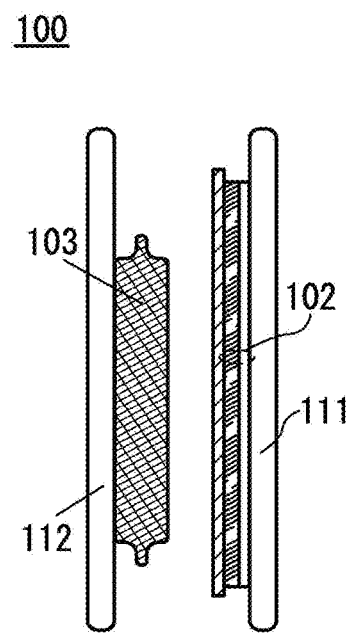

FIG. 2A is a cross-sectional view of the electronic device 100 illustrated in FIG. 1. FIG. 2B illustrates a cross section which is taken along the dashed line A-B in FIG. 2A and which is substantially perpendicular to the cross section in FIG. 2A. Note that the scale of FIG. 2B is larger than that of FIG. 2A for easy understanding.

The display portion 102 preferably includes a display element 152 and a circuit portion 153 over a board 151. The circuit portion 153 preferably includes a driver circuit for driving the display element 152. The circuit board 104 is preferably connected to the circuit portion 153 or the like. The circuit board 104 may include a driver circuit for driving the display element 152.

A display region of the display portion 102 may refer to, for example, a region where the display element 152 is provided, or may refer to a surface on which an image, text information, or the like is displayed in the electronic device 100. For example, the shape of the display region can be changed by providing, for example, a light-blocking plate on a front or rear side of the board 111 to block part of light from the region where the display element 152 is provided. Although the region where the display element 152 is provided has a substantially quadrangular shape in the example illustrated in FIG. 1, the region where the display element is provided is not limited to the quadrangular shape or the like.

The board 151 preferably has flexibility. When the board 151 has flexibility, the display portion 102 can have flexibility, for example.

Examples of the board 151 include a plastic substrate. A substrate having flexibility may be attached to a board or the like. A display device having flexibility can be manufactured with the use of the board 151 having flexibility. When the display device has flexibility, the display device can be attached to a curved surface or an irregular shape, whereby a variety of applications are achieved. For example, the board 151 having flexibility such as a plastic substrate is used, whereby the display device can be thinner and more lightweight. In addition, the display device in which the board 151 having flexibility such as a plastic substrate is used is hardly broken, and can withstand impacts well when dropped, for example.

The electronic device 100 can be worn on a human body such as an arm. When the electronic device 100 is worn on, for example, part of a human body such as an arm, the board 112 is in contact with the part of the body.

The board 112 preferably has a shape that fits around an arm. The electronic device 100 may be mounted on an arm of a robot or the like. Examples of the robot include a working robot, a robot attached to an apparatus, and a humanoid robot.

The board 112 preferably has a round shape. Alternatively, the board 112 may include a curved surface and a flat surface. The board 112 preferably has a shape along a curved surface, for example. Alternatively, the board 112 preferably has a shape along a side surface of an elliptical cylinder. The board 112 may partly have, for example, an arch-like shape, a C-like shape, an elliptical shape, or an elliptical shape part of which is cut. When the board 112 has such a round shape, the electronic device 100 can fit a body such as an arm more snugly. The electronic device 100 can be put around an arm according to the shape of the arm. Furthermore, the board 112 may have a cross section along three sides of a quadrangle.

The board 112 may have a shape along a cylindrical object, for example. Specifically, the board 112 may have a shape along a cylinder, an elliptical cylinder, or a prism. Alternatively, the board 112 may have a shape along a circular cone shape or a pyramid shape.

The board 112 is preferably configured to be mounted on a cylindrical object. Here, examples of the cylindrical object include a column shape, a cone shape, a pyramid shape, or a cylinder whose orientation of a side surface continuously changes, and the like.

In wearing the electronic device 100 on a body such as an arm, the shape of the electronic device 100 may be changed by an external force. For example, by changing the shape of the board 112 or the like in directions of arrows 105 in FIG. 2A, the electronic device 100 can be worn more easily. Therefore, the board 112 preferably has flexibility.

As the shape of the board 112 changes, the shape of another portion of the electronic device 100 may change. Therefore, in some cases, other portions of the electronic device 100 also preferably have flexibility. For example, the display portion 102 preferably has flexibility. The board 111 and the power storage device 103 also preferably have flexibility. Here, a film or the like may be used as the board 111.

When an external force is applied to the electronic device 100, the shape of the electronic device 100 changes. As the shape of the electronic device 100 changes, the shape of the power storage device 103 changes.

The amount of change in shape of the power storage device 103 owing to the external force applied to the electronic device 100 is preferably maintained while the external force is being applied. For example, the amount of change in shape of the power storage device 103 caused in wearing the electronic device 100 on an arm or the like is preferably maintained while the electronic device 100 is being worn. Since the amount of change in shape of the power storage device 103 is maintained, the power storage device 103 is suitable for being mounted on the electronic device 100 having a smaller radius of curvature. In addition, the power storage device 103 is suitable for use in the electronic device 100 which is movable. Furthermore, since the amount of change in shape of the power storage device 103 is maintained, the shape of the electronic device 100 fits a body part well.

For example, in the case where the power storage device 103 has high elasticity or the like, the shape of the power storage device 103 may temporarily change as the shape of the electronic device 100 changes, but may return to the original shape later. That is, the amount of change in shape of the power storage device 103 from the original shape may decrease with time. When the power storage device 103 returns to the original shape, another portion of the electronic device 100 may be distorted, for example.

Figure 2C:
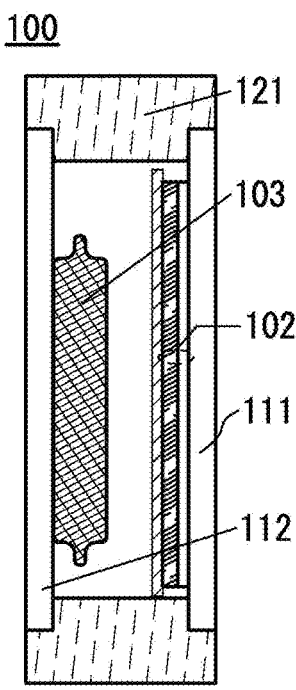

The electronic device 100 may include sealing portions 121 as illustrated in FIG. 2C. FIG. 2C illustrates an example in which the electronic device 100 in FIG. 2B is provided with the sealing portions 121. By providing the sealing portions 121, the hermeticity of a housing including the board 111, the board 112, and the sealing portions 121 can be further improved in some cases. Furthermore, when the shapes of the board 111 and the board 112 are changed by an external force, the sealing portions 121 relieve the shape change due to the external force; thus, the whole structure of the electronic device 100 can be maintained.

For the sealing portions 121, for example, a resin can be used. As a resin, for example, an elastomer can be used.

Figure 2D:
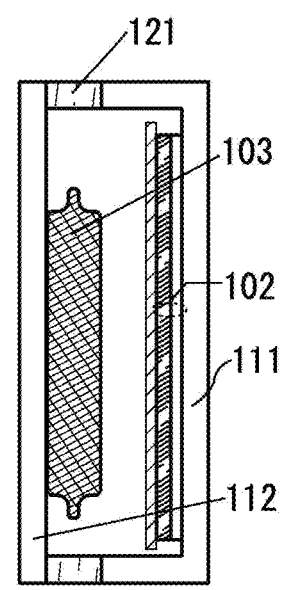

FIG. 2D illustrates another example in which the electronic device 100 includes the sealing portions 121. A cross section of the electronic device 100 illustrated in FIG. 2D differs from that in FIG. 2B in the shape of the board 111 and the presence of the sealing portions 121. In the cross section illustrated in FIG. 2D, the board 111 has end portions that are bent in an L-like shape. The electronic device 100 has a housing including the board 111 whose end portions are bent in an L-like shape, the sealing portions 121, and the board 112.

The sum of the thicknesses of the display element 152 and the board 151 in the display portion 102 is preferably greater than or equal to 1 µm and less than or equal to 1 mm, further preferably, greater than or equal to 5 µm and less than or equal to 200 µm. The thickness of the power storage device 103 is, for example, greater than or equal to 50 µm and less than or equal to 30 mm and may be larger than the thickness of the display element.

When an external force is applied to objects with different thicknesses, the objects may differ from each other in how they are bent by the external force, specifically, the degree of change in radius of curvature, or the like. The degree of change in radius of curvature refers to, for example, the amount of change in shape by an external force, the temporal change in the amount of change, the response speed of the change, or the like.

Therefore, when an external force is applied to a region where two objects with different thicknesses are fixed to each other, either of the objects may be distorted, which might result in a crack or a breakage. The region where the two objects are fixed to each other refers to, for example, a region where the contacting surfaces of the objects are attached to each other, or the like.

A case where the shape of the electronic device 100 is changed by an external force in wearing the electronic device 100 on an arm or the like will be considered here. In such a case, it is preferable that there be a region where the display portion 102 and the power storage device 103 are not fixed to each other.

Therefore, a space is preferably provided between the power storage device 103 and the display portion 102. Alternatively, a deformable or fluid substance is preferably provided between the power storage device 103 and the display portion 102. For example, a liquid such as water or a gel substance may be provided. Alternatively, a region of the display portion 102 is preferably not attached to the power storage device 103. It is particularly preferable that the region where the display element is provided in the display portion 102 not be attached to the power storage device 103. Alternatively, a region of the display portion 102 is preferably apart from the power storage device 103. Such structures can improve the reliability of the display portion 102 and the power storage device 103. In addition, such structures can suppress the distortion of the display portion 102 and the power storage device 103. Furthermore, such structures can suppress the generation of a crack or a breakage in the display portion 102 and the power storage device 103.

Surfaces of the power storage device 103 and the display portion 102 are preferably in contact with each other and easily slide on each other.

It is preferable that the display portion 102 include a first surface which faces the power storage device 103 and the first surface include a first region which is not fixed to the power storage device 103. It is also preferable that the first region overlap with the display element 152 of the display portion 102.

It is preferable that there be a first region where the display portion 102 and the power storage device 103 are not fixed to each other. There may be the first region where the display portion 102 and the power storage device 103 are not fixed to each other and one region or two or more regions where they are fixed to each other. For example, the display portion 102 and the power storage device 103 may be fixed to each other in one end region. Alternatively, the display portion 102 and the power storage device 103 may be fixed to each other in two or more regions, i.e., in one end region and in another or other regions. The display portion 102 and the power storage device 103 can be fixed to each other with, for example, an adhesive layer or the like. Alternatively, the display portion 102 and the power storage device 103 may be fixed to each other with a buffer, a porous material, or the like provided therebetween.

Alternatively, it is preferable that the display portion 102 have an end portion 171 and an end portion 172, the power storage device 103 have an end portion 173 and an end portion 174, the end portion 171 and the end portion 173 be fixed to the circuit board 107, and the end portion 172 and the end portion 174 not be fixed to each other, as illustrated in FIG. 2A.

Alternatively, it is preferable that the power storage device 103 and the display portion 102 be in contact with each other and the contacting surfaces thereof easily slide on each other.

When the contacting surfaces of the power storage device 103 and the display portion 102 easily slide on each other, an external force applied to either the power storage device 103 or the display portion 102 may be prevented from being easily applied to the other. A reduction in the effect of an external force on each other can prevent deformation such as distortion.

In some cases, an exterior body of the power storage device 103 and a film provided with the display element in the display portion 102 are formed using different materials. In such cases, the power storage device 103 and the display portion 102 may differ from each other in how they are bent by an external force, specifically, the degree of change in radius of curvature, or the like. In the case where the power storage device 103 and the display portion 102 differ from each other in how they are bent by the external force, specifically, the degree of change in radius of curvature, or the like, either the exterior body of the power storage device 103 or the display portion 102 or both might be distorted. The display portion 102 is particularly likely to be distorted because it is thin.

When the electronic device 100 is dropped or hit by an object or the like, components of the electronic device 100 may receive an impact.

Even in such a case, when a space is provided between the power storage device 103 and the display portion 102, the space can absorb the impact and can thus weaken an impact from the outside. As one example, a case where the electronic device 100 and an object hit each other and the board 111 and the object are brought into contact with each other is considered. In such a case, an impact received by the board 111 does not directly reach the power storage device 103 and the circuit board 107 and can be weakened.

As the circuit board 104, for example, a circuit board having flexibility can be used. As the circuit board having flexibility, a flexible printed circuit (FPC) in which a flexible resin film is provided with a wiring is preferably used. In the case where an FPC is used as the circuit board 104, the circuit board 104 can change its shape as the electronic device 100 changes its shape when it is being worn, and the circuit board 104 or the like can be prevented from being broken owing to a crack in a connection portion between the circuit board 104 and the circuit portion 153 or the like or in a connection portion between the circuit board 104 and the circuit board 107.

In the electronic device 100, the display portion 102 may be at least partly in contact with the board 111. Alternatively, in the electronic device 100, an adhesive layer or a layer including a touch sensor may be provided between the display portion 102 and the board 111. For example, as the adhesive layer, an adhesive sheet may be attached to the board 111 and the display portion 102 may be attached to the adhesive sheet. Alternatively, the board 111 may include a touch sensor. In the case where the display portion 102 is at least partly in contact with an inner surface of the board 111, the shape of the display portion 102 can easily fit the shape of the inner surface of the board 111 when the display portion 102 has flexibility. Even in the case where the shape of the board 111 is changed by an external force, the display portion 102 can be prevented from being degraded or broken.

Each of the boards 111 and 112 preferably has a curved surface. Furthermore, each of the cross sections of the boards 111 and 112 preferably has a circular shape or a circular arc shape, for example.

When the electronic device 100 is being worn or removed, it is preferred that regions with a large radius of curvature in the cross sections of the boards 111 and 112 not be substantially deformed and end portions in the cross sections of the boards 111 and 112 be flexible. For example, the cross sections of the boards 111 and 112 preferably have a C-like shape, an elliptical shape, or an elliptical shape part of which is cut. When the cross sections of the boards 111 and 112 have such a round shape, the electronic device 100 can fit a body such as an arm more snugly. For example, in the case where the electronic device 100 is worn on an arm, the electronic device 100 can be put around the arm so as to fit the arm snugly. Note that the cross sections of the boards 111 and 112 may have a rectangular shape such as a square-bracket shape.

At least a portion of the board 111 preferably has a light-transmitting property. Examples of the board 111 include glass, quartz, plastic, a flexible board, an attachment film including a resin, paper including a fibrous material, and a base film. Examples of glass include barium borosilicate glass, aluminoborosilicate glass, and soda lime glass. Examples of a flexible board, an attachment film, and a base film include plastic typified by polyethylene terephthalate (PET), polyethylene naphthalate (PEN), polyether sulfone (PES), and polytetrafluoroethylene (PTFE); a synthetic resin such as acrylic; polypropylene; polyester; polyvinyl fluoride; polyvinyl chloride; polyamide (such as aramid); polyimide; epoxy; and an inorganic vapor deposition film.

Figure 3A:
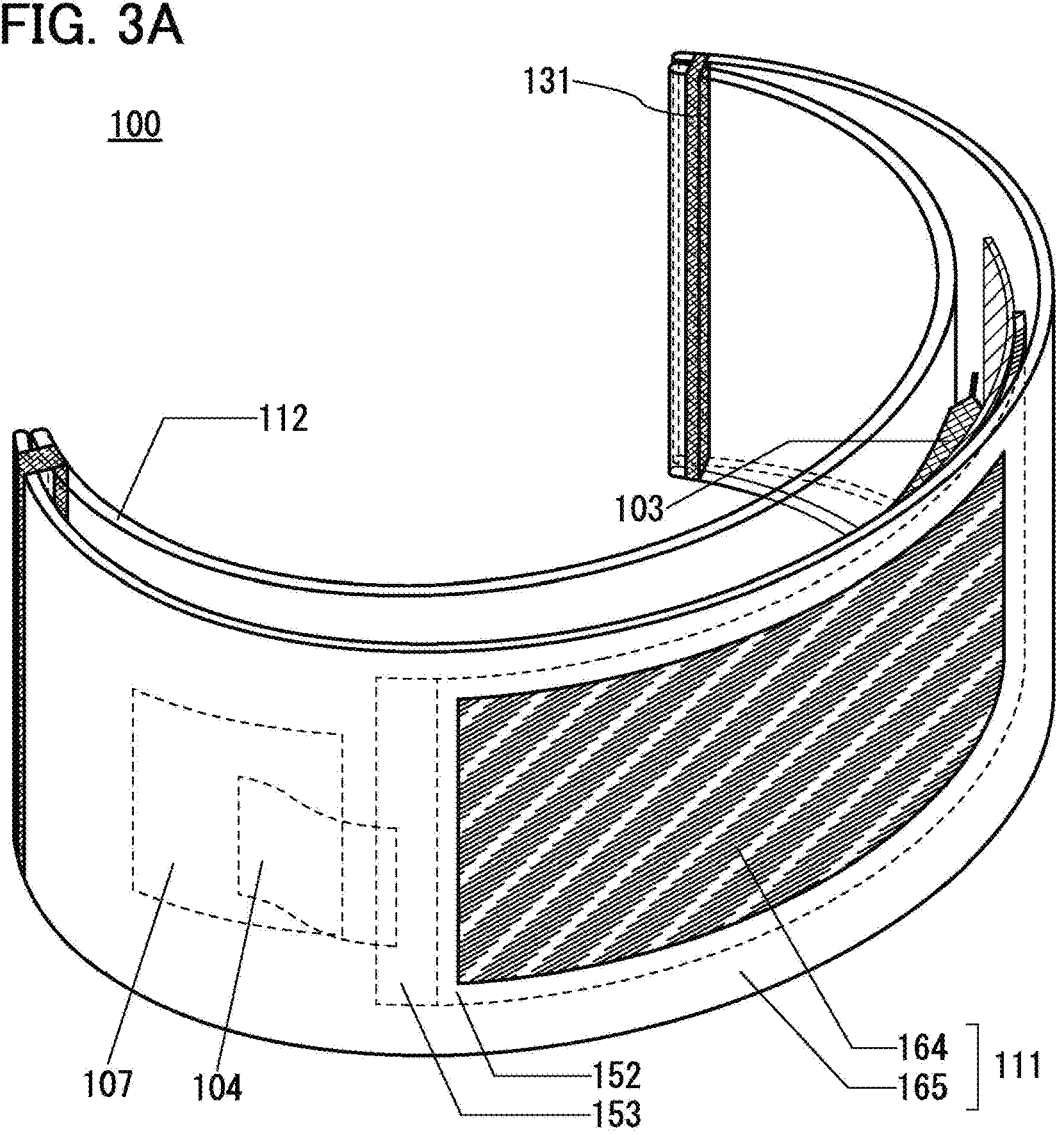
FIGS. 3A and 3B are a perspective view and a cross-sectional view each illustrating an electronic device of one embodiment of the present invention.

The board 111 may include a first region having a light-transmitting property and a second region having a transflective or light-blocking property. In an example of the electronic device 100 illustrated in FIG. 3A, the board 111 includes a region 164 having a light-transmitting property and a region 165 having a light-blocking property.

For the board 112, any of the above materials for the board 111 can be used. Alternatively, for the board 112, a board including metal, stainless steel, or stainless steel foil, a board including tungsten or tungsten foil, paper, a semiconductor (such as a single crystal semiconductor or a silicon semiconductor), or the like may be used.

For the board 112, a material having higher rigidity than the board 111 may be used, for example. For the board 112, for example, a stainless steel material may be used. A stainless steel material serves as a protective material which prevents the display portion 102 and the power storage device 103 from being curved excessively or from being twisted and deformed significantly. A stainless steel material only allows a change into a certain shape, i.e., bending in one direction, in putting the electronic device on an arm, which improves the reliability.

As illustrated in FIG. 2A or 2B, end portions of the boards 111 and 112 may have round shapes. When the end portions of the boards 111 and 112 have round shapes, the electronic device can fit a body or the like more snugly in some cases.

Figure 3B:
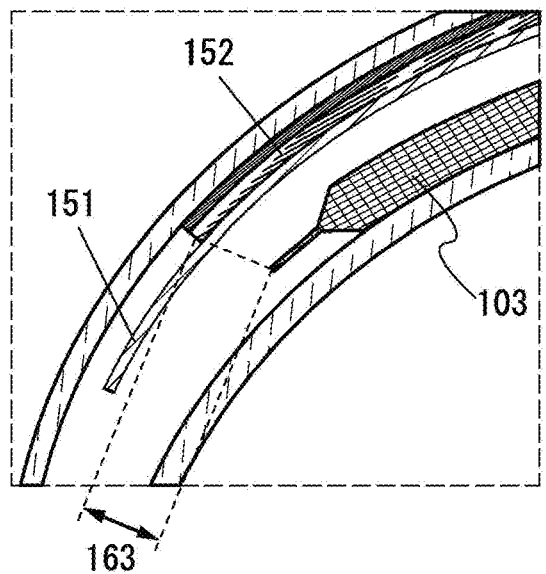

FIG. 3B shows an enlarged view of a region C surrounded by a dashed line in FIG. 2A. An end portion of the board 151 of the display portion 102 and an end portion of the power storage device 103 are not fixed to each other. In wearing the electronic device 100 on an arm or the like, the shape of the board 112 changes in the directions of the arrows 105 in FIG. 2A, and accordingly, the shape of the electronic device 100 also changes. Since the end portion of the board 151 and the end portion of the power storage device 103 are not fixed to each other, a distance 163 between the end portion of the board 151 and the end portion of the power storage device 103 may change as the shape of the electronic device 100 changes.

In contrast, in the case where the display portion 102 and the power storage device 103 are fixed to each other, the distance 163 does not necessarily change as the shape of the electronic device 100 changes. For example, in the case where the end portion of the board 151 and the end portion of the power storage device 103 are fixed to each other, the distance 163 does not change even when the shape of the electronic device 100 is changed, except when the display portion 102 or the power storage device 103 is broken or when the display portion 102 or the power storage device 103 is expanded or contracted depending on temperature, for example.

Figure 4A:
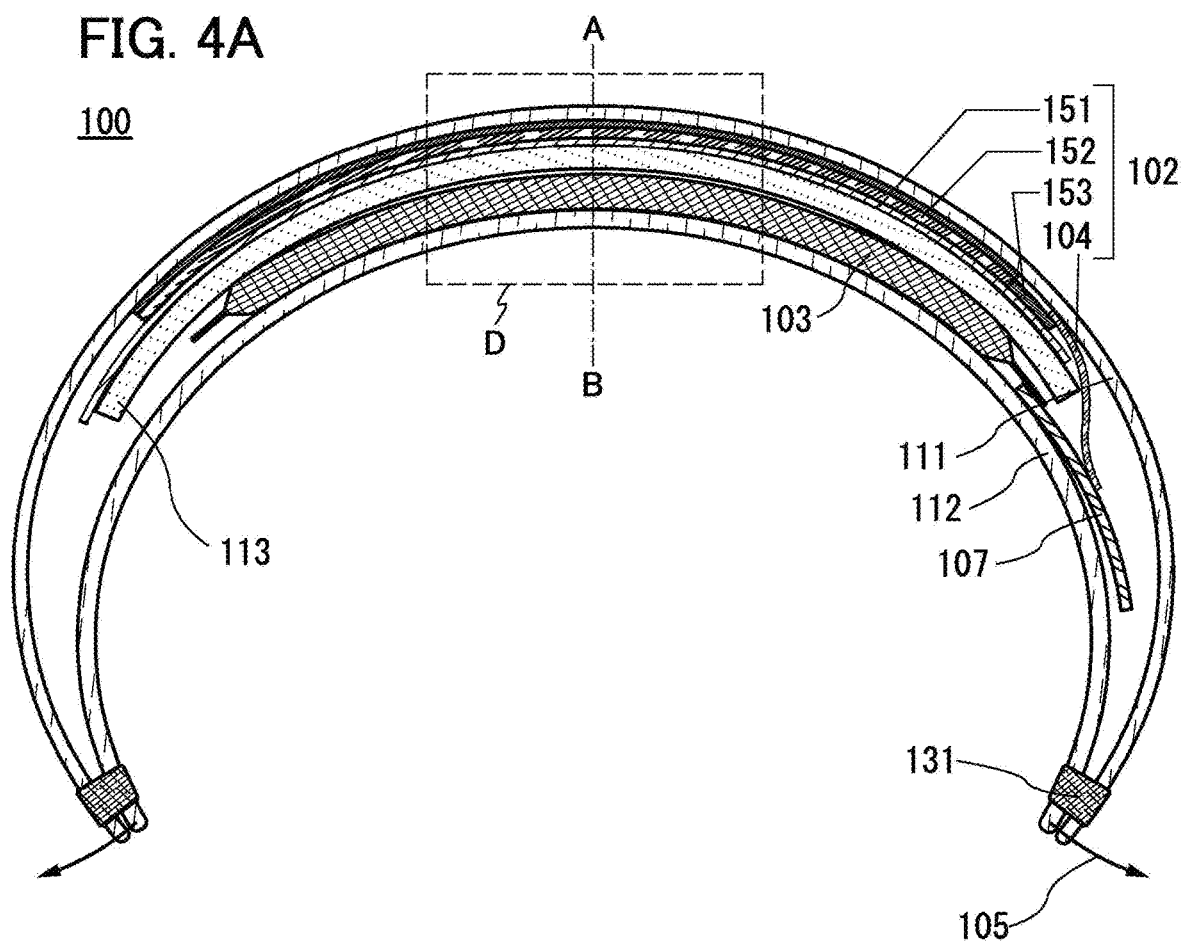
FIGS. 4A to 4C are cross-sectional views illustrating an electronic device of one embodiment of the present invention.
Figure 4B:
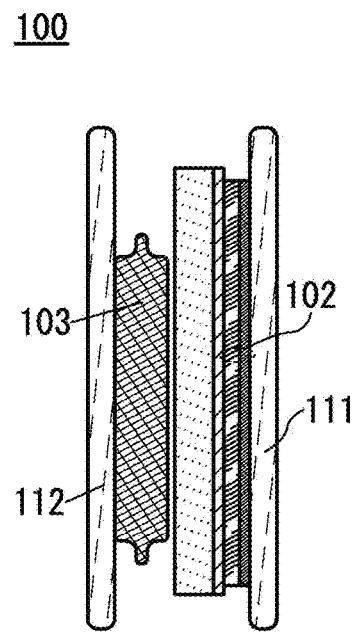
Figure 4C:
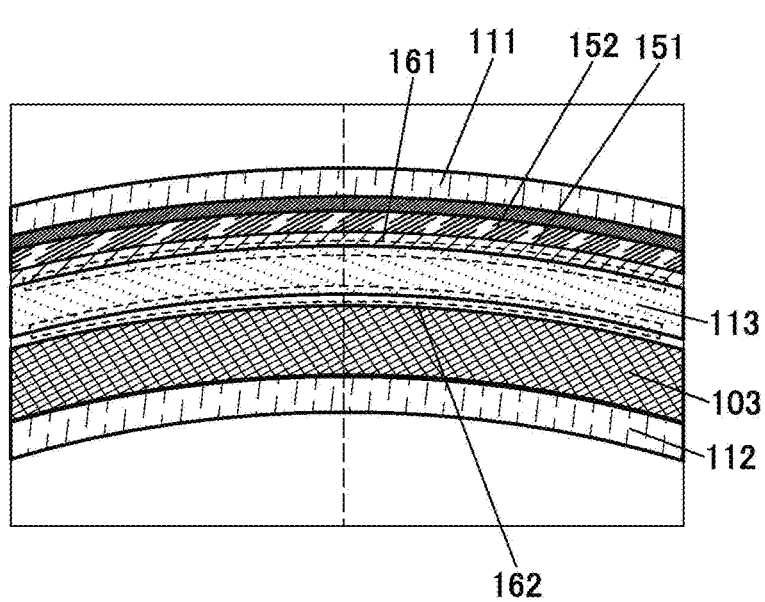

As illustrated in FIGS. 4A to 4C, the electronic device 100 may include a board 113 between the display portion 102 and the power storage device 103. FIGS. 4A to 4C are different from FIG. 1 in that the board 113 is provided.

It is preferable that the board 113 be provided between the power storage device 103 and the display portion 102 because an external force applied to either the power storage device 103 or the display portion 102 can be prevented from being easily applied to the other.

For the board 113, any of the materials for the board 112 can be used. As the board 113, for example, a flexible board, an attachment film including a resin, a base film, or the like may be used.

FIG. 4A illustrates a cross section of the electronic device 100. FIG. 4B illustrates a cross section which is taken along the dashed-dotted line A-B in FIG. 4A and which is substantially perpendicular to the cross section in FIG. 4A. FIG. 4C illustrates an enlarged view of a region D surrounded by a dashed line in FIG. 4A. As illustrated in FIG. 4C, the board 113 includes a first surface which faces the display portion, and the first surface includes a region 161 which overlaps with the display element 152.

Alternatively, for example, the board 113 may include a first surface which faces the board 151 of the display portion 102, and the first surface may include a region 161 which faces the display element 152 with the board 151 provided therebetween.

A case where the region 161 is fixed to the display portion 102 is considered here. In this case, a region 162 of the board 113 on the side opposite to the region 161 is preferably not fixed to other components of the electronic device 100, such as the board 112 and the power storage device 103, except the display portion 102 and the board 111. The term "fixed" means, for example, being attached or being fixed by means of a fastener such as a screw.

Alternatively, for example, in the case where the region 162 is fixed to other components of the electronic device 100, such as the power storage device 103 and the board 112, except the display portion 102 and the board 111, the region 161 is preferably not fixed to the display portion 102.

Alternatively, the board 113 may be fixed to neither the display portion 102 nor the power storage device 103.

The board 113 may include a region which is not fixed to the display portion 102 and one or a plurality of regions which are fixed thereto. Alternatively, there may be a region where the display portion 102 and the power storage device 103 are fixed to each other with the board 113 provided therebetween, for example.

Although the region 161 faces the vicinity of the center of the display portion 102 in the example of the cross section illustrated in FIG. 4C, the region 161 may exist over a wide region overlapping with the display element 152.

Surfaces of the board 113 and the power storage device 103 are preferably in contact with each other and easily slide on each other. Alternatively, surfaces of the board 113 and the display portion 102 are preferably in contact with each other and easily slide on each other. The term "easily slide" means, for example, having a low friction coefficient or having a small surface unevenness.

Figure 5A:
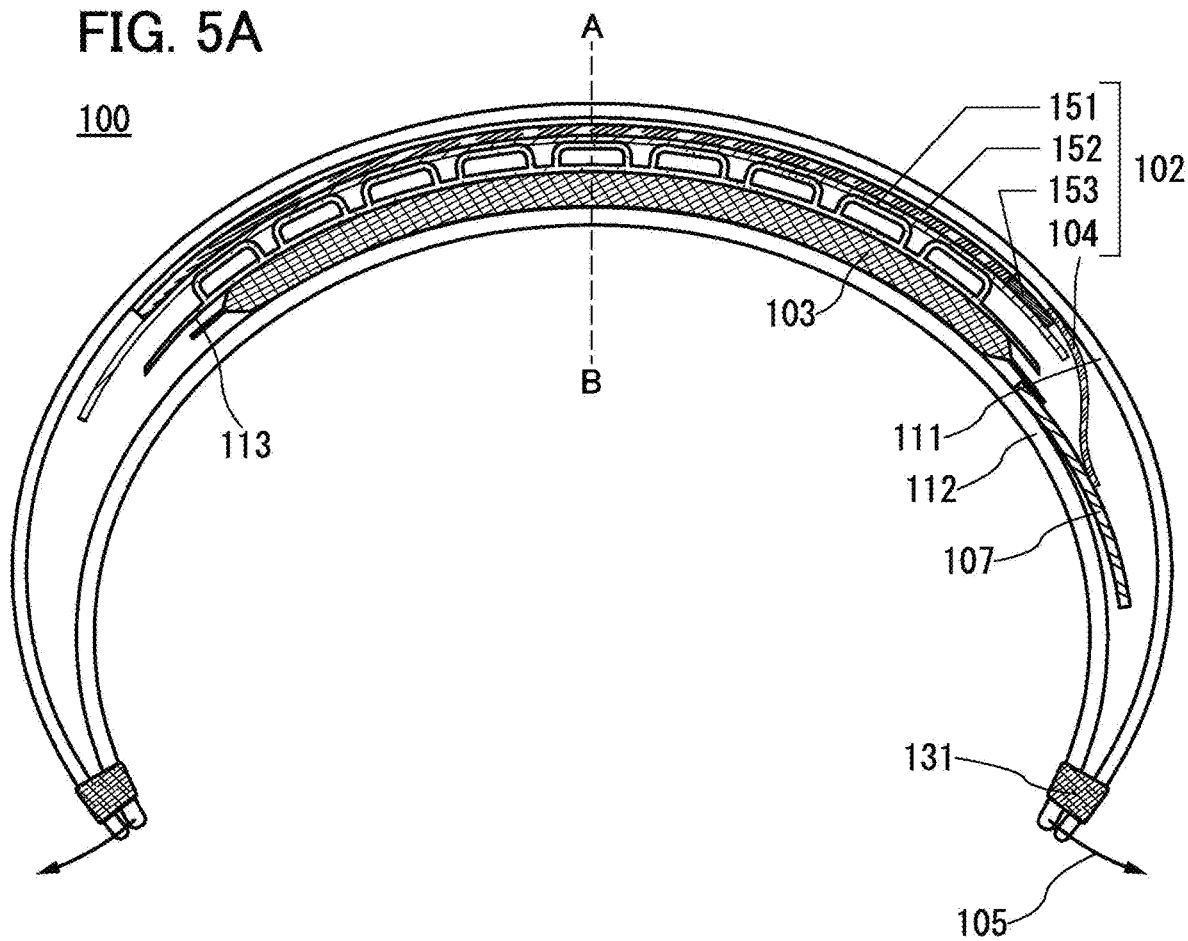
FIGS. 5A and 5B are cross-sectional views illustrating an electronic device of one embodiment of the present invention.
Figure 5B:
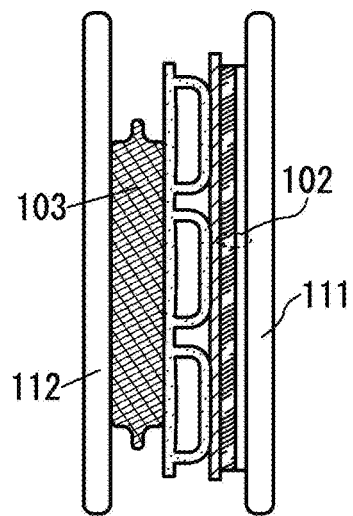

As the board 113, a buffer may be used. For example, a material containing bubbles may be used as the buffer. FIGS. 5A and 5B illustrate an example of using a bubble buffer (an air cushion) as the board 113. Alternatively, a porous material may be used as the board 113.

Figure 6A:
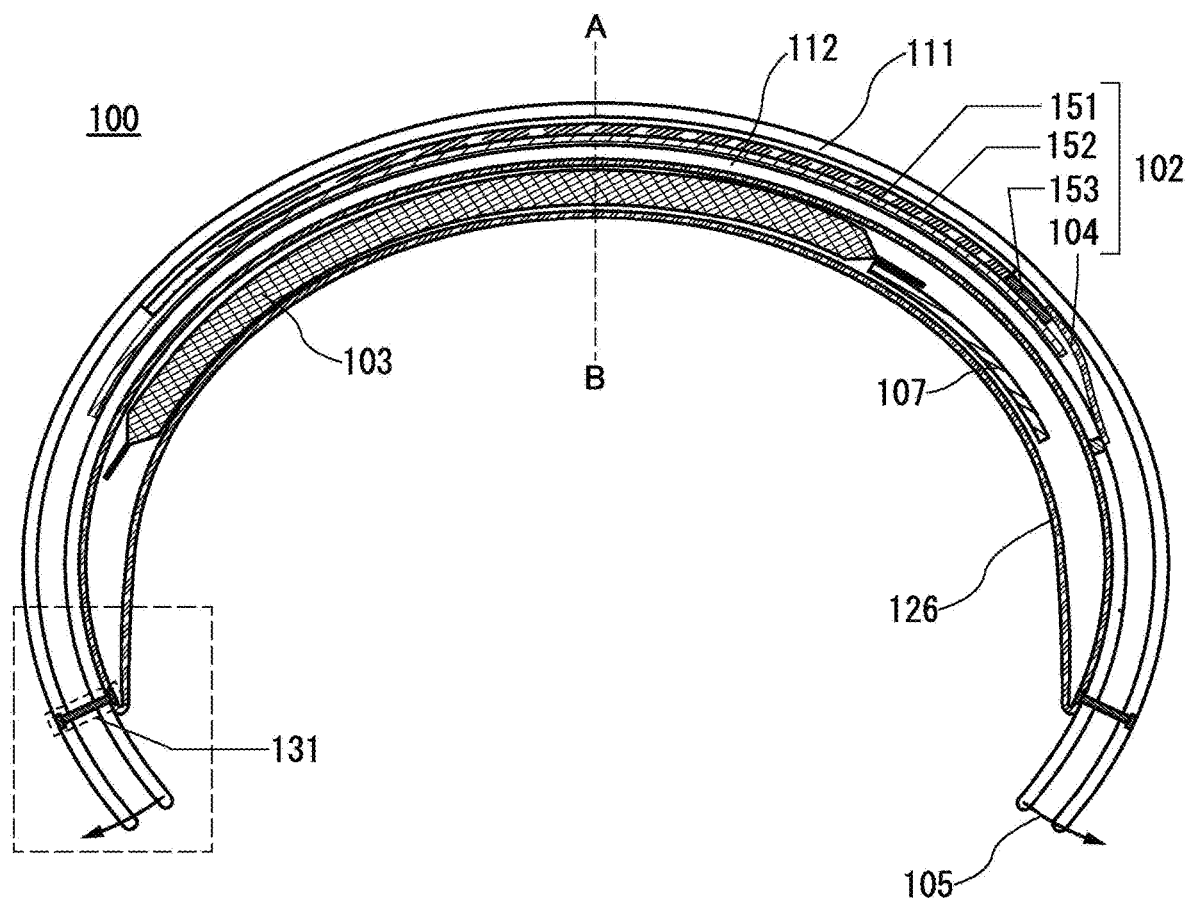
FIGS. 6A to 6C are cross-sectional views illustrating an electronic device of one embodiment of the present invention.
Figure 6B:
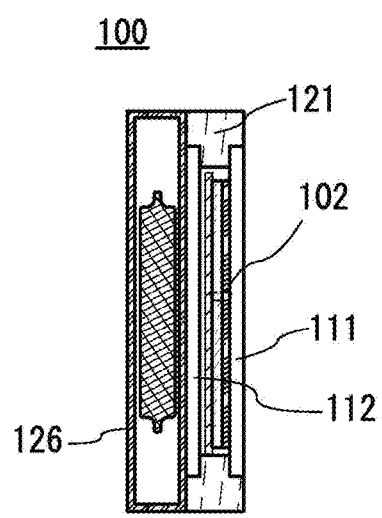
Figure 6C:
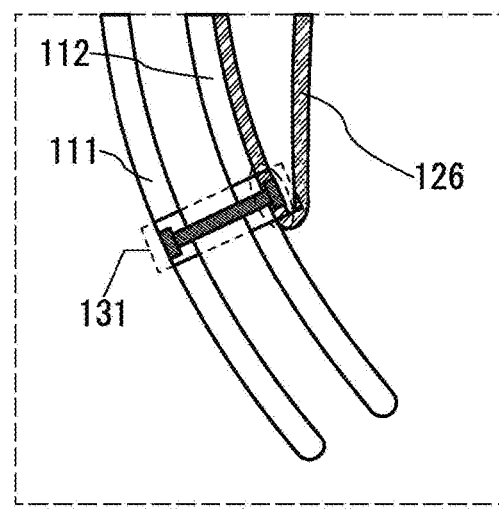

FIGS. 6A to 6C illustrate an example where the electronic device 100 have two housings. FIG. 6A illustrates a cross section of the electronic device 100, and FIG. 6B illustrates a cross section taken along the dashed line A-B in FIG. 6A. In the example illustrated in FIGS. 6A to 6C, the electronic device 100 has a housing including the board 111, the board 112, the sealing portions 121, and the like as a first housing and a housing 126 as a second housing. Inside the first housing of the electronic device 100, the display portion 102 and the circuit board 107 are provided. Inside the housing 126, the power storage device 103 is provided.

The housing 126 preferably has flexibility. The housing 126 may be a single component as illustrated in FIGS. 6A to 6C or may be formed by fixing two or more components with a screw or the like. The housing 126 can be formed using the same material as the sealing portions 121, for example.

The vicinities of end portions of the housing 126 are preferably fixed to the first housing with the fasteners 131, for example. In the example illustrated in FIGS. 6A to 6C, the housing 126 is fixed to the vicinities of end portions of the board 112 with the fasteners 131.

It is preferable that the housing 126 be at least partly in contact with one surface of the board 112. The housing 126 may be attached to one surface of the board 112.

Alternatively, the housing 126 may include a first region which is fixed to the first housing and a second region which is not fixed thereto. In the case where the board 112 and the housing 126 differ from each other in how they are bent by an external force, specifically, the degree of change in radius of curvature, or the like, the second region which is not fixed can alleviate the effect of the external force.

Note that a space may be provided between the housing 126 and the board 112 of the first housing.

<Example of how to Wear Electronic Device 100>

Figure 7A:
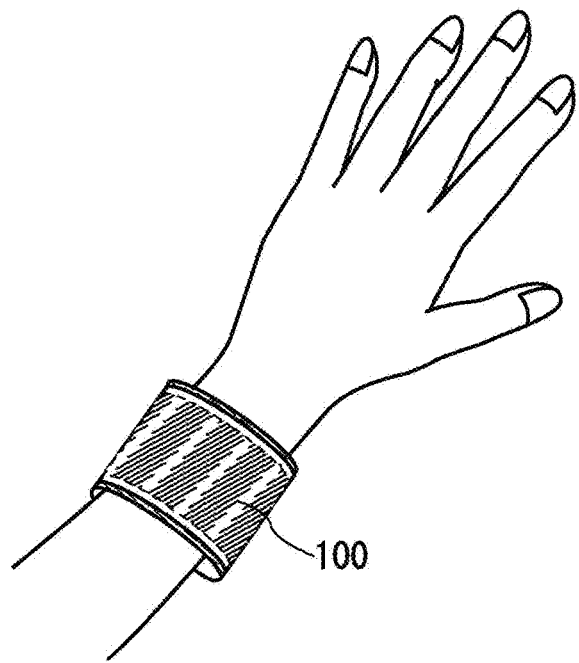
FIGS. 7A to 7C illustrate an electronic device according to one embodiment of the present invention.
Figure 7B:
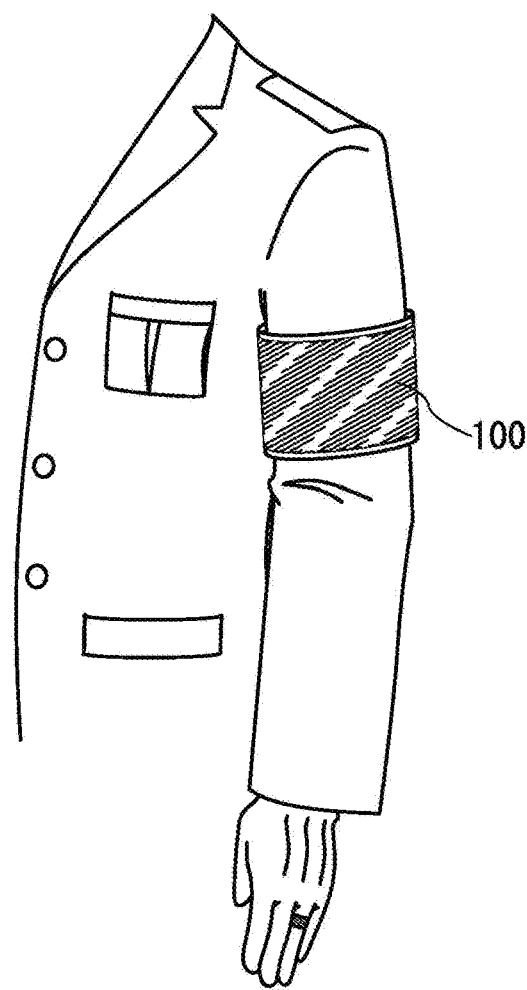
Figure 7C:
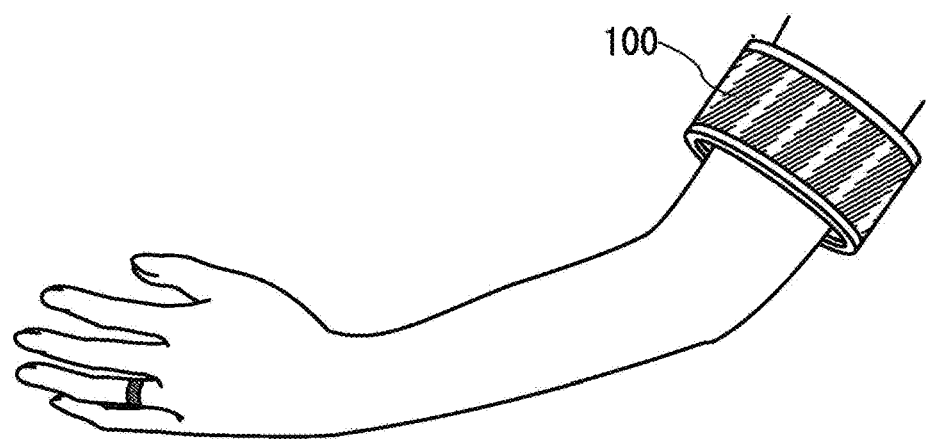

FIGS. 7A to 7C each illustrate an example of how to wear the electronic device 100. In the example of FIG. 7A, the electronic device 100 is worn on an arm (a wrist). In the example of FIG. 7B, the electronic device 100 is worn on the upper portion of an arm. In the example of FIG. 7C, the electronic device 100 is an armband device.

The electronic device 100 may be worn on part other than an arm, such as a leg or a finger. Furthermore, the electronic device 100 may be fixed to an arm, a leg, or the like with the use of a belt, for example. Depending on the size of the body part on which the electronic device 100 is worn, such as the circumference of an arm, the electronic device 100 may be longer than the circumference of the arm. For example, in the case where the board 112 or the like is longer than the circumference of an arm in the cross section illustrated in FIG. 2A or the like, the extra regions of the board 112 may overlap each other. In those regions, a region of the board 112 may be in contact with the surface of the board 111.

Figure 26:
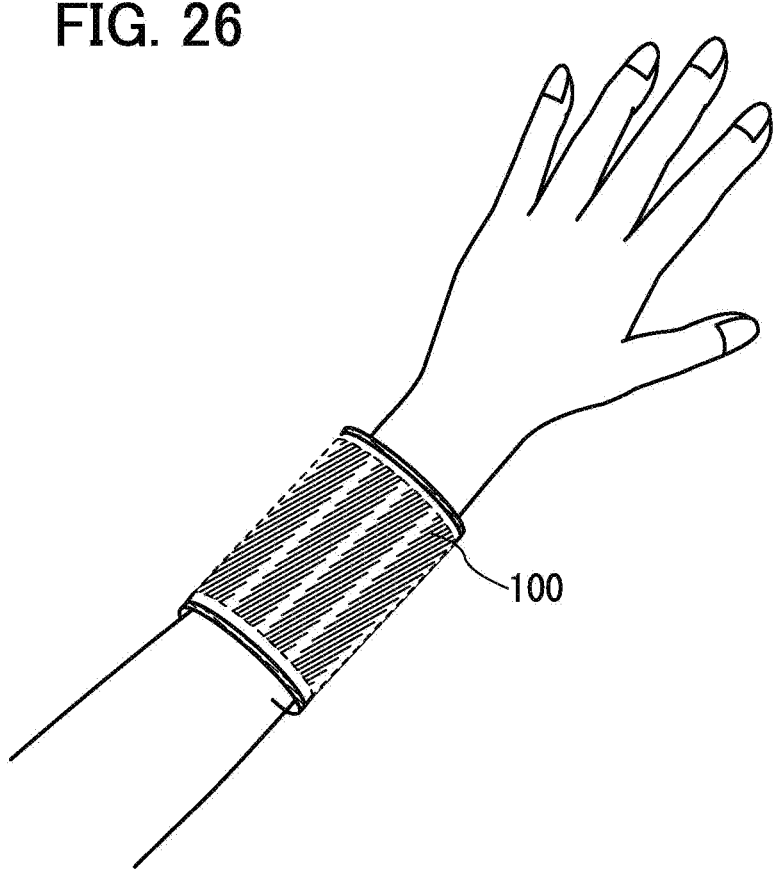
FIG. 26 illustrates an electronic device of one embodiment of the present invention.
Figure 27A:
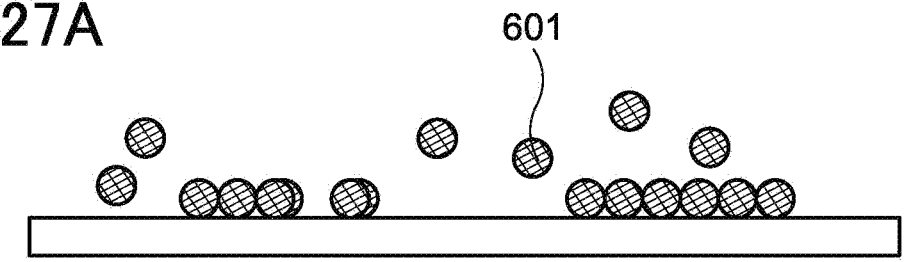
FIGS. 27A to 27D are schematic cross-sectional views illustrating a deposition principle.
Figure 27B:
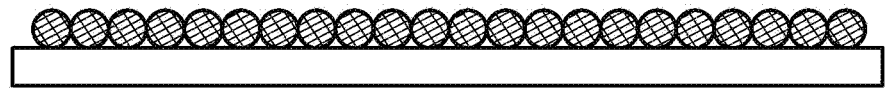
Figure 27C:
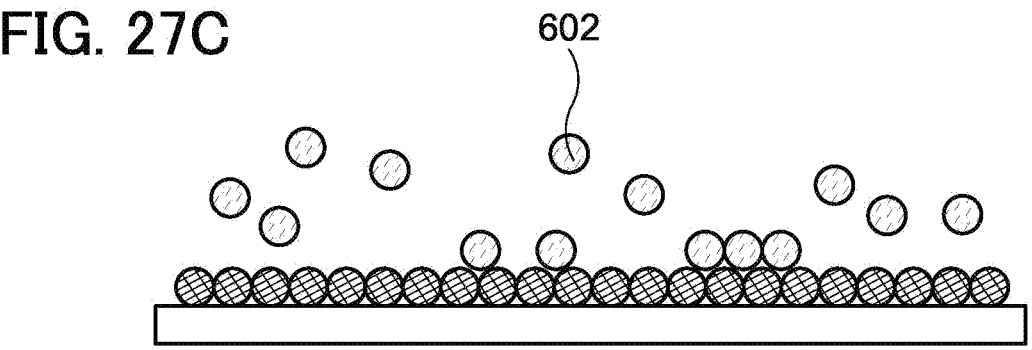
Figure 27D:
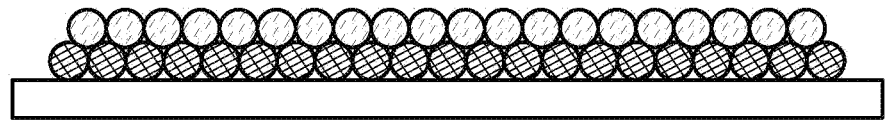

The electronic device 100 may include a display region that is long in a direction along the arm as illustrated in FIG. 26. When the length of the display region of the electronic device 100 in the direction along the arm in FIG. 26 is larger than or equal to, preferably 1.5 or more times, the width of the arm in the cross section, the electronic device 100 can have a wide display region. On the other hand, when the length of the display region in the direction along the arm is smaller than the width of the arm in the cross section, the electronic device 100 can be lightweight and easily worn.

<Modification Example of Electronic Device 100>

Figure 8A:
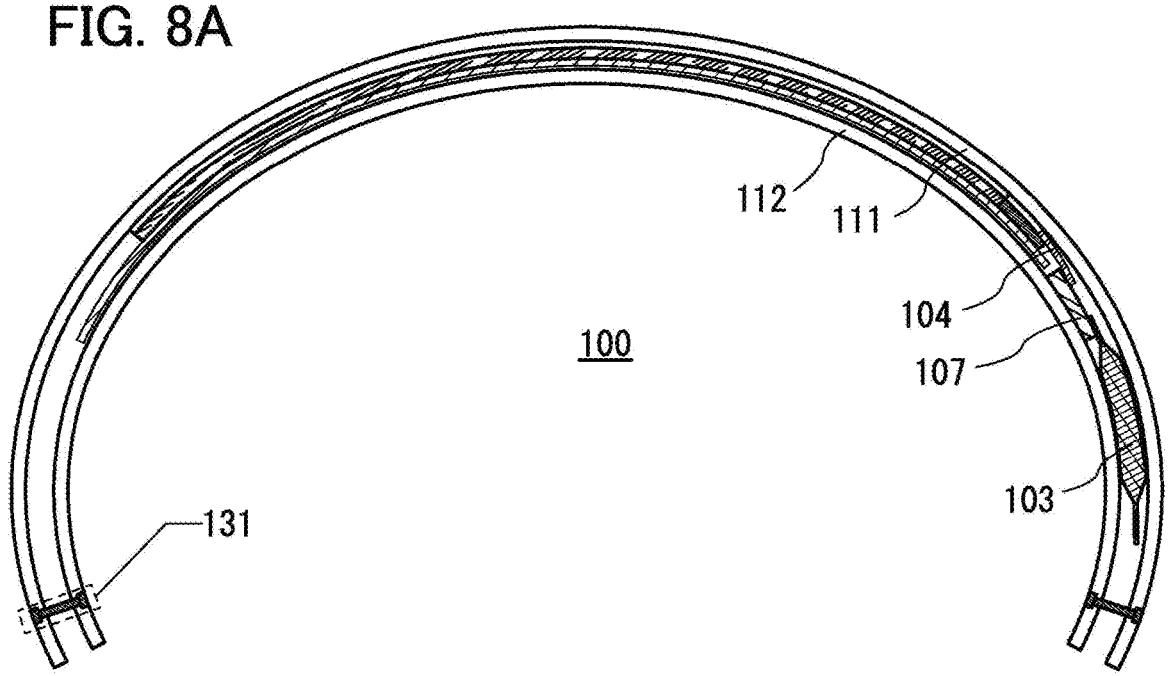
FIGS. 8A and 8B are cross-sectional views each illustrating an electronic device of one embodiment of the present invention.

As in an example of the electronic device 100 illustrated in FIG. 8A, the display portion 102 and the power storage device 103 may be arranged side by side. FIG. 8A differs from FIGS. 2A to 2C in that the power storage device 103 is provided beside the display portion 102. When the power storage device 103 and the display portion 102 are arranged side by side, the electronic device 100 can be thin, for example. The thin electronic device 100 can fit a body or the like more snugly in some cases.

Figure 8B:
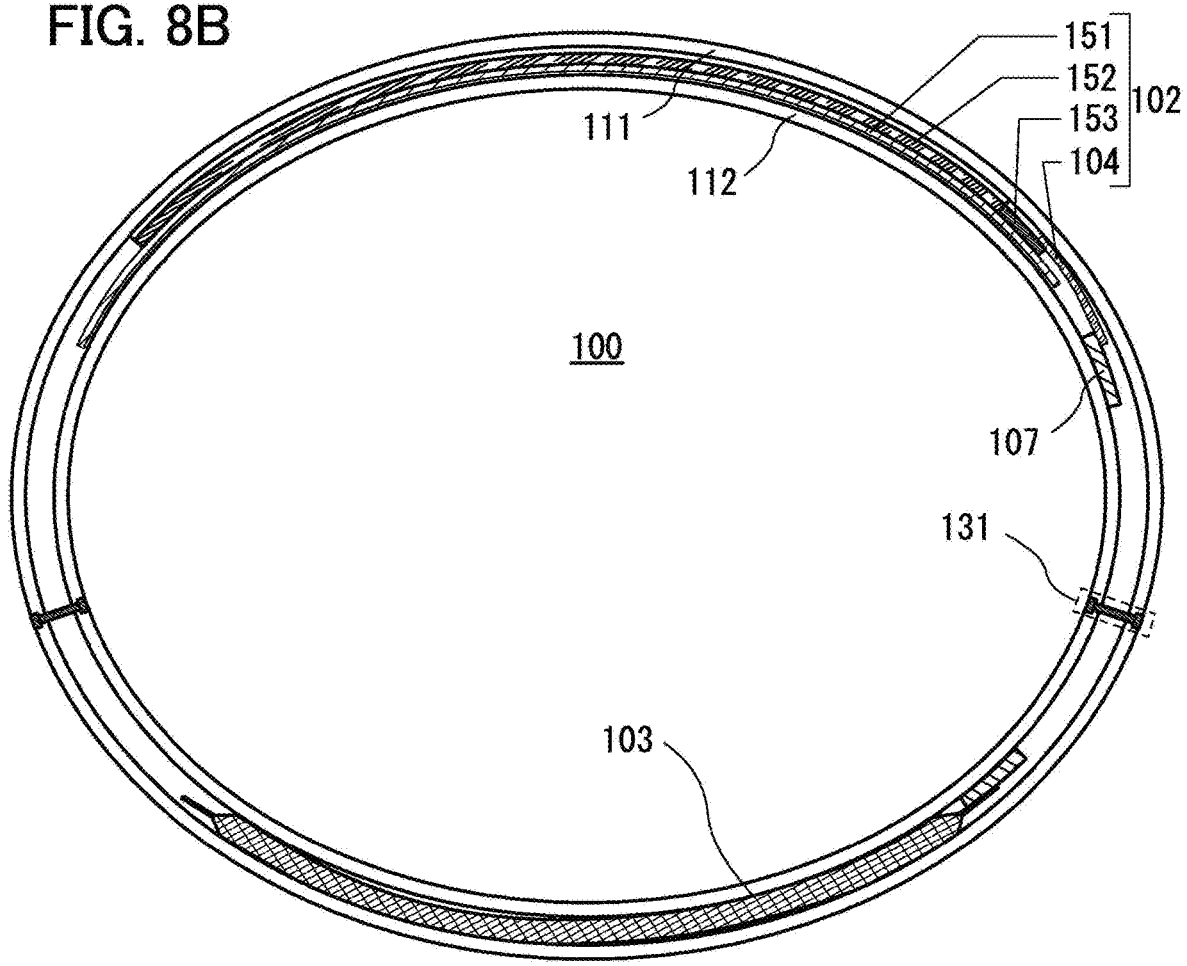

As in an example of the electronic device 100 in FIG. 8B, the board 111 and the board 112 may have a ring-like cross-sectional shape.

Figure 9A:
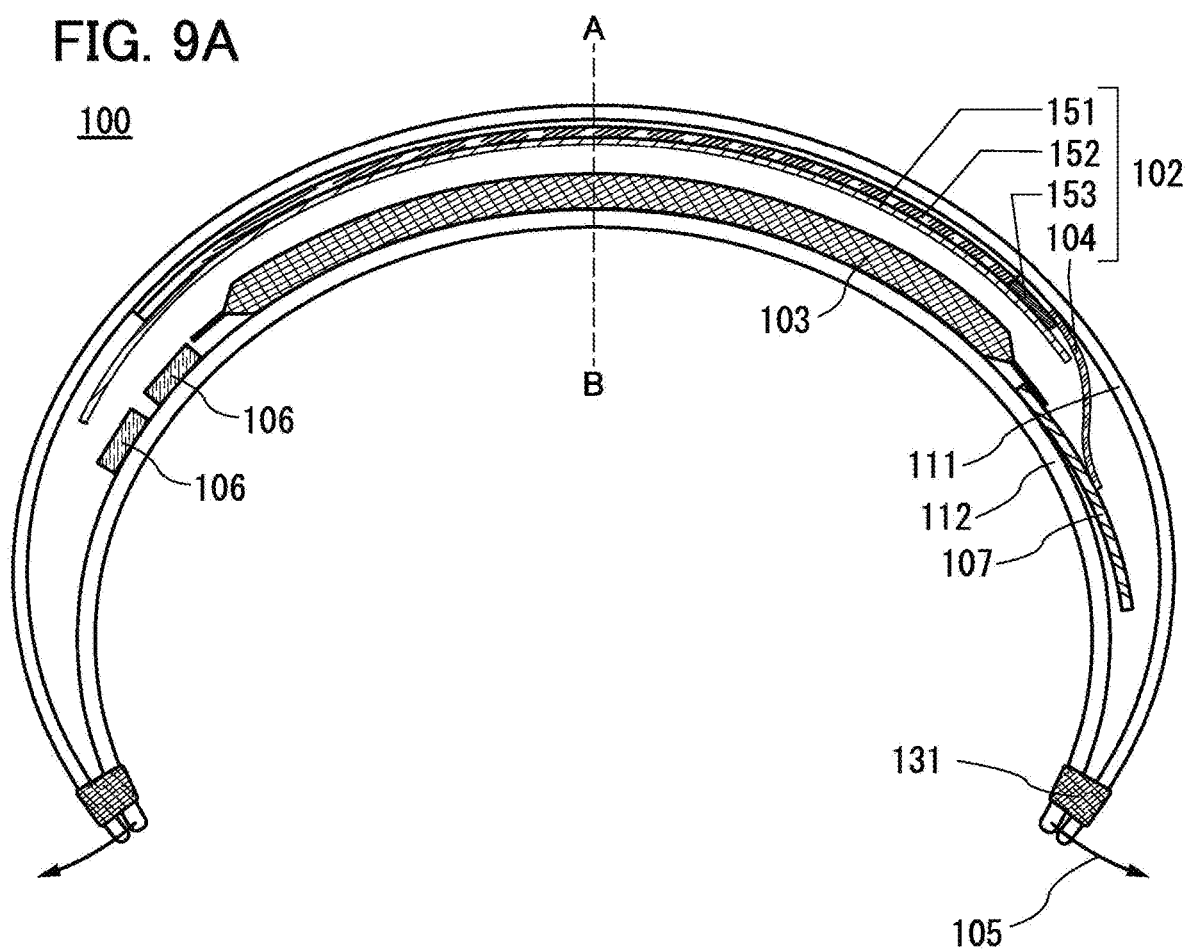
FIGS. 9A and 9B are cross-sectional views illustrating an electronic device of one embodiment of the present invention.
Figure 9B:
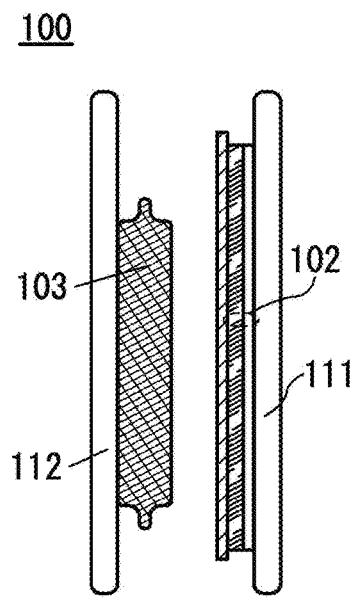

As in an example of the electronic device 100 illustrated in FIGS. 9A and 9B, the electronic device 100 may include the power storage device 103 and power storage devices 106. Here, the power storage device 103 preferably has flexibility. As the power storage device 103, for example, a thin storage battery whose exterior body is formed using a laminate film can be used. The power storage devices 106 do not necessarily have flexibility. The power storage devices 106 may have different shapes from the power storage device 103. As the power storage devices 106, for example, a coin-type (or button-type) storage battery, a rectangular storage battery, or a cylindrical storage battery can be used. For example, in the case where the electronic device 100 includes a memory or the like, the power storage devices 106 can be used as storage batteries for holding data. Furthermore, the power storage devices 106 can be used as spare storage batteries for the power storage device 103. For a coin-type storage battery, Embodiment 3 can be referred to.

For example, in the cross section of the electronic device 100 illustrated in any of FIG. 1, FIGS. 2A to 2D, FIGS. 3A and 3B, FIGS. 4A to 4C, FIGS. 5A and 5B, FIGS. 6A to 6C, FIGS. 7A to 7C, FIGS. 8A and 8B, and FIGS. 9A and 9B, the radius of curvature of the board 112 may be 10 mm or larger, preferably 5 mm or larger. In order that the electronic device 100 illustrated in FIG. 1, FIGS. 2A to 2D, FIGS. 3A and 3B, FIGS. 4A to 4C, FIGS. 5A and 5B, FIGS. 6A to 6C, FIGS. 7A to 7C, FIGS. 8A and 8B, and FIGS. 9A and 9B can be worn on an arm snugly, the radius of curvature of the board 112 is preferably 20 mm or larger, more preferably 15 mm or larger in the cross section of the board 112.

The electronic device 100 preferably has a shape with which more than half of an arm in the cross section can be covered.

<Power Storage Device>

The power storage device 103 preferably has a bent shape. When the power storage device 103 has a bent shape, the power storage device 103 can be provided in the region with a large radius of curvature of the board 111. The power storage device 103 preferably has flexibility. The power storage device having flexibility includes a thin flexible film as an exterior body and can change its shape along a curved surface portion of the region with a large radius of curvature of the board 111. The power storage device 103 can change its shape according to a change in the shape of the board 112 when an external force is applied to the electronic device 100, e.g., in wearing the electronic device 100 on an arm.

A secondary battery, a capacitor, or the like can be used as the power storage device 103.

As the secondary battery, a lithium-ion secondary battery can be used. Alternatively, a secondary battery containing an alkali metal (such as sodium or potassium) or an alkaline earth metal (such as calcium, strontium, barium, beryllium, or magnesium) instead of lithium may be used. Still alternatively, an air secondary battery using oxygen in air or the like as an active material may be used as the secondary battery. As the air secondary battery, a lithium air battery or the like may be used.

As the capacitor, an electric double-layer capacitor can be used. Alternatively, a redox capacitor can be used as the capacitor. Still alternatively, a hybrid capacitor such as a lithium-ion capacitor may be used as the capacitor.

Figure 10:
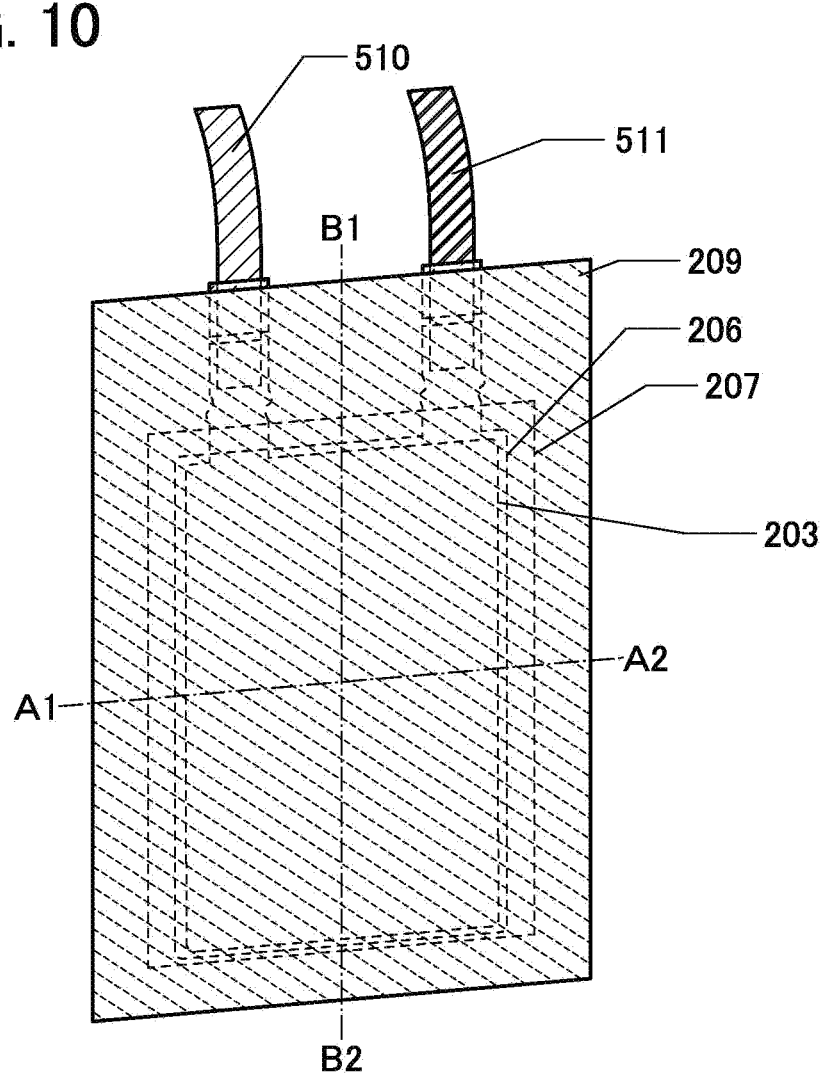
FIG. 10 is an external view of a thin storage battery.
Figure 11A:
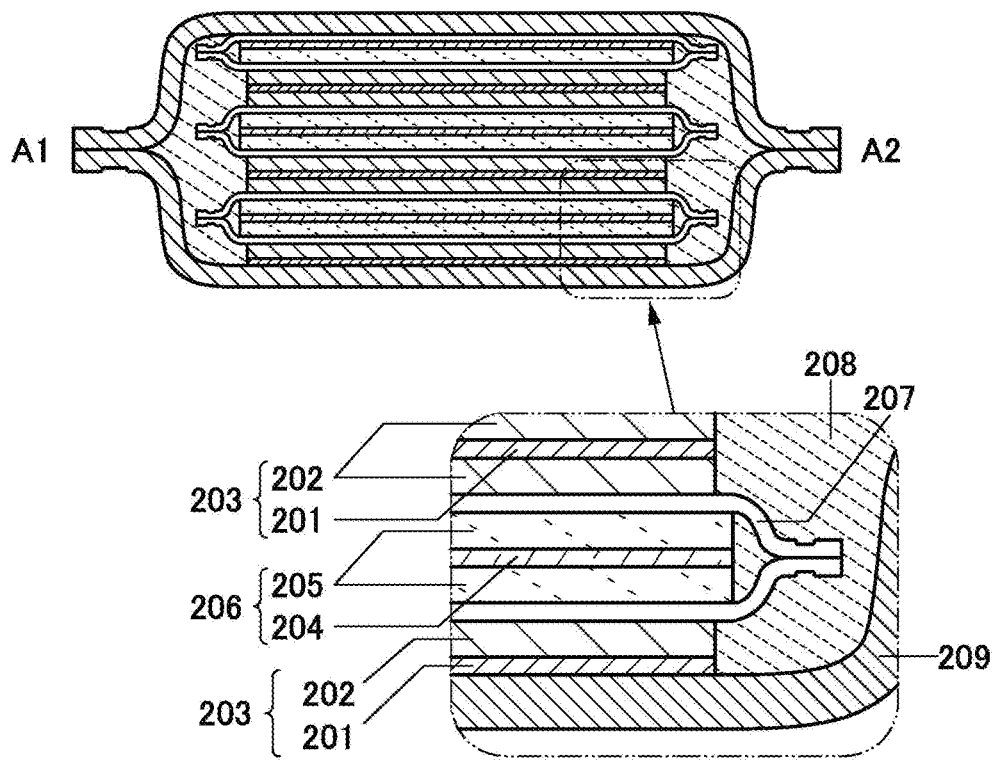
FIGS. 11A and 11B are cross-sectional views of a thin storage battery.
Figure 11B:
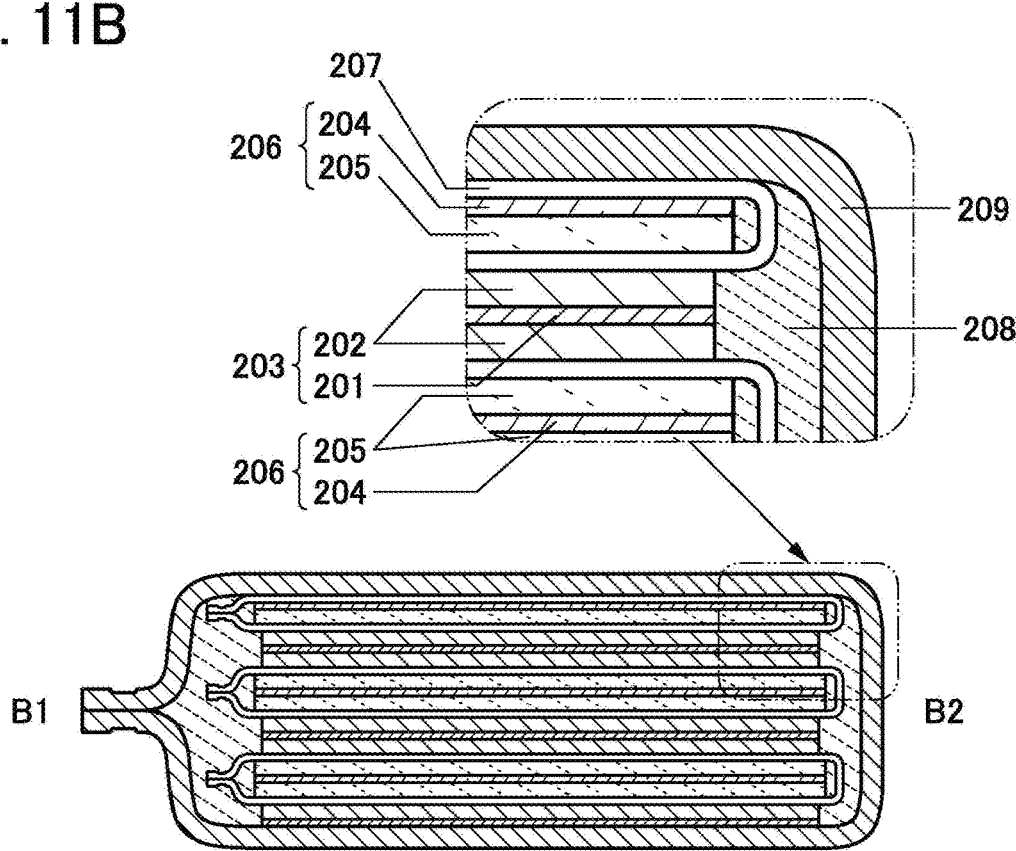

In this embodiment, an example of using, as the power storage device 103 having flexibility, a thin secondary battery whose exterior body includes a film will be described. FIG. 10 is an external view of the thin secondary battery. FIG. 11A illustrates a cross section taken along the dashed-dotted line A1-A2 in FIG. 10, and FIG. 11B illustrates a cross section taken along the dashed-dotted line B1-B2 in FIG. 10.

The thin secondary battery includes a sheet-like positive electrode 203, a sheet-like negative electrode 206, a separator 207, an electrolytic solution 208, an exterior body 209 made of a film, a positive electrode lead electrode 510, and a negative electrode lead electrode 511. The separator 207 is provided between the positive electrode 203 and the negative electrode 206 in the exterior body 209. The exterior body 209 is filled with the electrolytic solution 208. The positive electrode 203 includes a positive electrode current collector 201 and a positive electrode active material layer 202. The negative electrode 206 includes a negative electrode current collector 204 and a negative electrode active material layer 205.

Figure 19:
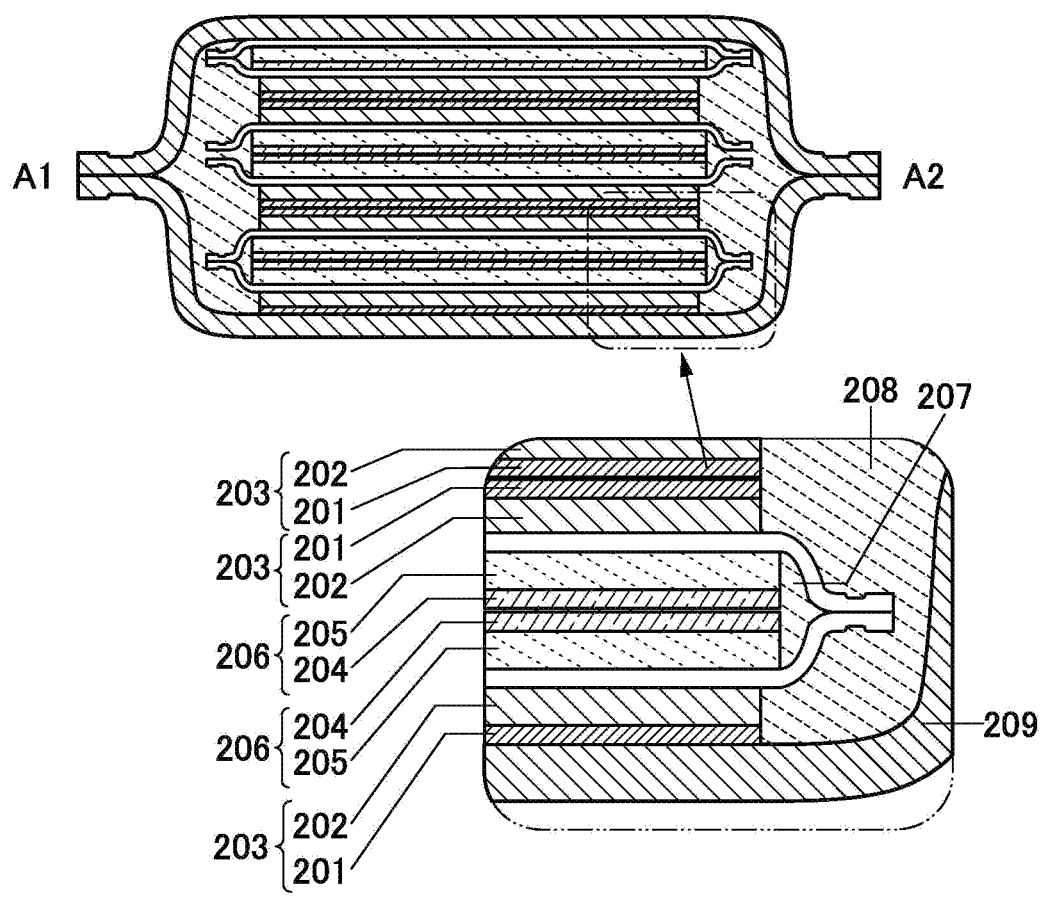
FIG. 19 is a cross-sectional view of a thin storage battery.

FIG. 19 illustrates another example of the cross section taken along the dashed-dotted line A1-A2 in FIG. 10. In the example illustrated in FIG. 19, the positive electrode 203 includes the positive electrode active material layer 202 only on one side of the positive electrode current collector 201. Similarly, the negative electrode 206 includes the negative electrode active material layer 205 only on one side of the negative electrode current collector 204.

The positive electrode current collector 201 and the negative electrode current collector 204 can each be formed using a highly conductive material which is not alloyed with a carrier ion of lithium or the like, such as a metal typified by stainless steel, gold, platinum, zinc, iron, nickel, copper, aluminum, titanium, or tantalum or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 201 and the negative electrode current collector 204 can each have a foil-like shape, a plate-like shape (sheet-like shape), a net-like shape, a cylindrical shape, a coil shape, a punching-metal shape, an expanded-metal shape, or the like as appropriate. The positive electrode current collector 201 and the negative electrode current collector 204 each preferably have a thickness greater than or equal to 10 μm and less than or equal to 30 μm.

The positive electrode active material layer 202 can contain, for example, a material into and from which carrier ions can be inserted and extracted. As the carrier ions, lithium ions, other alkali metal ions (e.g., sodium ions or potassium ions), alkaline earth metal ions (e.g., calcium ions, strontium ions, barium ions, beryllium ions, or magnesium ions) can be used.

Examples of the material into and from which lithium ions can be inserted and extracted include lithium-containing materials with an olivine crystal structure, a layered rock-salt crystal structure, and a spinel crystal structure. As the positive electrode active material, a compound such as $LiFeO_2$, $LiCoO_2$, $LiNiO_2$, $LiMn_2O_4$, $V_2O_5$, $Cr_2O_5$, or $MnO_2$ can be used.

Alternatively, a lithium-containing complex phosphate ($LiMPO_4$ (general formula) (M is at least one of Fe(II), Mn(II), Co(II), and Ni(II))) can be used. Typical examples of the general formula $LiMPO_4$ include $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

$LiFePO_4$ is particularly preferable because it properly has properties necessary for the positive electrode active material, such as safety, stability, high capacity density, high potential, and the existence of lithium ions which can be extracted in initial oxidation (charging).

Examples of the lithium-containing material with a layered rock-salt crystal structure include a lithium-containing material such as lithium cobalt oxide ($LiCoO_2$), $LiNiO_2$, $LiMnO_2$, or $Li_2MnO_3$; an NiCo-based lithium-containing material (a general formula thereof is $LiNi_xCo_{1-x}O_2$ (0<x<1)) such as $LiNi_{0.8}Co_{0.2}O_2$; an NiMn-based lithium-containing material (a general formula thereof is $LiNi_xMn_{1-x}O_2$ (0<x<1)) such as $LiNi_{0.5}Mn_{0.5}O_2$; and an NiMnCo-based lithium-containing material (also referred to as NMC, and a general formula thereof is $LiNi_xMn_yCo_{1-x-y}O_2$ (x>0, y>0, x+y<1)) such as $LiNi_{1/3}Mn_{1/3}Co_{1/3}O_2$. The examples further include $Li(Ni_{0.8}Co_{0.15}Al_{0.05})O_2$ and $Li_2MnO_3 \cdot LiMO_2$ (M=Co, Ni, or Mn).

Examples of the lithium-containing material with a spinel crystal structure include $LiMn_2O_4$, $Li_{1+x}Mn_{2-x}O_4$, $LiMn_{2-x}Al_xO_4$ (0<x<2), and $LiMn_{1.5}Ni_{0.5}O_4$.

It is preferable to add a small amount of lithium nickel oxide ($LiNiO_2$ or $LiNi_{1-x}M_xO_2$ (M=Co or Al, for example)) to a lithium-containing material with a spinel crystal structure which contains manganese such as $LiMn_2O_4$ because advantages such as inhibition of the dissolution of manganese and the decomposition of an electrolytic solution can be obtained.

Alternatively, a lithium-containing material represented by a general formula, $Li_{(2-j)}MSiO_4$ (M is one or more of Fe(II), Mn(II), Co(II), and Ni(II), 0≤j≤2), can be used as the positive electrode active material. Typical examples of $Li_{(2-j)}MSiO_4$ (general formula) include lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a NASICON compound represented by a general formula, $A_xM_2(XO_4)_3$ (A=Li, Na, or Mg, M=Fe, Mn, Ti, V, Nb, or Al, and X=S, P, Mo, W, As, or Si), can be used as the positive electrode active material. Examples of the NASICON compound include $Fe_2(MnO_4)_3$, $Fe_2(SO_4)_3$, and $Li_3Fe_2(PO_4)_3$. Still further alternatively, a compound represented by a general formula, $Li_2MPO_4F$, $Li_2MP_2O_7$, or $Li_5MO_4$ (M=Fe or Mn), a perovskite fluoride such as $NaF_3$ or $FeF_3$, a metal chalcogenide (a sulfide, a selenide, or a telluride) such as $TiS_2$ or $MoS_2$, a material with an inverse spinel crystal structure such as $LiMVO_4$, a vanadium oxide (e.g., $V_2O_5$, $V_6O_{13}$, or $LiV_3O_8$), a manganese oxide, or an organic sulfur compound can be used as the positive electrode active material, for example.

As the positive electrode active material, a sodium-containing material may be used. For example, $NaMn_2O_4$, $NaNiO_2$, $NaCoO_2$, $NaFeO_2$, $NaNi_{0.5}Mn_{0.5}O_2$, $NaCrO_2$, or $NaFeO_2$ can be used. Alternatively, a fluorophosphate such as $Na_2FePO_4F$, $Na_2VPO_4F$, $Na_2MnPO_4F$, $Na_2CoPO_4F$, or $Na_2NiPO_4F$ can be used. Still alternatively, a borate such as $NaFeBO_4$ or $Na_3Fe_2(BO_4)_3$ can be used.

Any of such substances to which a rare earth element is added may be used as the positive electrode active material. The rare earth element are Sc, Y, La, Ce, Pr, Nd, Pm, Sm, Eu, Gd, Tb, Dy, Ho, Er, Tm, Yb, and Lu. A positive electrode active material to which one or more of the elements are added can be used.

The positive electrode active material layer 202 may further include a binder for increasing adhesion of active materials, a conductive additive for increasing the conductivity of the positive electrode active material layer 202, and the like in addition to the above-described positive electrode active materials.

A material with which a metal to be carrier ions can be dissolved and precipitated or a material into and from which carrier ions can be inserted and extracted can be used for the negative electrode active material layer 205. For example, a lithium metal, a carbon-based material, or an alloy-based material can be used. Examples of the metal to be the carrier ions include lithium, other alkali metals (e.g., sodium and potassium), alkaline earth metals (e.g., calcium, strontium, barium, beryllium, and magnesium), and the like.

The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (lower than or equal to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

For the negative electrode active material, an alloy-based material can be used. The term "alloy-based material" refers to a material which enables charge-discharge reactions by an alloying reaction and a dealloying reaction with a metal to be carrier ions. For example, in the case where carrier ions are lithium ions, a material including at least one of Mg, Ca, Al, Si, Ge, Sn, Pb, Sb, As, Bi, Ag, Au, Zn, Cd, Hg, In, and the like can be used as the alloy-based material. Such elements have higher capacity than carbon. In particular, silicon has a significantly high theoretical capacity of 4200 mAh/g. For this reason, silicon is preferably used for the negative electrode active material. Among compounds using such elements, a material that enables charge-discharge reactions by forming a bond with lithium may also be referred to as an alloy-based material. Examples include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, for the negative electrode active material, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active material. For example, a transition metal oxide which does not cause an alloy reaction with lithium, such as cobalt oxide (CoO), nickel oxide (NiO), or iron oxide (FeO), may be used. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

The negative electrode active material layer 205 may further include a binder for increasing adhesion of active materials, a conductive additive for increasing the conductivity of the negative electrode active material layer 205, and the like in addition to the above-described negative electrode active materials.

As an electrolyte in the electrolytic solution 208, a material which has carrier ion mobility and contains lithium ions serving as carrier ions is used. Typical examples of the electrolyte are lithium salts such as $LiPF_6$, $LiClO_4$, $Li(FSO_2)_2N$, $LiAsF_6$, $LiBF_4$, $LiCF_3SO_3$, $Li(CF_3SO_2)_2N$, and $Li(C_2F_5SO_2)_2N$. One of these electrolytes may be used alone, or two or more of them may be used in an appropriate combination and in an appropriate ratio. In order to stabilize a reaction product, a small amount (1 wt %) of vinylene carbonate (VC) may be added to the electrolytic solution so that the decomposition amount of the electrolytic solution is further reduced. As an electrolyte containing sodium ions, $NaPF_6$, $NaN(SO_2CF_3)_2$, $NaClO_4$, $NaBF_4$, $CF_3SO_3Na$, and $NaAsF_6$, or the like may be used.

As a solvent of the electrolytic solution 208, a material in which carrier ions can transfer is used. As the solvent of the electrolytic solution, an aprotic organic solvent is preferably used. Typical examples of aprotic organic solvents include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolytic solution, safety against liquid leakage and the like is improved. Furthermore, the storage battery can be thinner and more lightweight. Typical examples of gelled high-molecular materials include a silicone gel, an acrylic gel, an acrylonitrile gel, a polyethylene oxide-based gel, a polypropylene oxide-based gel, a gel of a fluorine-based polymer, and the like. Alternatively, the use of one or more of ionic liquids (room temperature molten salts) which have features of non-flammability and non-volatility as a solvent of the electrolytic solution can prevent the storage battery from exploding or catching fire even when the storage battery internally shorts out or the internal temperature increases owing to overcharging or the like.

As the separator 207, an insulator can be used. For example, cellulose (paper) can be used. Alternatively, a polymer, such as polypropylene and polyethylene, with pores can be used.

In the secondary battery, a thin flexible film (such as a laminate film) is used as an exterior body. The laminate film refers to a stacked film of a base film and an adhesive synthetic resin film, or a stacked film of two or more kinds of films. For the base film, polyester such as PET and PBT, polyamide such as nylon 6 or nylon 66, an inorganic film formed by evaporation, or paper may be used. For the adhesive synthetic resin film, polyolefin such as PE and PP, an acrylic-based synthetic resin, an epoxy-based synthetic resin, or the like may be used. An object is laminated with the laminate film by thermocompression bonding using a laminating apparatus. Note that an anchor coat agent is preferably applied as pretreatment for the laminating step so that the adhesion between the laminate film and the object can be increased. As the anchor coat agent, an isocyanate-based material or the like may be used.

Embodiment 4 can be referred to for a method for manufacturing the thin secondary battery whose exterior body includes a film.

<Method for Manufacturing Display Portion>

An example of a method for manufacturing the display portion 102 will be described below.

The display portion 102 has flexibility. The display portion 102 includes the display element 152 over the board 151 having flexibility.

Examples of methods for manufacturing the display element 152 over the board 151 having flexibility include a method in which the display element 152 is directly formed over the board 151 having flexibility; a method in which a layer including the display element 152 is formed over a rigid substrate such as a glass substrate, the substrate is removed by etching, polishing, or the like, and then the layer including the display element 152 and the board 151 having flexibility are attached to each other; a method in which a separation layer is provided over a rigid substrate such as a glass substrate, a layer including the display element 152 is formed thereover, the rigid substrate and the layer including the display element 152 are separated from each other using the separation layer, and then the layer including the display element 152 and the board 151 having flexibility are attached to each other; and the like.

In this embodiment, a manufacturing method which allows heat treatment to be performed at 400° C. or higher and which can improve the reliability of the display element, i.e., a technique in which a separation layer is provided over a rigid substrate such as a glass substrate as disclosed in Japanese Published Patent Application No. 2003-174153, is used so that the display portion 102 can be an active-matrix display device capable of displaying high-resolution images.

The technique disclosed in Japanese Published Patent Application No. 2003-174153 enables transistors including polysilicon in active layers or transistors including oxide semiconductor layers to be provided over a flexible substrate or film. These transistors are used as switching elements, and electroluminescent (EL) elements are provided.

In a common structure of the EL element, a layer including a light-emitting organic compound or inorganic compound (hereinafter referred to as a light-emitting layer) is provided between a pair of electrodes, and when a voltage is applied to the element, electrons and holes are separately injected and transported from the pair of electrodes to the light-emitting layer. When those carriers (electrons and holes) recombine, an excited state of the light-emitting organic compound or inorganic compound is formed, and when the light-emitting organic compound or inorganic compound returns to a ground state, light is emitted.

Further, kinds of excited state that can be formed by an organic compound are a singlet excited state and a triplet excited state. Light emission in the case of a singlet excited state is referred to as fluorescence, and light emission in the case of a triplet excited state is referred to as phosphorescence.

Such a light-emitting element is usually formed of thin films which have a thickness of submicrons to several microns. Therefore, they can be manufactured to be thin and light, which is a large advantage. Further, such light-emitting elements also have an advantage in that the period of time from when the carriers are injected until light is emitted is microseconds at the most, so they have a very high response speed. Moreover, because sufficient light emission can be obtained with a direct current voltage of several to several tens of volts, power consumption is also relatively low.

EL elements have a wider viewing angle than liquid crystal elements and are preferable as display elements in the display portion 102 when a display region has a curved surface. In addition, EL elements are preferable as display elements in the display portion 102 in that unlike liquid crystal elements, EL elements do not require a backlight, which makes it possible to reduce power consumption, the number of components, and the total thickness.

Note that methods for manufacturing the display element 152 over the board 151 having flexibility are not limited to the method mentioned above (Japanese Published Patent Application No. 2003-174153). Methods and materials for manufacturing EL elements may be known methods and materials and are therefore not described here.

The display device used as the display portion 102 may only be capable of simply displaying single-color images or displaying numbers. Therefore, a passive-matrix display device may be used, in which case the display element 152 may be manufactured over the board 151 having flexibility using a method other than the technique disclosed in Japanese Published Patent Application No. 2003-174153.

The display portion 102 obtained by the above method is attached to the power storage device 103, and the power storage device 103 and the display portion 102 are electrically connected to each other. Furthermore, a metal cover, a plastic cover, or a rubber cover may be provided over a portion other than the display portion 102 to improve the appearance of the electronic device 100.

In the case where the electronic device 100 is provided with the display portion 102, the screen size is not particularly limited. For example, the screen size of the display portion 102 may be smaller than or equal to the size of the board 112. For example, in the case where the electronic device is worn on an arm, the maximum screen size is the product of an arm girth of 23 cm and a wrist-to-elbow length because the girth of an adult arm near a wrist is 18 cm±5 cm. The wrist-to-elbow length of an adult is shorter than or equal to a feet (30.48 cm); thus, the maximum screen size of the display portion in the electronic device 100 that is worn on an arm is 23 cm×30.48 cm, which is the size of the board 112 in the form of a cylinder tube, for example. Note that the screen size here does not refer to the size in a curved state but refers to the size in a flat state. A plurality of display portions may be provided in one electronic device; for example, a second display portion smaller than a first display portion may be included in an electronic device. The dimension of the board 112 is preferably set larger than the screen size of the display portion. In the case of using EL elements, when the display portion is of such a screen size that it can be disposed over a support structure body, the sum of the weights of the display panel and the FPC can be more than or equal to 1 g and less than 10 g.

The thickness of the thinnest portion of the electronic device 100 provided with the display portion 102 can be less than or equal to 5 mm. The thickness of the thickest portion of the electronic device 100, which is a portion where the display portion 102 and the FPC are connected to each other, can be less than 1 cm.

The total weight of the electronic device 100 can be less than 100 g.

The electronic device 100 can be put on an arm because part of the support structure body can be moved in the direction of the arrows 105 as illustrated in the cross-sectional views of FIG. 2A and the like. The electronic device 100 has a total weight less than 100 g, preferably less than or equal to 50 g and a small maximum thickness less than or equal to 1 cm; thus, a lightweight electronic device can be provided.

For example, in this specification and the like, a display element, a display device which is a device including a display element, a light-emitting element, and a light-emitting device which is a device including a light-emitting element can employ a variety of modes or can include a variety of elements. The display element, the display device, the light-emitting element, or the light-emitting device includes at least one of an electroluminescent (EL) element (e.g., an EL element including organic and inorganic materials, an organic EL element, or an inorganic EL element), an LED (e.g., a white LED, a red LED, a green LED, or a blue LED), a transistor (a transistor that emits light depending on current), an electron emitter, a liquid crystal element, electronic ink, an electrophoretic element, a grating light valve (GLV), a plasma display panel (PDP), a display element using micro electro mechanical systems (MEMS), a digital micromirror device (DMD), a digital micro shutter (DMS), MIRASOL (registered trademark), an interferometric modulator display (IMOD) element, a MEMS shutter display element, an optical-interference-type MEMS display element, an electrowetting element, a piezoelectric ceramic display, a display element including a carbon nanotube, and the like. In addition to that, display media whose contrast, luminance, reflectivity, transmittance, or the like is changed by electrical or magnetic effect may be included. Examples of display devices including EL elements include an EL display. Display devices including electron emitters include a field emission display (FED), an SED-type flat panel display (SED: surface-conduction electron-emitter display), and the like. Examples of display devices including liquid crystal elements include a liquid crystal display (e.g., a transmissive liquid crystal display, a transflective liquid crystal display, a reflective liquid crystal display, a direct-view liquid crystal display, or a projection liquid crystal display). Examples of a display device including electronic ink, Electronic Liquid Powder (registered trademark), or an electrophoretic element include electronic paper. In the case of a transflective liquid crystal display or a reflective liquid crystal display, some or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption. Note that in the case of using an LED, graphene or graphite may be provided under an electrode or a nitride semiconductor of the LED. Graphene or graphite may be a multilayer film in which a plurality of layers are stacked. When graphene or graphite is provided in this manner, a nitride semiconductor, for example, an n-type GaN semiconductor layer including crystals can be easily formed thereover. Furthermore, a p-type GaN semiconductor layer including crystals or the like can be provided thereover, and thus the LED can be formed. Note that an AlN layer may be provided between the n-type GaN semiconductor layer including crystals and graphene or graphite. The GaN semiconductor layers included in the LED may be formed by MOCVD. Note that when the graphene is provided, the GaN semiconductor layers included in the LED can also be formed by a sputtering method.

In addition to the display device, the electronic device of one embodiment of the present invention may include another semiconductor circuit, e.g., a control circuit for preventing overcharge, an imaging element, a sensor such as a gyroscope sensor or an acceleration sensor, a touch panel, or the like. Furthermore, a sensor or the like for measuring a pulse, a surface temperature, a blood oxygen level, or the like by touch on part of a human body may be included. For example, when an imaging element is included in addition to the display device, a taken image can be displayed on the display device. When a sensor such as a gyroscope sensor or an acceleration sensor is included, the arm-worn electronic device can be powered on or off depending on the orientation or movement thereof to reduce power consumption. When a touch panel is included, the electronic device can be operated or information can be input by touching a predetermined position of the touch panel. When a memory and a CPU are included in addition to the display device in the above structure, a wearable computer can be obtained.

When the electronic device of one embodiment of the present invention is used as the display portion of the arm-worn electronic device together with a display portion of a conventional portable information terminal, the electronic device of one embodiment of the present invention can be used as a sub-display.

This embodiment can be implemented in appropriate combination with any of the other embodiments.

Embodiment 2

In this embodiment, an example of a display device that can be used in an electronic device of one embodiment of the present invention will be described.

[Top View of Display Device]

Figure 20:
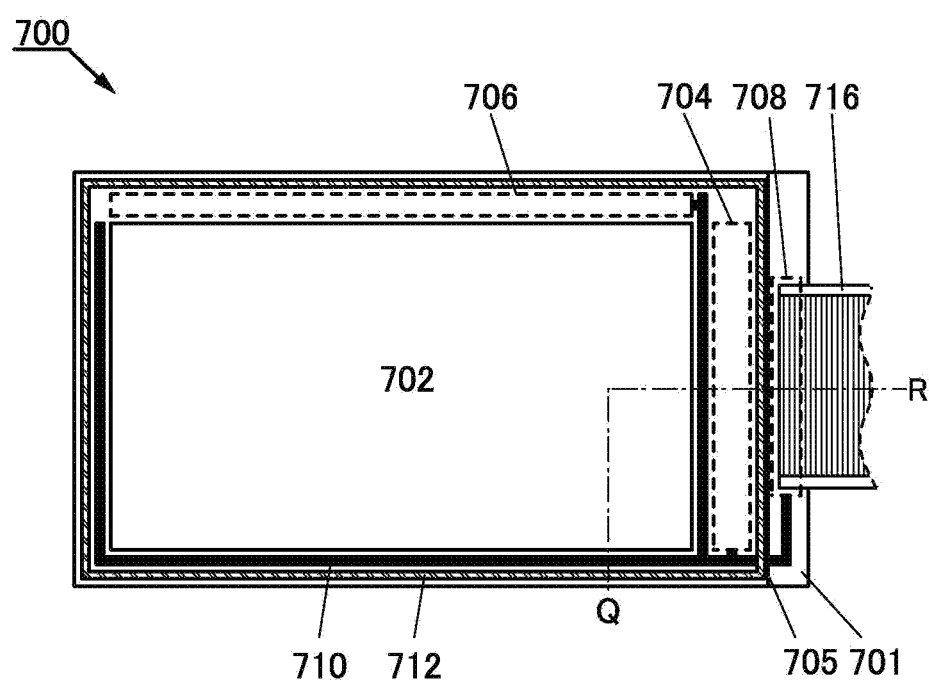
FIG. 20 is a top view of a display device.

FIG. 20 is a top view of an example of a display device. A display device 700 illustrated in FIG. 20 includes a pixel portion 702 provided over a first substrate 701; a source driver circuit portion 704 and a gate driver circuit portion 706 provided over the first substrate 701; a sealant 712 provided to surround the pixel portion 702, the source driver circuit portion 704, and the gate driver circuit portion 706; and a second substrate 705 provided to face the first substrate 701. The first substrate 701 and the second substrate 705 are sealed with the sealant 712. That is, the pixel portion 702, the source driver circuit portion 704, and the gate driver circuit portion 706 are sealed with the first substrate 701, the sealant 712, and the second substrate 705. Although not illustrated in FIG. 20, a display element is provided between the first substrate 701 and the second substrate 705.

In the display device 700, a flexible printed circuit (FPC) terminal portion 708 electrically connected to the pixel portion 702, the source driver circuit portion 704, and the gate driver circuit portion 706 is provided in a region different from the region which is surrounded by the sealant 712 and positioned over the first substrate 701. Furthermore, an FPC 716 is connected to the FPC terminal portion 708, and a variety of signals and the like are supplied to the pixel portion 702, the source driver circuit portion 704, and the gate driver circuit portion 706 through the FPC 716. Furthermore, a signal line 710 is connected to the pixel portion 702, the source driver circuit portion 704, the gate driver circuit portion 706, and the FPC terminal portion 708. A variety of signals and the like are applied to the pixel portion 702, the source driver circuit portion 704, the gate driver circuit portion 706, and the FPC terminal portion 708 via the signal line 710 from the FPC 716.

A plurality of gate driver circuit portions 706 may be provided in the display device 700. An example of the display device 700 in which the source driver circuit portion 704 and the gate driver circuit portion 706 are formed over the first substrate 701 where the pixel portion 702 is also formed is described; however, the structure is not limited thereto. For example, only the gate driver circuit portion 706 may be formed over the first substrate 701 or only the source driver circuit portion 704 may be formed over the first substrate 701. In this case, a substrate where a source driver circuit, a gate driver circuit, or the like is formed (e.g., a driver-circuit substrate formed using a single-crystal semiconductor film or a polycrystalline semiconductor film) may be mounted on the first substrate 701. Note that there is no particular limitation on the method of connecting a separately prepared driver circuit substrate, and a chip on glass (COG) method, a wire bonding method, or the like can be used.

The pixel portion 702, the source driver circuit portion 704, and the gate driver circuit portion 706 included in the display device 700 include a wiring portion or a plurality of transistors. As the wiring portion or the plurality of transistors, any of the semiconductor devices of embodiments of the present invention can be used.

The display device 700 can include any of a variety of elements. Examples of the elements include a liquid crystal element, an electroluminescence (EL) element (e.g., an EL element including organic and inorganic materials, an organic EL element, or an inorganic EL element), an LED (e.g., a white LED, a red LED, a green LED, or a blue LED), a transistor (a transistor that emits light depending on current), an electron emitter, electronic ink, an electrophoretic element, a GLV, a PDP, a display element using MEMS, a DMD, a DMS, MIRASOL (registered trademark), an IMOD element, a MEMS shutter display element, an optical-interference-type MEMS display element, an electrowetting element, a piezoelectric ceramic display, and a display element including a carbon nanotube, which are display media whose contrast, luminance, reflectance, transmittance, or the like is changed by electrical or magnetic action.

As a display method in the display device 700, a progressive method, an interlace method, or the like can be employed. Furthermore, color elements controlled in a pixel at the time of color display are not limited to three colors of R, G, and B (R, G, and B correspond to red, green, and blue, respectively). For example, four pixels of an R pixel, a G pixel, a B pixel, and a W (white) pixel may be included. Alternatively, a color element may be composed of two colors among R, G, and B as in PenTile layout. The two colors may differ among color elements. Alternatively, one or more colors of yellow, cyan, magenta, and the like may be added to RGB. The size of a display region may be different between respective dots of the color components. Embodiments of the disclosed invention are not limited to a display device for color display; the disclosed invention can also be applied to a display device for monochrome display.

A coloring layer (also referred to as a color filter) may be used in order to obtain a full-color display device in which white light (W) for a backlight (e.g., an organic EL element, an inorganic EL element, an LED, or a fluorescent lamp) is used. As the coloring layer, red (R), green (G), blue (B), yellow (Y), or the like may be combined as appropriate, for example. With the use of the coloring layer, higher color reproducibility can be obtained than in the case without the coloring layer. In this case, by providing a region with the coloring layer and a region without the coloring layer, white light in the region without the coloring layer may be directly utilized for display. By partly providing the region without the coloring layer, a decrease in luminance due to the coloring layer can be suppressed, and approximately 20% to 30% of power consumption can be reduced in some cases when an image is displayed brightly. Note that in the case where full-color display is performed using a self-luminous element such as an organic EL element or an inorganic EL element, elements may emit light of their respective colors R, G, B, Y, and white (W). By using a self-luminous element, power consumption can be further reduced as compared to the case of using the coloring layer in some cases.

In this embodiment, structures including a liquid crystal element and an EL element as display elements will be described with reference to FIGS. 21 to 24. Note that FIG. 21 is a cross-sectional view along the dashed-dotted line Q-R shown in FIG. 20 and shows a structure including a liquid crystal element as a display element, whereas FIG. 24 is a cross-sectional view along the dashed-dotted line Q-R shown in FIG. 20 and shows a structure including an EL element as a display element.

Figure 21:
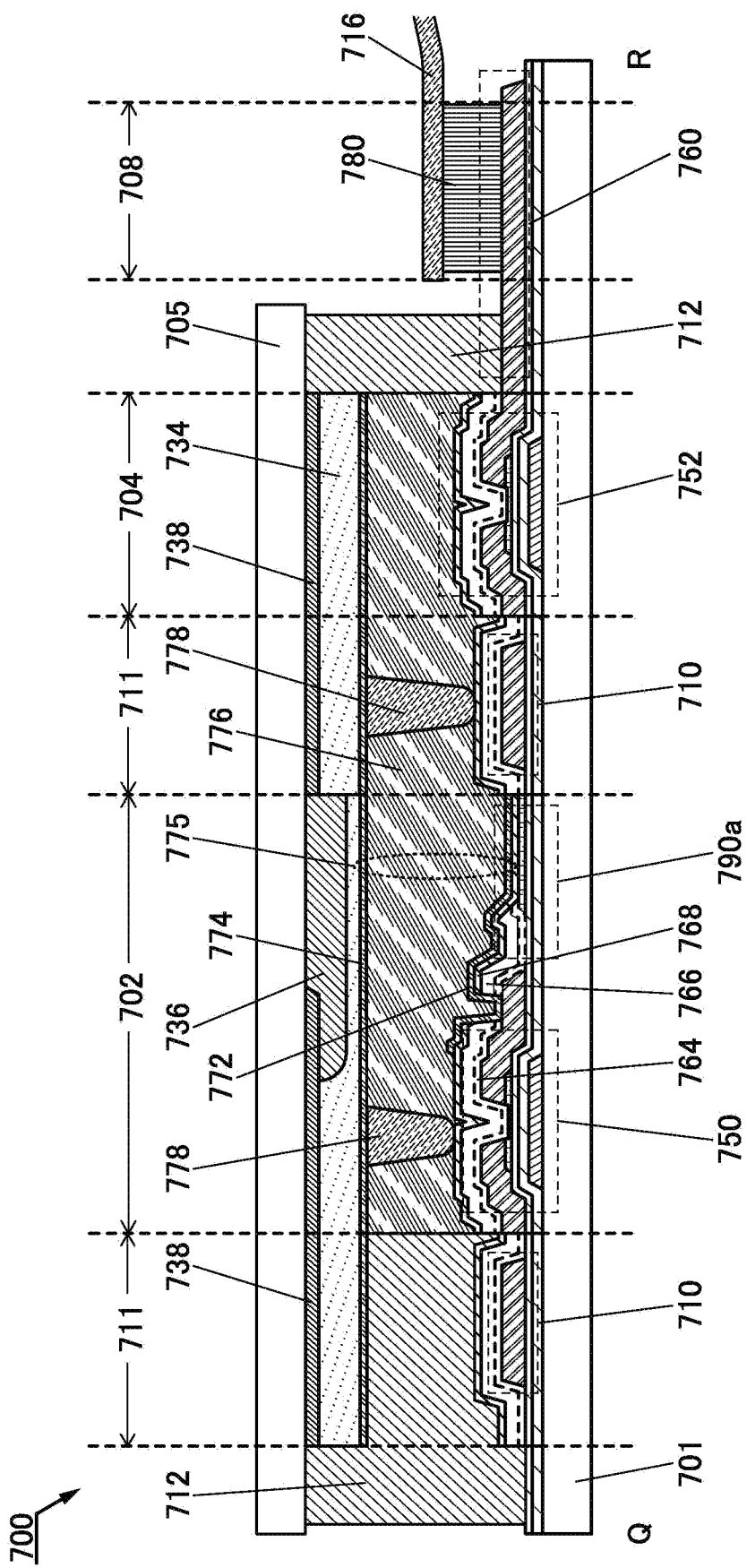
FIG. 21 is a cross-sectional view of a display device.
Figure 24:
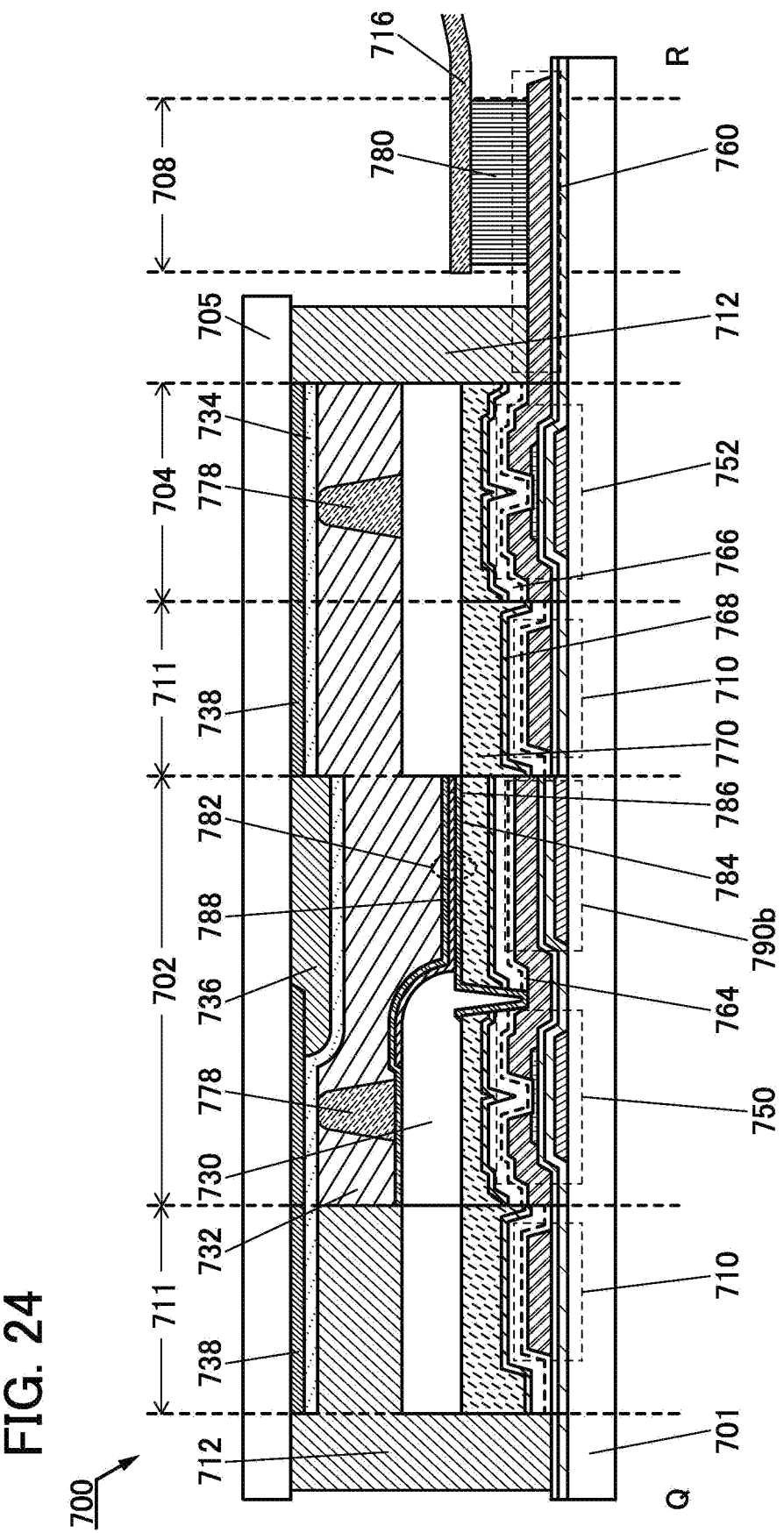
FIG. 24 is a cross-sectional view of a display device.

Common portions between FIG. 21 and FIG. 24 are described first, and then different portions are described.

[Common Portions in Display Devices]

The display device 700 illustrated in each of FIGS. 21 and 24 includes a lead wiring portion 711, the pixel portion 702, the source driver circuit portion 704, and the FPC terminal portion 708. The lead wiring portion 711 includes the signal line 710. The pixel portion 702 includes a transistor 750 and a capacitor 790 (a capacitor 790a or a capacitor 790b). The source driver circuit portion 704 includes a transistor 752.

The signal line 710 is formed through the same process as conductive films functioning as a source electrode and a drain electrode of the transistor 750 or 752. Note that the signal line 710 may be formed using a conductive film which is formed through a different process from the source electrode and the drain electrode of the transistor 750 or 752, e.g., a conductive film functioning as a gate electrode. In the case where the signal line 710 is formed using a material containing a copper element, signal delay or the like due to wiring resistance is reduced, which enables display on a large screen.

Any of a variety of transistors can be used as the transistors 750 and 752. The transistors 750 and 752 each include a gate electrode 721, a semiconductor layer 722, and electrodes 723 and 724. In addition, an insulating film is provided between the semiconductor layer 722 and the gate electrode 721.

There is no particular limitation on the structure of the transistors, such as the transistor 750 and the transistor 752, in the light-emitting device 700. For example, a forward staggered transistor or an inverted staggered transistor may be used. A top-gate transistor or a bottom-gate transistor may be used. There is no particular limitation on a semiconductor material used for the transistors; for example, silicon, germanium, silicon carbide, or gallium nitride can be used. Alternatively, an oxide semiconductor containing at least one of indium, gallium, and zinc, such as an In—Ga—Zn-based metal oxide, may be used.

There is no particular limitation on the crystallinity of a semiconductor material used for the transistors, and an amorphous semiconductor or a semiconductor having crystallinity (a microcrystalline semiconductor, a polycrystalline semiconductor, a single-crystal semiconductor, or a semiconductor partly including crystal regions) may be used. It is preferable that a semiconductor having crystallinity be used, in which case deterioration of the transistor characteristics can be suppressed.

Here, an oxide semiconductor is preferably used for semiconductor devices such as transistors used for pixels, driver circuits, touch sensors, and the like. In particular, an oxide semiconductor having a wider band gap than silicon is preferably used. A semiconductor material having a wider band gap and a lower carrier density than silicon is preferably used because off-state current of the transistor can be reduced.

For example, the oxide semiconductor preferably contains at least indium (In) or zinc (Zn). More preferably, the oxide semiconductor contains an oxide represented by an In-M-Zn-based oxide (M is a metal which is any one of Al, Ti, Ga, Ge, Y, Zr, Sn, La, Ce, and Hf).

As the semiconductor layer, it is particularly preferable to use an oxide semiconductor film including a plurality of crystal parts whose c-axes are aligned perpendicular to a surface on which the semiconductor layer is formed or the top surface of the semiconductor layer and in which the adjacent crystal parts have no grain boundary.

There is no grain boundary in such an oxide semiconductor; therefore, generation of a crack in an oxide semiconductor film which is caused by stress when a display panel is bent is prevented. Therefore, such an oxide semiconductor can be preferably used for a flexible display panel which is used in a bent state, or the like.

The use of such materials for the semiconductor layer makes it possible to provide a highly reliable transistor in which a change in the electrical characteristics is suppressed.

Charge accumulated in a capacitor through a transistor can be held for a long time because of the low off-state current of the transistor. When such a transistor is used for a pixel, operation of a driver circuit can be stopped while a gray scale of an image displayed in each display region is maintained. As a result, an electronic device with an extremely low power consumption can be obtained.

For stable characteristics of the transistor, a base film is preferably provided. The base film can be formed with an inorganic insulating film such as a silicon oxide film, a silicon nitride film, a silicon oxynitride film, or a silicon nitride oxide film to have a single-layer structure or a stacked-layer structure. The base film can be formed by a sputtering method, a chemical vapor deposition (CVD) method (e.g., a plasma CVD method, a thermal CVD method, and a metal organic CVD (MOCVD) method), an atomic layer deposition (ALD) method, a coating method, a printing method, or the like. Note that the base film is not necessarily provided.

The FPC terminal portion 708 includes a connection electrode 760, an anisotropic conductive film 780, and the FPC 716. Note that the connection electrode 760 is formed through the same process as the conductive films functioning as the source electrode and the drain electrode of the transistor 750 or 752. The connection electrode 760 is electrically connected to a terminal included in the FPC 716 through the anisotropic conductive film 780.

For example, a glass substrate can be used as the first substrate 701 and the second substrate 705. As the glass substrate, a glass substrate having a curved surface may be used.

A substrate having flexibility may be used as the first substrate 701 and the second substrate 705. Examples of the substrate having flexibility include a plastic substrate. The substrate having flexibility may be attached to a board or the like.

A display device having flexibility can be manufactured with the use of the substrate having flexibility. When the display device has flexibility, the display device can be attached to a curved surface or an irregular shape, whereby a variety of applications are achieved.

For example, the substrate having flexibility such as a plastic substrate is used, whereby the display device can be thinner and more lightweight. In addition, the display device in which the substrate having flexibility such as a plastic substrate is used is hardly broken, and can withstand impacts well when dropped, for example.

Furthermore, a light-blocking film 738 functioning as a black matrix, a coloring film 736 functioning as a color filter, and an insulating film 734 in contact with the light-blocking film 738 and the coloring film 736 are provided on the second substrate 705 side.

A structure 778 is provided between the first substrate 701 and the second substrate 705. The structure 778 is a columnar spacer obtained by selective etching of an insulating film and is provided to control the distance (cell gap) between the first substrate 701 and the second substrate 705. Note that a spherical spacer may be used as the structure 778. Although the example in which the structure 778 is provided on the second substrate 705 side is illustrated in FIG. 21, one embodiment of the present invention is not limited thereto. For example, as illustrated in FIG. 24, the structure 778 may be provided on the first substrate 701 side, or both the first substrate 701 and the second substrate 705 may be provided with the structure 778.

In FIG. 21 and FIG. 24, insulating films 764, 766, and 768 are provided over the transistor 750, the transistor 752, and the capacitor 790.

The display device 700 may include a protective film 799. The protective film 799 is preferably formed uniformly. It is preferable to use an ALD method as an example of a method for forming the protective film 799. The protective film 799 has a function of protecting the display element and the transistors, for example. A protective film such as the protective film 799 may have another function, for example. Thus, the protective film such as the protective film 799 may be simply referred to as a film. For example, the protective film such as the protective film 799 may be referred to as a first film, a second film, or the like.

In the case where an oxide semiconductor is used for the semiconductor layer of the transistor 750 or 752, an insulating film having a blocking effect against oxygen, hydrogen, water, and the like is preferably provided as the insulating film 768 because it is possible to prevent outward diffusion of oxygen from the semiconductor layer of the transistor 750 or 752 and entry of hydrogen, water, and the like into the semiconductor layer from the outside. The insulating film 768 may function as a protective film.

The insulating film 768 can be formed using, for example, an insulating film containing at least one of aluminum oxide, magnesium oxide, silicon oxide, silicon oxynitride, silicon nitride oxide, silicon nitride, gallium oxide, germanium oxide, yttrium oxide, zirconium oxide, lanthanum oxide, neodymium oxide, hafnium oxide, and tantalum oxide. The insulating film 768 may be a stack of any of the above materials. The insulating film 768 may contain lanthanum (La), nitrogen, zirconium (Zr), or the like as an impurity.

[Structure Example of Display Device Using Liquid Crystal Element as Display Element]

The display device 700 illustrated in FIG. 21 includes the capacitor 790a. The capacitor 790a has a structure in which a dielectric is provided between a pair of electrodes.

In addition, the display device 700 illustrated in FIG. 21 includes a liquid crystal element 775. The liquid crystal element 775 includes a conductive film 772, a conductive film 774, and a liquid crystal layer 776. The conductive film 774 is provided on the second substrate 705 side and functions as a counter electrode. The display device 700 in FIG. 21 is capable of displaying an image in such a manner that light transmission or non-transmission is controlled by change in the alignment state of the liquid crystal layer 776 depending on a voltage applied between the conductive film 772 and the conductive film 774.

The conductive film 772 is connected to the conductive film functioning as the source electrode or the drain electrode included in the transistor 750. The conductive film 772 is formed over the insulating film 768 to function as a pixel electrode, i.e., one electrode of the display element.

The conductive film 772 can be formed using a light-transmitting conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide containing silicon oxide.

Although not illustrated in FIG. 21, alignment films may be provided on a side of the conductive film 772 in contact with the liquid crystal layer 776 and on a side of the conductive film 774 in contact with the liquid crystal layer 776. Although not illustrated in FIG. 21, an optical member (an optical substrate) and the like such as a polarizing member, a retardation member, or an anti-reflection member may be provided as appropriate. For example, circular polarization may be employed by using a polarizing substrate and a retardation substrate. In addition, a backlight, a sidelight, or the like may be used as a light source.

In the case where a liquid crystal element is used as the display element, a thermotropic liquid crystal, a low-molecular liquid crystal, a high-molecular liquid crystal, a polymer dispersed liquid crystal, a ferroelectric liquid crystal, an antiferroelectric liquid crystal, or the like can be used. Such a liquid crystal material exhibits a cholesteric phase, a smectic phase, a cubic phase, a chiral nematic phase, an isotropic phase, or the like depending on conditions.

Alternatively, in the case of employing a horizontal electric field mode, a liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase appears only in a narrow temperature range, a liquid crystal composition in which several weight percent or more of a chiral material is mixed is used for the liquid crystal layer in order to improve the temperature range. The liquid crystal composition containing a liquid crystal showing a blue phase and a chiral material has a short response time and optical isotropy, which eliminates the need for an alignment process and reduces viewing angle dependence. An alignment film does not need to be provided and rubbing treatment is thus not necessary; accordingly, electrostatic discharge damage caused by the rubbing treatment can be prevented and defects and damage of the liquid crystal display device in the manufacturing process can be reduced.

In the case where a liquid crystal element is used as the display element, a twisted nematic (TN) mode, an in-plane-switching (IPS) mode, a fringe field switching (FFS) mode, an axially symmetric aligned micro-cell (ASM) mode, an optical compensated birefringence (OCB) mode, a ferroelectric liquid crystal (FLC) mode, an antiferroelectric liquid crystal (AFLC) mode, or the like can be used.

Furthermore, a normally black liquid crystal display device such as a transmissive liquid crystal display device utilizing a vertical alignment (VA) mode may also be used. There are some examples of the vertical alignment mode; for example, a multi-domain vertical alignment (MVA) mode, a patterned vertical alignment (PVA) mode, an ASV mode, or the like can be employed.

Figure 22:
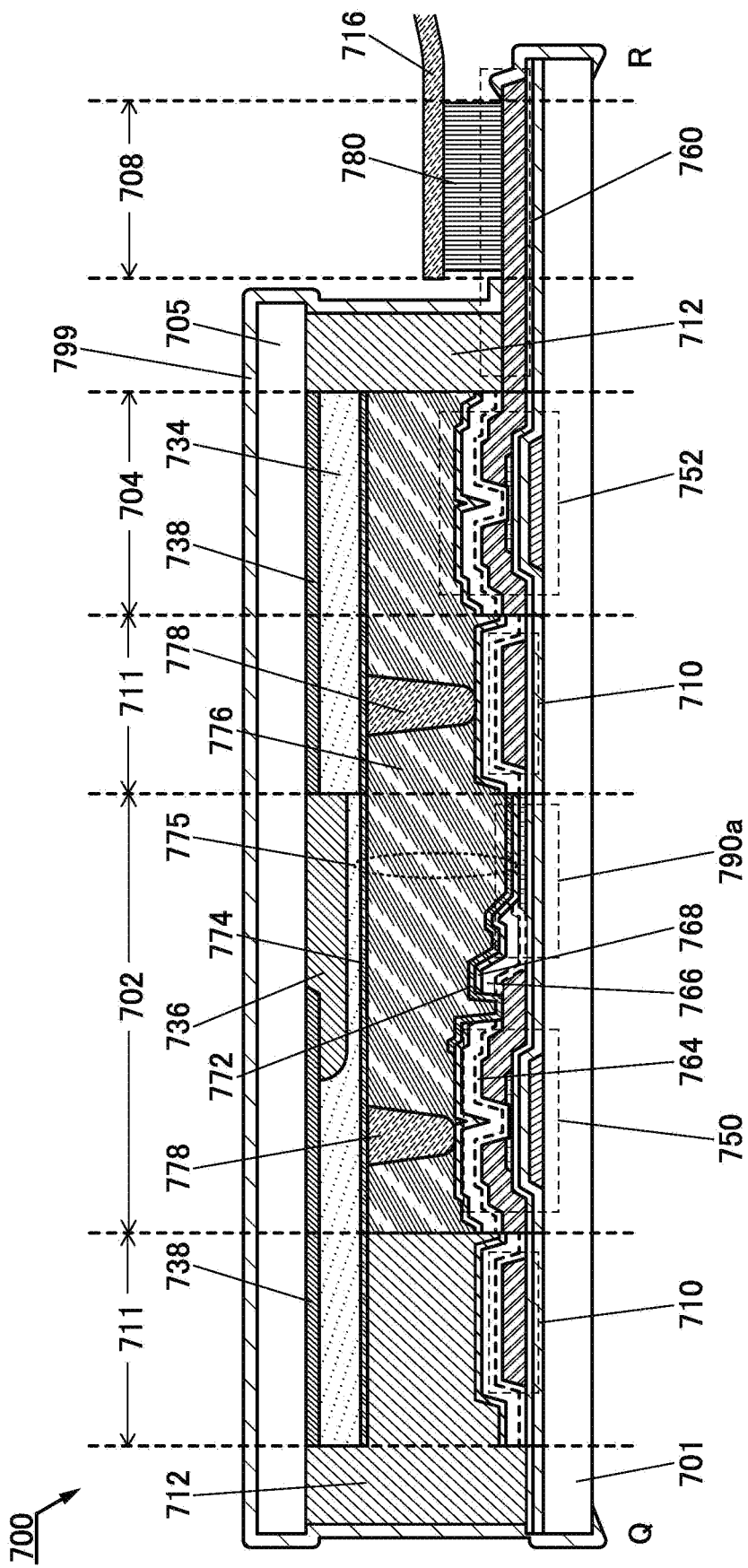
FIG. 22 is a cross-sectional view of a display device.
Figure 23:
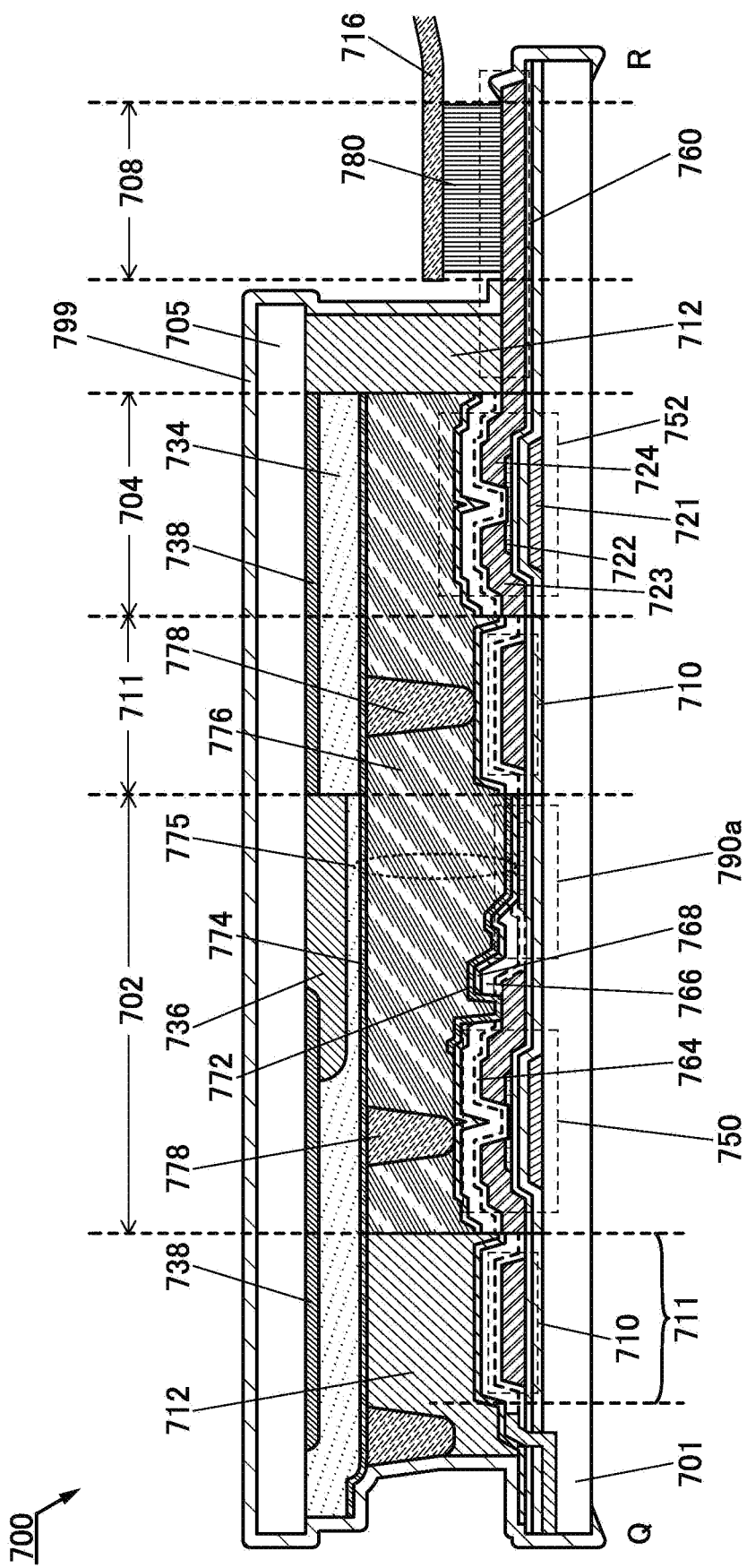
FIG. 23 is a cross-sectional view of a display device.

The display device 700 may include the protective film 799. FIGS. 22 and 23 each illustrate an example in which the display device 700 includes the protective film 799. In the example illustrated in FIG. 23, an end portion of the sealant has a recess. A method for forming the protective film 799 is described here. First, the first substrate 701 provided with the transistors and the like and the second substrate 705 provided with the coloring film 736 and the like are attached to each other with the sealant 712. Next, the protective film 799 is formed by an ALD method. Note that the protective film 799 can be prevented from being formed in a connection portion for the anisotropic conductive film 780 or the like by masking.

By an ALD method, a dense film can be formed extremely uniformly on a surface on which the film is formed. By using an ALD method, for example, aluminum oxide, hafnium oxide, zirconium oxide, titanium oxide, zinc oxide, indium oxide, tin oxide, indium tin oxide (ITO), tantalum oxide, silicon oxide, manganese oxide, nickel oxide, erbium oxide, cobalt oxide, tellurium oxide, barium titanate, titanium nitride, tantalum nitride, aluminum nitride, tungsten nitride, cobalt nitride, manganese nitride, hafnium nitride, and the like can be deposited as the protective film. Furthermore, the protective film is not limited to an insulating film, and a conductive film may also be deposited. For example, ruthenium, platinum, nickel, cobalt, manganese, copper, and the like can be deposited.

When the protective film 799 is formed on the side surface portion of the display panel by an ALD method, entry of external components such as moisture can be inhibited. As a result, a change in transistor characteristics can be inhibited and the operation of the peripheral circuit can be stable. Moreover, the frame size can be reduced, the pixel region can be enlarged, and the resolution of the display device can be increased.

With the protective film 799, even if a distance between an end portion of the peripheral circuit and the end portion of the substrate is decreased, the stable transistor characteristics are obtained, that is, the peripheral circuit operates stably because of a high barrier property of the protective film 799; thus, the frame of the display panel can be narrowed. For example, the distance between the peripheral circuit and the end portion of the substrate (a cut portion when the panel is processed) can be 300 μm or shorter, preferably 200 μm or shorter. Alternatively, the end portion of the display panel may have a structure with unevenness as illustrated in FIG. 23.

[Display Device Using Light-Emitting Element as Display Element]

The display device 700 illustrated in FIG. 24 includes the capacitor 790b. The capacitor 790b has a structure in which a dielectric is provided between a pair of electrodes. Specifically, a conductive film which is formed through the same process as a conductive film functioning as the gate electrode of the transistor 750 is used as one electrode of the capacitor 790b, and the conductive film functioning as the source electrode or the drain electrode of the transistor 750 is used as the other electrode of the capacitor 790b. Furthermore, an insulating film functioning as a gate insulating film of the transistor 750 is used as the dielectric between the pair of electrodes.

Furthermore, in FIG. 24, a planarization insulating film 770 is provided over the insulating film 768.

The planarization insulating film 770 can be formed using a heat-resistant organic material, such as a polyimide resin, an acrylic resin, a polyimide amide resin, a benzocyclobutene resin, a polyamide resin, and an epoxy resin. Note that the planarization insulating film 770 may be formed by stacking a plurality of insulating films formed using these materials. Alternatively, a structure without the planarization insulating film 770 as illustrated in FIG. 21 may be employed.

The display device 700 illustrated in FIG. 24 includes a light-emitting element 782. The light-emitting element 782 includes a conductive film 784, an EL layer 786, and a conductive film 788. The display device 700 illustrated in FIG. 24 is capable of displaying an image by light emission from the EL layer 786 included in the light-emitting element 782.

The conductive film 784 is connected to the conductive film functioning as the source electrode or the drain electrode included in the transistor 750. The conductive film 784 is formed over the planarization insulating film 770 to function as a pixel electrode, i.e., one electrode of the display element. A conductive film which transmits visible light or a conductive film which reflects visible light can be used for the conductive film 784. For example, a material including one kind selected from indium (In), zinc (Zn), and tin (Sn) is preferably used for the conductive film that transmits visible light. For example, a material including aluminum or silver is preferably used for the conductive film that reflects visible light.

In the display device 700 illustrated in FIG. 24, an insulating film 730 is provided over the planarization insulating film 770 and the conductive film 784. The insulating film 730 covers part of the conductive film 784. Note that the light-emitting element 782 has a top emission structure. Therefore, the conductive film 788 has a light-transmitting property and transmits light emitted from the EL layer 786. Although the top-emission structure is described as an example in this embodiment, one embodiment of the present invention is not limited thereto. A bottom-emission structure in which light is emitted to the conductive film 784 side, or a dual-emission structure in which light is emitted to both the conductive film 784 side and the conductive film 788 side may be employed.

The coloring film 736 is provided to overlap with the light-emitting element 782, and the light-blocking film 738 is provided to overlap with the insulating film 730 and to be included in the lead wiring portion 711 and in the source driver circuit portion 704. The coloring film 736 and the light-blocking film 738 are covered with the insulating film 734. A space between the light-emitting element 782 and the insulating film 734 is filled with a sealing film 732. Although the coloring film 736 is provided in the example of the display device 700 illustrated in FIG. 24, one embodiment of the present invention is not limited thereto. In the case where the EL layer 786 is formed by a separate coloring method, the coloring film 736 is not necessarily provided.

Figure 25:
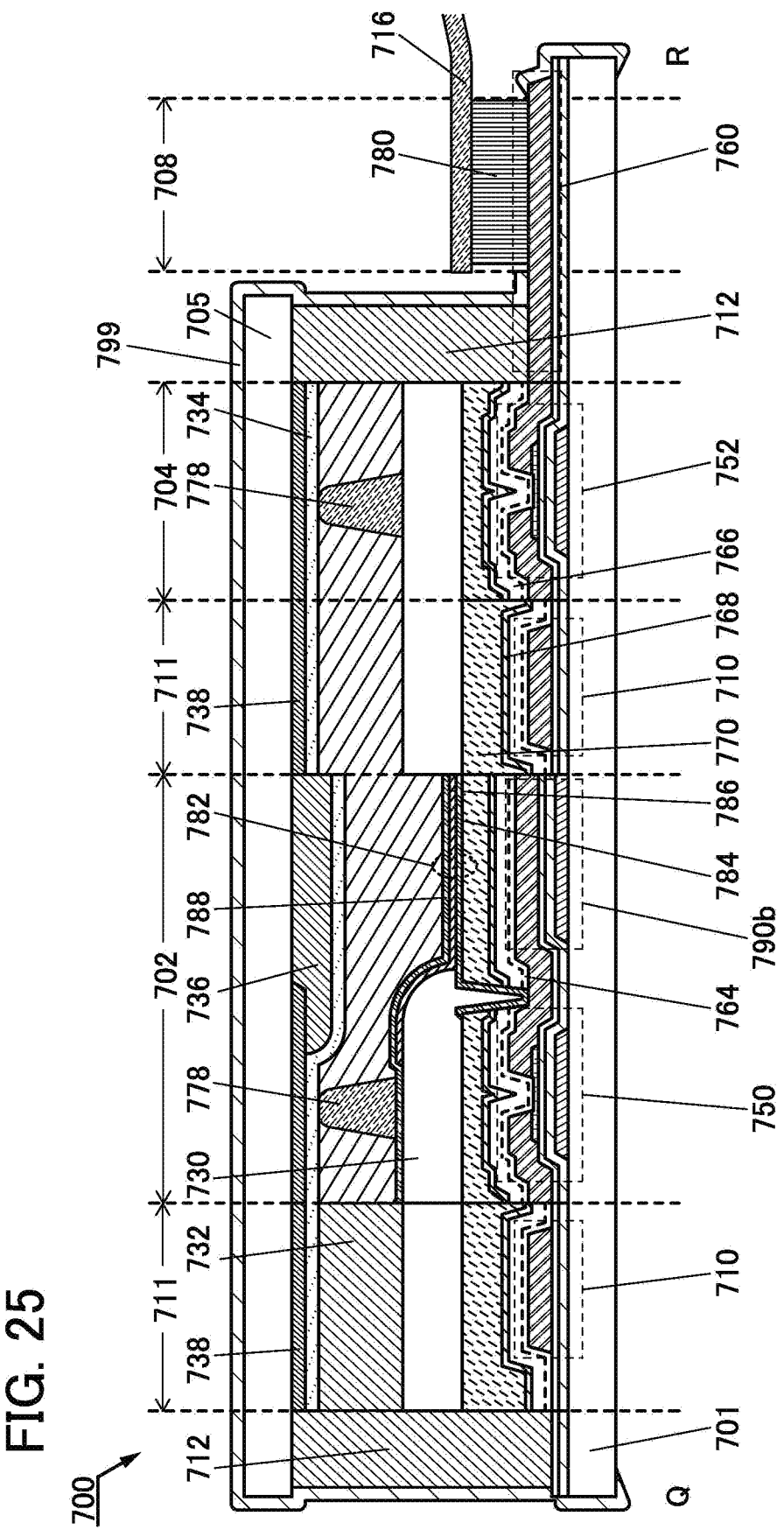
FIG. 25 is a cross-sectional view of a display device.

The display device 700 may include the protective film 799 as illustrated in FIG. 25. When the protective film 799 is formed in a side surface portion of the display panel by an ALD method, entry of external components such as moisture can be inhibited. This is preferable particularly in the case where an organic EL layer is used as the EL layer 786 because the inhibition of the entry of moisture can suppress the deterioration of the EL layer and can increase the lifetime of the light-emitting element.

The protective film 799 may be formed, for example, after the first substrate 701 provided with the transistors, the light-emitting element, and the like and the second substrate 705 are attached to each other.

This embodiment can be implemented in appropriate combination with any of the other embodiments.

Embodiment 3

In this embodiment, an example of a method for charging a power storage device by wireless power feeding will be described. For wireless power feeding, an electric field, a magnetic field, an electromagnetic wave, or the like can be used. An antenna, a coil, or the like can be used for receiving an electric field, a magnetic field, an electromagnetic wave, or the like.

An electronic device of one embodiment of the present invention preferably includes an antenna, a coil, or the like for receiving an electric field, a magnetic field, an electromagnetic wave, or the like. The electronic device of one embodiment of the present invention preferably includes a capacitor for charging.

When a coupling coil and a coupling capacitor are used, the power storage device can be charged without contact. An antenna can be used instead of a coupling coil. Here, a secondary battery is used as the power storage device, for example. By an electromagnetic induction method in which a primary coil of a charger and a secondary coil of the electronic device are magnetically coupled and a voltage is generated at the secondary coil with an alternating magnetic field generated from the primary coil, electric power is transmitted to the secondary coil side without contact. Through this mechanism, the secondary battery is charged. It is preferable that the coil be provided in contact with a curved surface of a structure body; therefore, it is preferable that the coil of the electronic device be provided over a flexible film. Here, the coil provided in the electronic device may be used as an antenna.

The secondary battery in an arm-worn electronic device including a display module may be provided with an antenna for purposes other than contactless charging of the secondary battery. A memory may be further provided, and an antenna that enables electronic data transmission and reception or an antenna that enables display of position or time with a GPS function by obtaining positional information or GPS time may be provided.

Since the electronic device is to be in contact with part of a human body, it is preferable for safety that input and output terminals for charging or discharging the secondary battery not be exposed. In the case where the input and output terminals are exposed, the input and output terminals might short-circuit by water such as rain, or the input and output terminals might be in contact with a human body and cause an electric shock. The use of an antenna enables a structure in which the input and output terminals are not exposed on a surface of the electronic device.

Note that this embodiment is the same as Embodiment 1 except that an antenna, a coil, and a converter for wireless power feeding are provided; therefore, the other components are not described in detail here.

As in Embodiment 1, a power storage device, here, a secondary battery is fixed to a board, and a display module is attached to the secondary battery. The secondary battery preferably has a bent shape. Furthermore, the secondary battery preferably has flexibility. A converter for wireless power feeding and an antenna which are electrically connected to the secondary battery are provided. The converter for wireless power feeding is fixed so as to overlap with part of a display portion.

The converter for wireless power feeding and the antenna weigh less than or equal to 10 g, and the total weight does not significantly differ from that in Embodiment 1.

Figure 12:
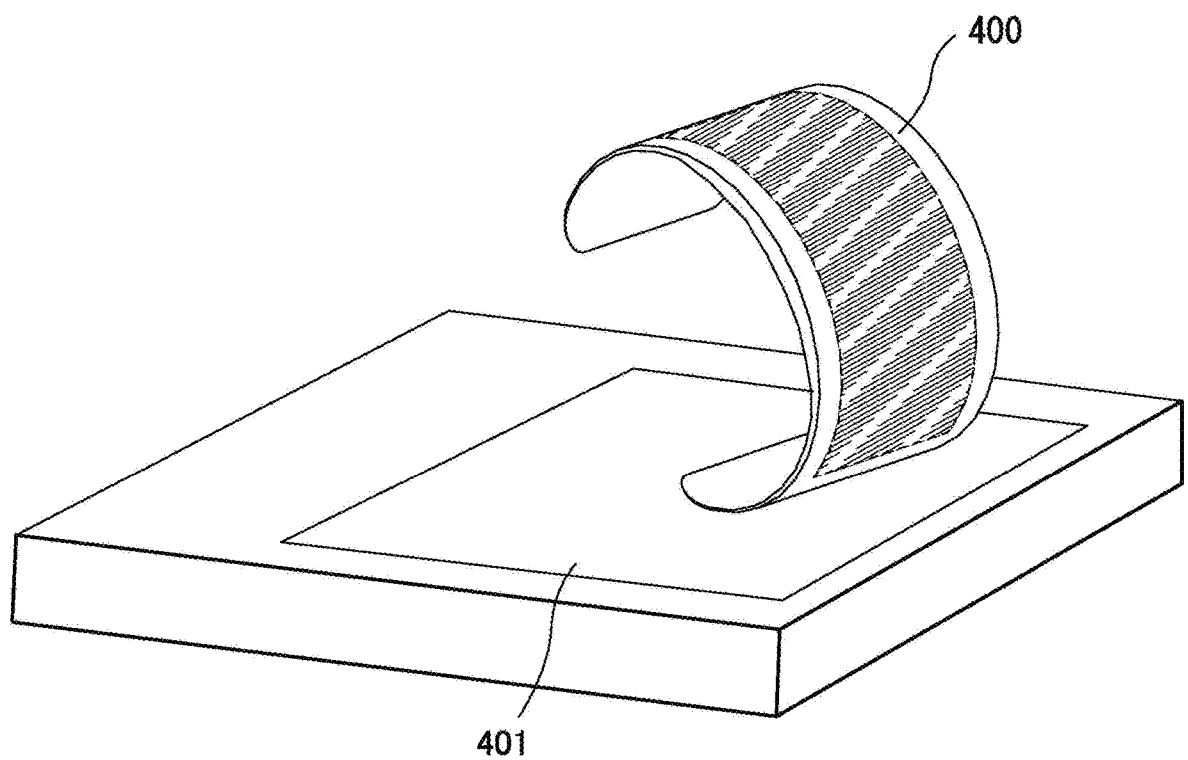
FIG. 12 is a perspective view illustrating an electronic device of one embodiment of the present invention.

FIG. 12 is a schematic diagram of an electronic device 400 including an antenna (not illustrated) and a charger 401.

When the electronic device 400 is disposed over the charger 401, electric power can be supplied from an antenna of the charger 401 to the electronic device 400 to charge a secondary battery of the electronic device 400.

Information such as the remaining amount or time to full charge can be displayed on a display portion of the electronic device 400.

This embodiment can be implemented in appropriate combination with any of the other embodiments.

Embodiment 4

In this embodiment, examples of a method for manufacturing the thin storage battery described in Embodiment 1 and a structure of a coin-type storage battery will be described.

[Method for Manufacturing Thin Secondary Battery]

A method for manufacturing the thin secondary battery whose exterior body includes a film, which is described in Embodiment 1, will be described. FIG. 10 is an external view of the thin secondary battery. FIG. 11A illustrates a cross section taken along the dashed-dotted line A1-A2 in FIG. 10, and FIG. 11B illustrates a cross section taken along the dashed-dotted line B1-B2 in FIG. 10.

A method for manufacturing the thin secondary battery will be described.

Figure 13A:
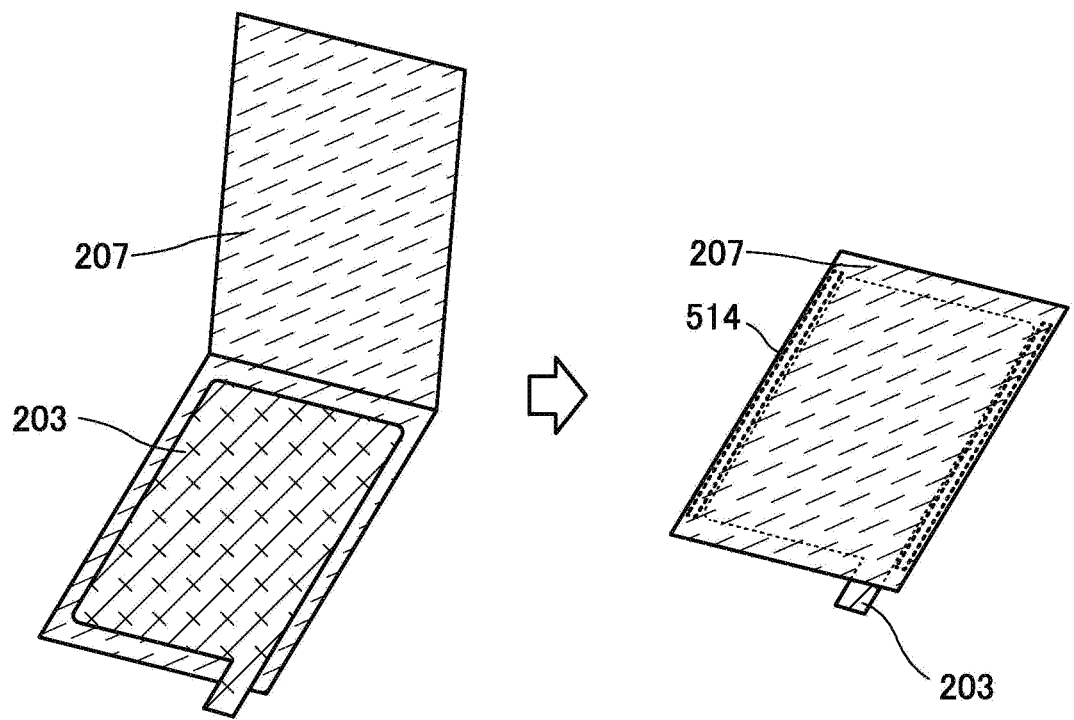
FIGS. 13A and 13B illustrate a method for manufacturing a thin storage battery.
Figure 13B:
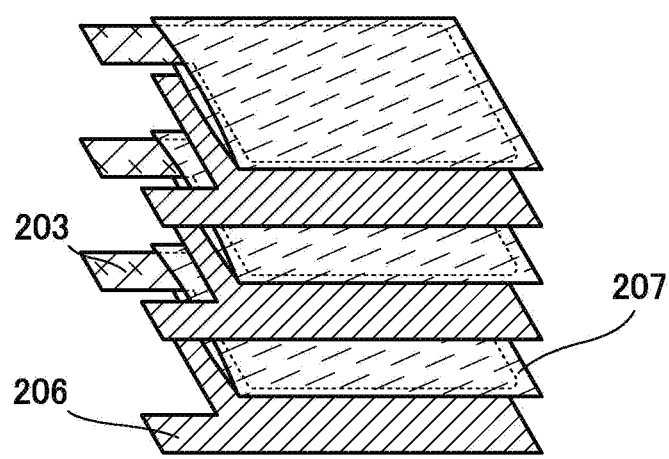

The separator 207 is preferably formed to have a bag-like shape to surround one of the positive electrode 203 and the negative electrode 206. For example, as illustrated in FIG. 13A, the separator 207 is folded in two so that the positive electrode 203 is sandwiched, and sealed with a sealing member 514 in a region outside the region overlapping with the positive electrode 203; thus, the positive electrode 203 can be reliably supported inside the separator 207. Then, as illustrated in FIG. 13B, the positive electrodes 203 surrounded by the separators 207 and the negative electrodes 206 are alternately stacked and provided in the exterior body 209, whereby the thin secondary battery can be formed.

Figure 14A:
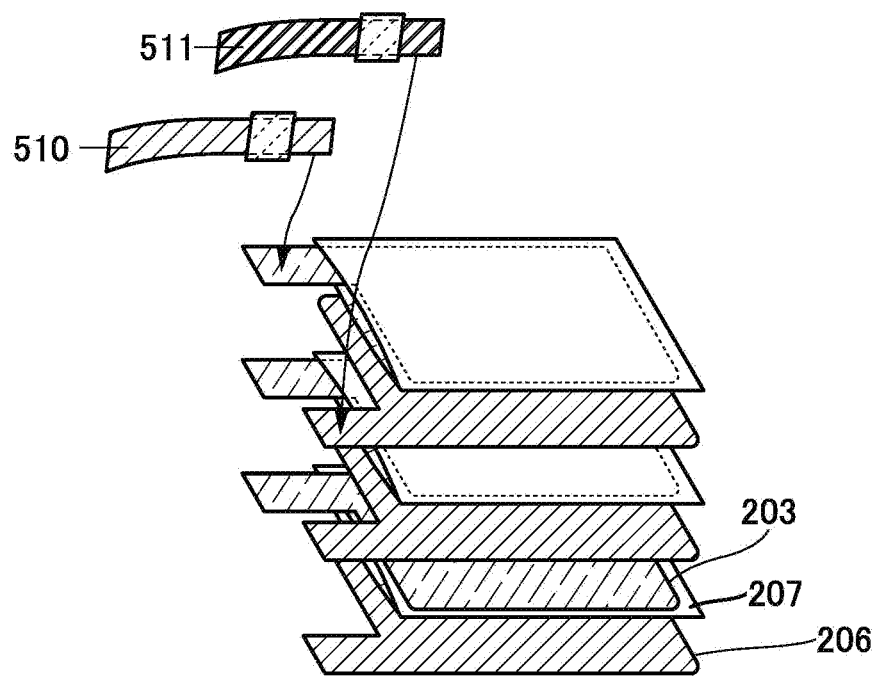
FIGS. 14A and 14B illustrate a method for manufacturing a thin storage battery.
Figure 14B:
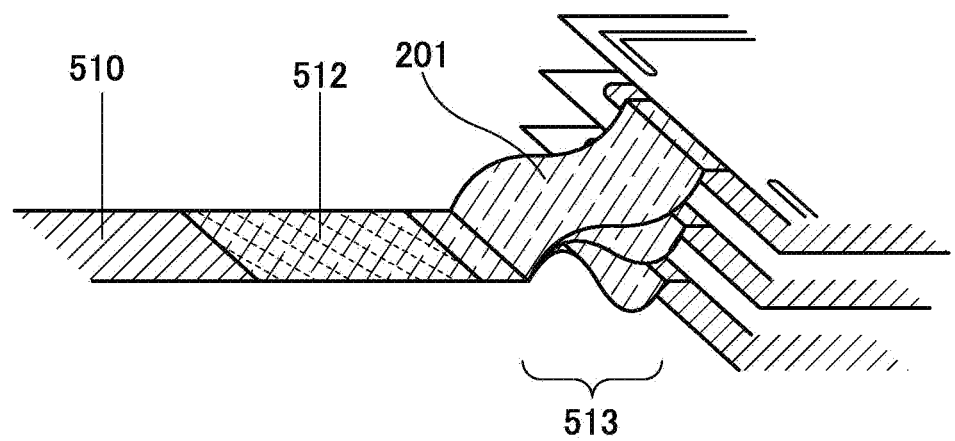

FIG. 14B illustrates an example where a current collector is welded to a lead electrode, specifically, an example where the positive electrode current collectors 201 are welded to the positive electrode lead electrode 510. The positive electrode current collectors 201 are welded to the positive electrode lead electrode 510 in a welding region 512 by ultrasonic welding or the like. The positive electrode current collector 201 includes a bent portion 513 as illustrated in FIG. 14B, and it is therefore possible to relieve stress due to external force applied after fabrication of the thin secondary battery. Thus, the thin secondary battery can have high reliability.

In the thin secondary battery illustrated in FIGS. 13A and 13B and FIGS. 14A and 14B, the positive electrode lead electrode 510 and the positive electrode current collectors 201 included in the positive electrodes 203 are welded to each other by ultrasonic welding, and the negative electrode lead electrode 511 and the negative electrode current collectors 204 included in the negative electrodes 206 are welded to each other by ultrasonic welding. The positive electrode current collector 201 and the negative electrode current collector 204 can double as terminals for electrical contact with the outside. In that case, the positive electrode current collector 201 and the negative electrode current collector 204 may be arranged so that part of the positive electrode current collector 201 and part of the negative electrode current collector 204 are exposed to the outside of the exterior body 209 without using lead electrodes.

Figure 15:
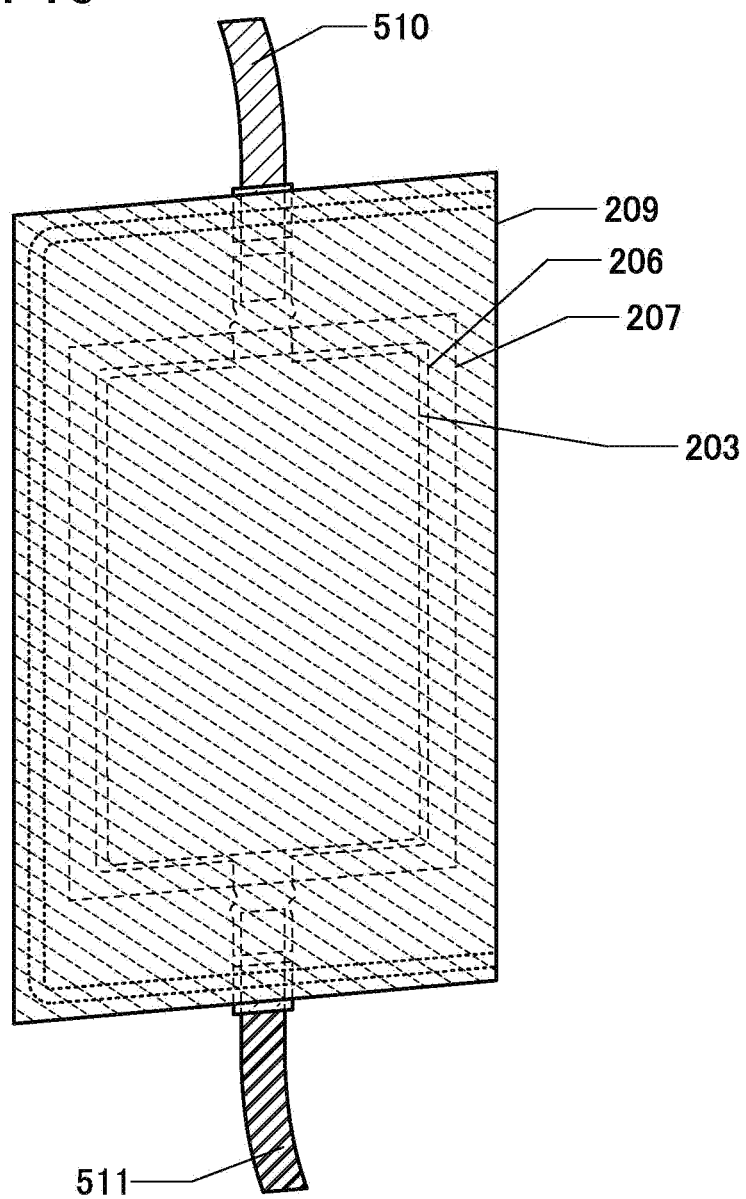
FIG. 15 is an external view of a thin storage battery.

Although the positive electrode lead electrode 510 and the negative electrode lead electrode 511 are provided on the same side in FIG. 10, the positive electrode lead electrode 510 and the negative electrode lead electrode 511 may be provided on different sides as illustrated in FIG. 15. The lead electrodes of a storage battery of one embodiment of the present invention can be freely positioned as described above; therefore, the degree of freedom in design is high. Accordingly, a product including a storage battery of one embodiment of the present invention can have a high degree of freedom in design. Furthermore, the yield of products each including a storage battery of one embodiment of the present invention can be increased.

As the exterior body 209 in the thin storage battery, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

The example in FIGS. 11A and 11B includes five sets of combinations of positive electrode and negative electrode active material layers (the positive electrode and negative electrode active material layers of each set face each other with a separator provided therebetween). It is needless to say that the number of sets of combinations of active material layers is not limited to five, and may be more than five or less than five. In the case of using a large number of active material layers, the storage battery can have high capacity. In contrast, in the case of using a small number of active material layers, the storage battery can have a small thickness and high flexibility.

In the above structure, the exterior body 209 of the secondary battery can change its shape with a radius of curvature greater than or equal to 30 mm, preferably greater than or equal to 10 mm. One or two films are used as the exterior body of the secondary battery. In the case where the secondary battery has a layered structure, the secondary battery has a cross section sandwiched between two curved surfaces of the films when it is bent.

Figure 16A:
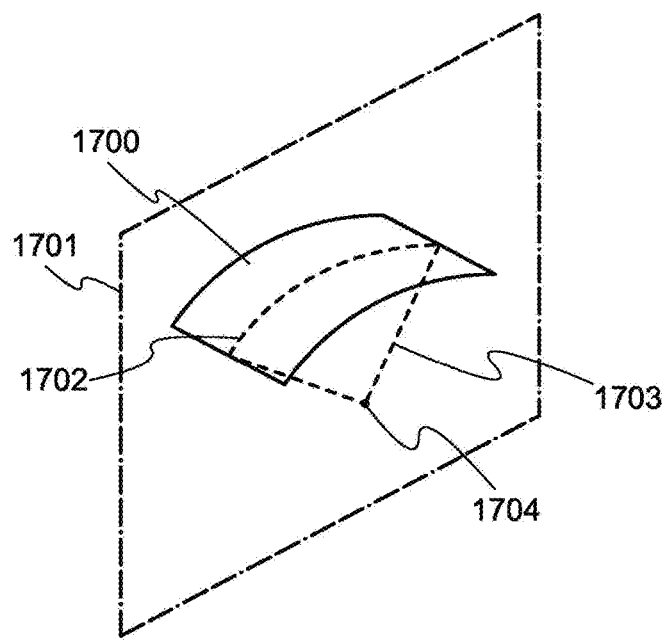
FIGS. 16A to 16C illustrate a radius of curvature of a surface.
Figure 16B:
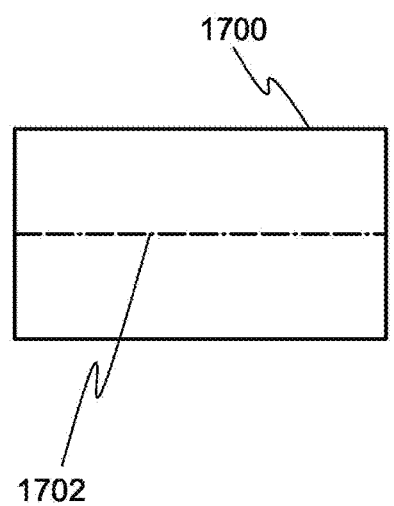
Figure 16C:
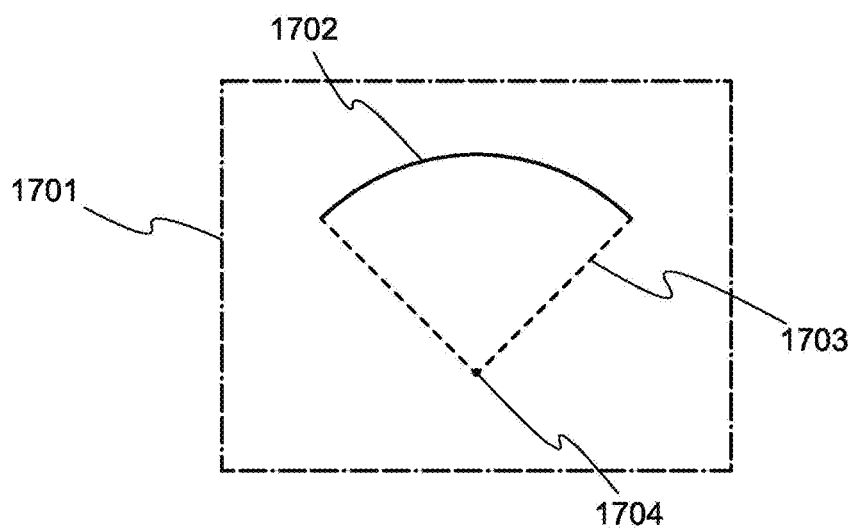

Description is given of the radius of curvature of a surface with reference to FIGS. 16A to 16C. In FIG. 16A, on a plane 1701 along which a curved surface 1700 is cut, part of a curve 1702 of the curved surface 1700 is approximate to an arc of a circle, and the radius of the circle is referred to as a radius 1703 of curvature and the center of the circle is referred to as a center 1704 of curvature. FIG. 16B is a top view of the curved surface 1700. FIG. 16C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

Figure 17A:
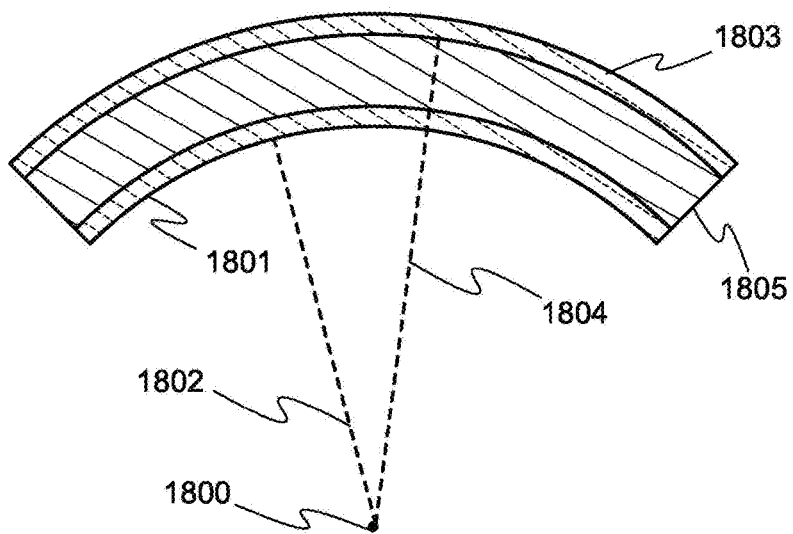
FIGS. 17A to 17D illustrate a radius of curvature of a film.
Figure 17B:
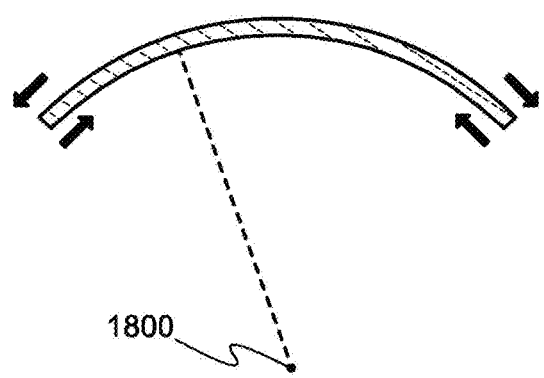

In the case of bending a secondary battery in which a component 1805 including electrodes and an electrolytic solution is sandwiched between two films as exterior bodies, a radius 1802 of curvature of a film 1801 on the side closer to a center 1800 of curvature of the secondary battery is smaller than a radius 1804 of curvature of a film 1803 on the side farther from the center 1800 of curvature (FIG. 17A). When the secondary battery is curved and has an arc-shaped cross section, compressive stress is applied to a surface of the film on the side closer to the center 1800 of curvature and tensile stress is applied to a surface of the film on the side farther from the center 1800 of curvature (FIG. 17B). However, by forming a pattern including projections or depressions on surfaces of the exterior bodies, the influence of a strain can be reduced to be acceptable even when compressive stress and tensile stress are applied. For this reason, the secondary battery can change its shape such that the exterior body on the side closer to the center of curvature has a curvature radius greater than or equal to 30 mm, preferably greater than or equal to 10 mm.

Figure 17C:
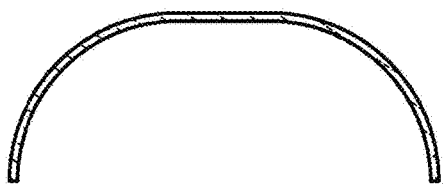
Figure 17D:

Note that the cross-sectional shape of the secondary battery is not limited to a simple arc shape, and the cross section can be partly arc-shaped; for example, a shape illustrated in FIG. 17C, a wavy shape illustrated in FIG. 17D, or an S shape can be used. When the curved surface of the secondary battery has a shape with a plurality of centers of curvature, the secondary battery can change its shape such that a curved surface with the smallest radius of curvature among radii of curvature with respect to the plurality of centers of curvature, which is a surface of the exterior body on the side closer to the center of curvature, has a curvature radius greater than or equal to 30 mm, preferably greater than or equal to 10 mm.

Next, aging after fabrication of the secondary battery will be described. Aging is preferably performed after fabrication of the secondary battery. The aging can be performed under the following conditions, for example. Charge is performed at a rate of 0.001 C or more and 0.2 C or less at a temperature higher than or equal to room temperature and lower than or equal to 40° C., for example. In the case where an electrolytic solution is decomposed and a gas is generated and accumulated in the cell, the electrolytic solution cannot be in contact with a surface of the electrode in some regions. That is to say, an effectual reaction area of the electrode is reduced and effectual current density is increased.

When the current density is too high, a voltage drop occurs depending on the resistance of the electrode, and deposition of lithium on the surface of the active material proceeds in parallel with the intercalation of lithium into the active material. The lithium deposition might reduce capacity. For example, if a coating film or the like grows on the surface after lithium deposition, lithium deposited on the surface cannot be dissolved. This lithium cannot contribute to capacity. In addition, when deposited lithium is physically collapsed and conduction with the electrode is lost, the lithium also cannot contribute to capacity. Therefore, the gas is preferably released before the potential of the electrode reaches the potential of lithium because of a voltage drop.

After the release of the gas, the charging state may be maintained at a temperature higher than room temperature, preferably higher than or equal to 30° C. and lower than or equal to 60° C., more preferably higher than or equal to 35° C. and lower than or equal to 60° C. for, for example, 1 hour or more and 100 hours or less. In the initial charge, an electrolytic solution decomposed on the surface forms a coating film. The formed coating film may thus be densified when the charging state is held at a temperature higher than room temperature after the release of the gas, for example.

Here, in the case where the thin storage battery is bent, it is preferably bent after the release of the gas. By bending the thin storage battery after the release of the gas, for example, lithium deposition in a region to which stress is applied due to the bending or the like can be prevented.

[Coin-Type Storage Battery]

Figure 18A:
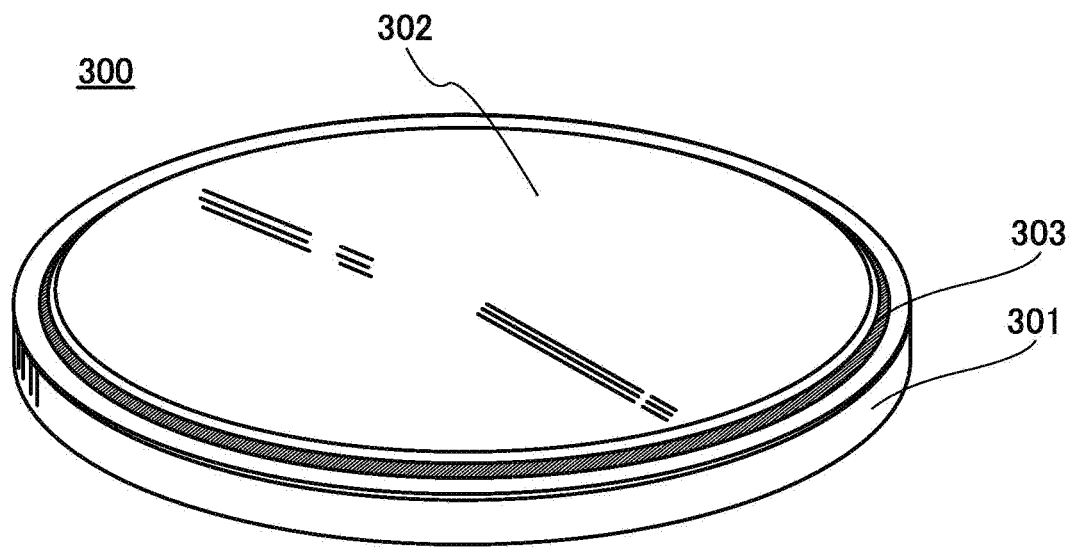
FIGS. 18A and 18B illustrate a coin-type storage battery.
Figure 18B:
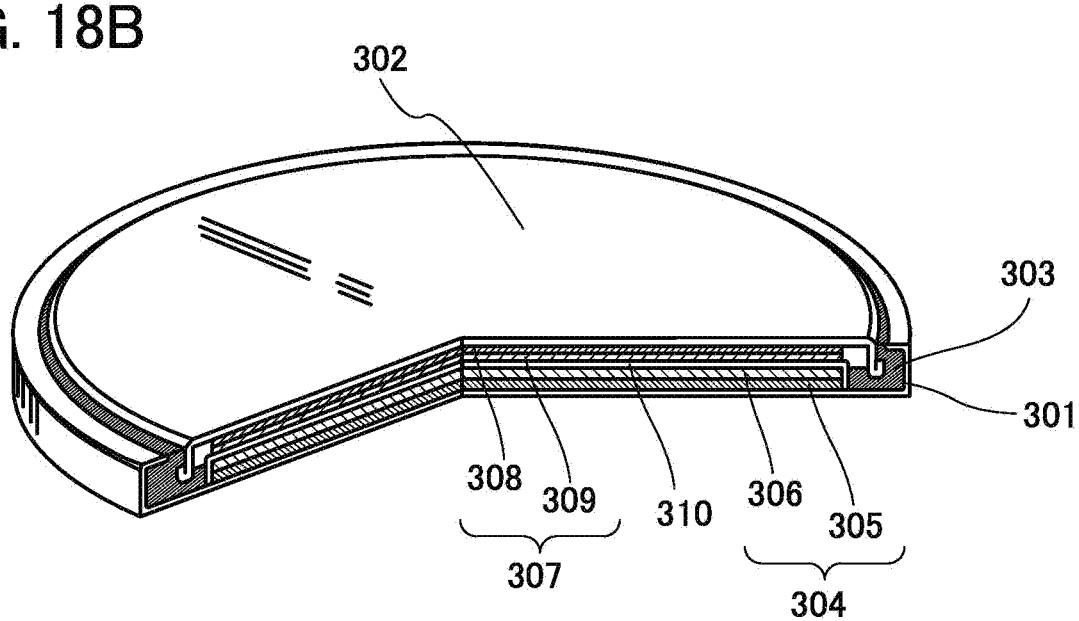

Next, an example of a coin-type storage battery will be described as an example of a power storage device with reference to FIGS. 18A and 18B. FIG. 18A is an external view of a coin-type (single-layer flat type) storage battery, and FIG. 18B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A negative electrode 307 includes a negative electrode current collector 308 and a negative electrode active material layer 309 provided in contact with the negative electrode current collector 308. The negative electrode active material layer 309 includes the negative electrode active material described in Embodiment 1. For the negative electrode 307, the negative electrode described in Embodiment 2 is preferably used.

A positive electrode 304 includes a positive electrode current collector 305 and a positive electrode active material layer 306 provided in contact with the positive electrode current collector 305. The description of the positive electrode active material layer 202 can be referred to for the positive electrode active material layer 306. The description of the separator 207 can be referred to for a separator 310. The description of the electrolytic solution 208 can be referred to for an electrolytic solution.

Note that only one surface of each of the positive electrode 304 and the negative electrode 307 used for the coin-type storage battery 300 is provided with an active material layer.

For the positive electrode can 301 and the negative electrode can 302, a metal having a corrosion-resistant property to an electrolytic solution, such as nickel, aluminum, or titanium, an alloy of such metals, and an alloy of such a metal and another metal (e.g., stainless steel) can be used. Alternatively, the positive electrode can 301 and the negative electrode can 302 are preferably covered with nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 18B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

This embodiment can be implemented in appropriate combination with any of the other embodiments.

Embodiment 5

In this embodiment, a deposition method and a deposition apparatus which can be used for manufacture of a display device of one embodiment of the present invention will be described.

<<CVD and ALD>>

In a conventional deposition apparatus utilizing a CVD method, one or a plurality of source material gases (precursors) for reaction are supplied to a chamber at the same time at the time of deposition. In a deposition apparatus utilizing an ALD method, precursors for reaction are sequentially introduced into a chamber, and then the sequence of the gas introduction is repeated. For example, two or more kinds of precursors are sequentially supplied to the chamber by switching respective switching valves (also referred to as high-speed valves). For example, a first precursor is introduced, an inert gas (e.g., argon or nitrogen) or the like is introduced after the introduction of the first precursor so that the plural kinds of precursors are not mixed, and then a second precursor is introduced. Alternatively, the first precursor may be exhausted by vacuum evacuation instead of the introduction of the inert gas, and then the second precursor can be introduced.

FIGS. 27A to 27D illustrate a deposition process by an ALD method. First precursors 601 are adsorbed onto a substrate surface (see FIG. 27A), whereby a first monolayer is formed (see FIG. 27B). At this time, metal atoms and the like included in the precursors can be bonded to hydroxyl groups that exist at the substrate surface. The metal atoms may be bonded to alkyl groups such as methyl groups or ethyl groups. The first monolayer reacts with second precursors 602 introduced after the first precursors 601 are evacuated (see FIG. 27C), whereby a second monolayer is stacked over the first monolayer. Thus, a thin film is formed (see FIG. 27D). For example, in the case where an oxidizer is included in the second precursors, the oxidizer chemically reacts with metal atoms included in the first precursors or an alkyl group bonded to metal atoms, whereby an oxide film can be formed.

An ALD method is a deposition method based on a surface chemical reaction, by which precursors are adsorbed onto a surface and adsorbing is stopped by a self-terminating mechanism, whereby a layer is formed. For example, precursors such as trimethylaluminum react with hydroxyl groups (OH groups) that exist at the surface. At this time, only a surface reaction due to heating occurs; therefore, the precursors come into contact with the surface and metal atoms or the like in the precursors can be adsorbed onto the surface by thermal energy. The precursors have characteristics of, for example, having a high vapor pressure, being thermally stable and not decomposed before being deposited, and being chemically adsorbed onto a substrate at a high speed. Since the precursors are introduced in a state of a gas, when the first precursors and the second precursors, which are alternately introduced, have enough time to be diffused, a film can be formed with good coverage even onto a region having unevenness with a high aspect ratio.

In an ALD method, the sequence of the gas introduction is repeated a plurality of times until a desired thickness is obtained, whereby a thin film with excellent step coverage can be formed. The thickness of the thin film can be adjusted by the number of repetition times of the sequence of the gas introduction; therefore, an ALD method makes it possible to accurately adjust a thickness. The deposition rate can be increased and the impurity concentration in the film can be reduced by improving the evacuation capability.

ALD methods include an ALD method using heating (thermal ALD method) and an ALD method using plasma (plasma ALD method). In the thermal ALD method, precursors react using thermal energy, and in the plasma ALD method, precursors react in a state of a radical.

By an ALD method, an extremely thin film can be formed with high accuracy. In addition, the coverage of an uneven surface with the film and the film density of the film are high.

Furthermore, plasma damage is not caused by the thermal ALD method. Therefore, generation of defects in a film can be inhibited.

<<Plasma ALD>>

Alternatively, when the plasma ALD method is employed, the film can be formed at a lower temperature than when the thermal ALD method is employed. With the plasma ALD method, for example, the film can be formed without decreasing the deposition rate even at 100° C. or lower. Moreover, in the plasma ALD method, nitrogen radicals can be formed by plasma; thus, a nitride film as well as an oxide film can be formed.

In addition, oxidizability of an oxidizer can be enhanced by the plasma ALD method. Thus, precursors remaining in a plasma ALD film or organic components released from precursors can be reduced. In addition, carbon, chlorine, hydrogen, and the like in the film can be reduced. Therefore, a film with low impurity concentration can be formed.

Furthermore, in the case where a light-emitting element (such as an organic EL element) is used as a display element, when a process temperature is high, the deterioration of the light-emitting element may be accelerated. Here, with the plasma ALD method, the process temperature can be lowered; thus, the deterioration of the light-emitting element can be inhibited.

In the case of using the plasma ALD, inductively coupled plasma (ICP) is used to generate radical species. Accordingly, plasma can be generated at a place apart from the substrate, so that plasma damage to the substrate or a film over the surface of which a plasma ALD film is formed can be inhibited.

As described above, with the plasma ALD method, the process temperature can be lowered and the coverage of the surface can be increased as compared with other deposition methods, and a plasma ALD film can be formed on the side surface portion of the substrate after the display panel is fabricated. Thus, entry of water from the outside can be inhibited. Therefore, the reliability of driver operation of a peripheral circuit at a panel end portion is improved (the transistor characteristics are improved), so that a stable operation can be achieved even in the case of employing a narrow frame.

Next, an example of a deposition apparatus ALD will be described with reference to FIG. 28 as a deposition apparatus which can be used for manufacture of a display device of one embodiment of the present invention.

[Structural Example of Deposition Apparatus ALD]

Figure 28:
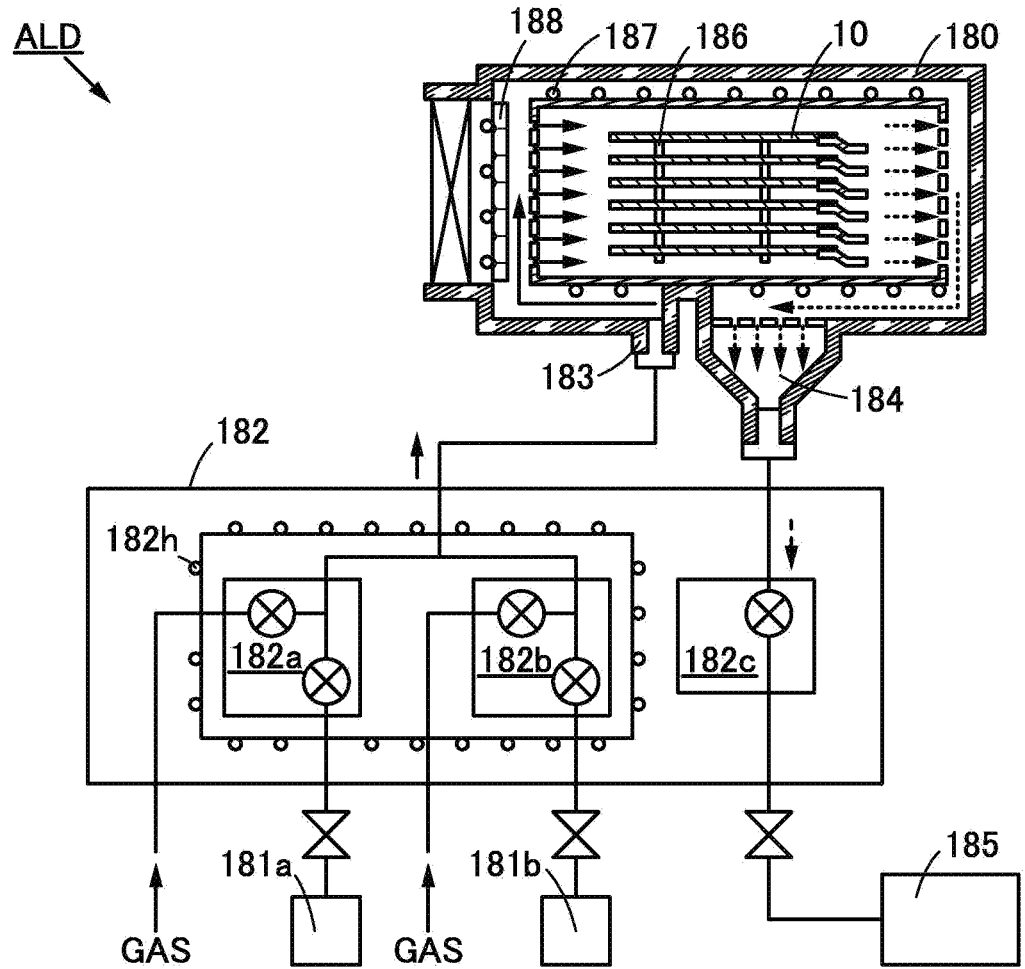
FIG. 28 illustrates a structure of a deposition apparatus according to one embodiment.

FIG. 28 is a cross-sectional view of a deposition apparatus ALD which can be used for manufacture of a display module of one embodiment of the present invention. The deposition apparatus ALD described in this embodiment includes a deposition chamber 180 and a control portion 182 connected to the deposition chamber 180.

The control portion 182 includes a control unit (not illustrated) which supplies control signals and flow rate controllers 182*a*, 182*b*, and 182*c* to which the control signals are supplied. For example, high-speed valves can be used as the flow rate controllers. Specifically, flow rates can be precisely controlled by using ALD valves or the like. The control portion 182 also includes a heating mechanism 182*h* which controls the temperatures of the flow rate controllers and pipes.

The flow rate controller 182*a* is supplied with a control signal, a first source material, and an inert gas and has a function of supplying the first source material or the inert gas in accordance with the control signal.

The flow rate controller 182*b* is supplied with a control signal, a second source material, and an inert gas and has a function of supplying the second source material or the inert gas in accordance with the control signal.

The flow rate controller 182*c* is supplied with a control signal and has a function of connecting to an evacuation unit 185 in accordance with the control signal.

<<Source Material Supply Portion>>

A source material supply portion 181a has a function of supplying the first source material and is connected to the flow rate controller 182a.

A source material supply portion 181b has a function of supplying the second source material and is connected to the flow rate controller 182b.

A vaporizer, a heating unit, or the like can be used as each of the source material supply portions. Thus, a gaseous source material can be generated from a solid or liquid source material.

Note that the number of source material supply portions is not limited to two and may be three or more.

<<Source Material>>

Any of a variety of substances can be used as the first source material.

For example, a volatile organometallic compound, a volatile metal alkoxide, or the like can be used as the first source material.

Any of a variety of substances which react with the first source material can be used as the second source material. For example, a substance which contributes to an oxidation reaction, a substance which contributes to a reduction reaction, a substance which contributes to an addition reaction, a substance which contributes to a decomposition reaction, a substance which contributes to a hydrolysis reaction, or the like can be used as the second source material.

Furthermore, a radical or the like can be used. For example, plasma obtained by supplying a source material to a plasma source or the like can be used. Specifically, an oxygen radical, a nitrogen radical, or the like can be used.

A high-frequency power source or a light source can be used as the plasma source. For example, an inductively coupled or capacitively coupled high-frequency power source can be used. Alternatively, an excimer laser, an excimer lamp, a low-pressure mercury lamp, or a synchrotron radiation source can be used as the light source. The second source material is preferably a source material which reacts with the first source material at a temperature close to room temperature. For example, a source material which reacts at a temperature higher than or equal to room temperature and lower than or equal to 200° C., preferably higher than or equal to 50° C. and lower than or equal to 150° C., is preferable.

<<Evacuation Unit 185>>

The evacuation unit 185 has an evacuating function and is connected to the flow rate controller 182c. Note that a trap for capturing the source material to be evacuated may be provided between an outlet port 184 and the flow rate controller 182c. A dry pump, a turbo pump, and/or the like can be used as the evacuation unit 185. The time required for evacuation can be shortened by using a turbo pump. The evacuated gas or the like is removed by using a removal unit.

<<Control Portion 182>>

The control unit supplies the control signals for controlling the flow rate controllers, a control signal for controlling the heating mechanism, or the like. For example, in a first step, the first source material is supplied to a surface of a process base. Then, in a second step, the second source material which reacts with the first source material is supplied. Accordingly, a reaction product of the first source material and the second source material can be deposited onto a surface of a process member 10.

Note that the amount of the reaction product to be deposited onto the surface of the process member 10 can be controlled by a repetition of the first step and the second step.

Note that the amount of the first source material to be supplied to the process member 10 is limited by the maximum possible amount of adsorption on the surface of the process member 10. For example, conditions are selected so that a monomolecular layer of the first source material is formed on the surface of the process member 10, and the formed monomolecular layer of the first source material is reacted with the second source material, whereby a significantly uniform layer containing the reaction product of the first source material and the second source material can be formed.

Accordingly, a variety of materials can be deposited on a surface of the process member 10 even when the surface has a complicated structure. For example, a film having a thickness greater than or equal to 3 nm and less than or equal to 200 nm can be formed on the process member 10.

In the case where, for example, a small hole called a pinhole or the like is formed in the surface of the process member 10, the pinhole can be filled by depositing a material into the pinhole.

The remainder of the first source material or the second source material is evacuated from the deposition chamber 180 with use of the evacuation unit 185. For example, the evacuation may be performed while an inert gas such as argon or nitrogen is introduced.

<<Deposition Chamber 180>>

The deposition chamber 180 includes an inlet port 183 from which the first source material, the second source material, and the inert gas are supplied and the outlet port 184 from which the first source material, the second source material, and the inert gas are evacuated.

The deposition chamber 180 includes a support portion 186 which has a function of supporting one or a plurality of process members 10, a heating mechanism 187 which has a function of heating the one or plurality of process members, and a door 188 which has a function of opening or closing to load and unload the one or plurality of process members 10.

For example, a resistive heater, an infrared lamp, or the like can be used as the heating mechanism 187.

The heating mechanism 187 has a function of heating up, for example, to 80° C. or higher, 100° C. or higher, or 150° C. or higher.

The heating mechanism 187 heats the one or plurality of process members 10 to a temperature higher than or equal to room temperature and lower than or equal to 200° C., preferably higher than or equal to 50° C. and lower than or equal to 150° C.

The deposition chamber 180 also includes a pressure regulator and a pressure detector.

<<Support Portion 186>>

The support portion 186 supports the one or plurality of process members 10. Accordingly, an insulating film, for example, can be formed over the one or plurality of process members 10 in each treatment.

<Example of Film>

Films which can be formed using the deposition apparatus ALD described in this embodiment will be described.

For example, a film containing an oxide, a nitride, a fluoride, a sulfide, a ternary compound, a metal, or a polymer can be formed.

For example, a material containing aluminum oxide, hafnium oxide, aluminum silicate, hafnium silicate, lanthanum oxide, silicon oxide, strontium titanate, tantalum oxide, titanium oxide, zinc oxide, niobium oxide, zirconium oxide, tin oxide, yttrium oxide, cerium oxide, scandium oxide, erbium oxide, vanadium oxide, indium oxide, or the like can be deposited.

For example, a material containing aluminum nitride, hafnium nitride, silicon nitride, tantalum nitride, titanium nitride, niobium nitride, molybdenum nitride, zirconium nitride, gallium nitride, or the like can be deposited.

For example, a material containing copper, platinum, ruthenium, tungsten, iridium, palladium, iron, cobalt, nickel, or the like can be deposited.

For example, a material containing zinc sulfide, strontium sulfide, calcium sulfide, lead sulfide, calcium fluoride, strontium fluoride, zinc fluoride, or the like can be deposited.

For example, a material that includes a nitride containing titanium and aluminum, an oxide containing titanium and aluminum, an oxide containing aluminum and zinc, a sulfide containing manganese and zinc, a sulfide containing cerium and strontium, an oxide containing erbium and aluminum, an oxide containing yttrium and zirconium, or the like can be deposited.

<<Film Containing Aluminum Oxide>>

For example, a gas obtained by vaporizing a source material containing an aluminum precursor compound can be used as the first source material. Specifically, trimethylaluminum (TMA, or $Al(CH_3)_3$ (chemical formula)), tris(dimethylamide)aluminum, triisobutylaluminum, and aluminum tris(2,2,6,6-tetramethyl-3,5-heptanedionate), or the like can be used.

Water vapor ($H_2O$ (chemical formula)) can be used as the second source material.

With the use of the deposition apparatus ALD, a film containing aluminum oxide can be formed from the first source material and the second source material.

<<Film Containing Hafnium Oxide>>

For example, a gas obtained by vaporizing a source material containing a hafnium precursor compound can be used as the first source material. Specifically, a source material containing hafnium amide such as tetrakis(dimethylamide)hafnium (TDMAH, or $Hf[N(CH_3)_2]_4$ (chemical formula)) or tetrakis(ethylmethylamide)hafnium can be used.

Ozone can be used as the second source material.

<<Film Containing Tungsten>>

For example, a $WF_6$ gas can be used as the first source material.

A $B_2H_6$ gas, a $SiH_4$ gas, or the like can be used as the second source material.

This embodiment can be implemented in appropriate combination with any of the other embodiments.

Embodiment 6

In this embodiment, a structure of an oxide semiconductor film is described.

An oxide semiconductor film is classified into a non-single-crystal oxide semiconductor film and a single crystal oxide semiconductor film. Alternatively, an oxide semiconductor is classified into, for example, a crystalline oxide semiconductor and an amorphous oxide semiconductor.

Examples of a non-single-crystal oxide semiconductor include a c-axis aligned crystalline oxide semiconductor (CAAC-OS), a polycrystalline oxide semiconductor, a microcrystalline oxide semiconductor, and an amorphous oxide semiconductor. In addition, examples of a crystalline oxide semiconductor include a single crystal oxide semiconductor, a CAAC-OS, a polycrystalline oxide semiconductor, and a microcrystalline oxide semiconductor.

First, a CAAC-OS film will be described.

The CAAC-OS film is one of oxide semiconductor films having a plurality of c-axis aligned crystal parts.

In a combined analysis image (also referred to as a high-resolution TEM image) of a bright-field image and a diffraction pattern of a CAAC-OS film, which is obtained using a transmission electron microscope (TEM), a plurality of crystal parts can be observed. However, in the high-resolution TEM image, a boundary between crystal parts, that is, a grain boundary is not clearly observed. Thus, in the CAAC-OS film, a reduction in electron mobility due to the grain boundary is less likely to occur.

According to the high-resolution cross-sectional TEM image of the CAAC-OS film observed in a direction substantially parallel to a sample surface, metal atoms are arranged in a layered manner in the crystal parts. Each metal atom layer has a morphology reflecting unevenness of a surface where the CAAC-OS film is formed (hereinafter, a surface where the CAAC-OS film is formed is also referred to as a formation surface) or a top surface of the CAAC-OS film, and is arranged parallel to the formation surface or the top surface of the CAAC-OS film.

On the other hand, according to the high-resolution plan-view TEM image of the CAAC-OS film observed in a direction substantially perpendicular to the sample surface, metal atoms are arranged in a triangular or hexagonal configuration in the crystal parts. However, there is no regularity of arrangement of metal atoms between different crystal parts.

A CAAC-OS film is subjected to structural analysis with an X-ray diffraction (XRD) apparatus. For example, when the CAAC-OS film including an $InGaZnO_4$ crystal is analyzed by an out-of-plane method, a peak appears frequently when the diffraction angle (2θ) is around 31°. This peak is assigned to the (009) plane of the $InGaZnO_4$ crystal, which indicates that crystals in the CAAC-OS film have c-axis alignment, and that the c-axes are aligned in a direction substantially perpendicular to the formation surface or the top surface of the CAAC-OS film.

Note that when the CAAC-OS film with an $InGaZnO_4$ crystal is analyzed by an out-of-plane method, a peak may also be observed when 2θ is around 36°, in addition to the peak at 2θ of around 31°. The peak at 2θ of around 36° indicates that a crystal having no c-axis alignment is included in part of the CAAC-OS film. It is preferable that in the CAAC-OS film, a peak appear when 2θ is around 31° and that a peak not appear when 2θ is around 36°.

The CAAC-OS film is an oxide semiconductor film having low impurity concentration. The impurity is an element other than the main components of the oxide semiconductor film, such as hydrogen, carbon, silicon, or a transition metal element. In particular, an element that has higher bonding strength to oxygen than a metal element included in the oxide semiconductor film, such as silicon, disturbs the atomic arrangement of the oxide semiconductor film by depriving the oxide semiconductor film of oxygen and causes a decrease in crystallinity. Further, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. In some cases, oxygen vacancies in the oxide semiconductor film serve as carrier traps or serve as carrier generation sources when hydrogen is captured therein.

The state in which impurity concentration is low and density of defect states is low (the number of oxygen vacancies is small) is referred to as a highly purified intrinsic or substantially highly purified intrinsic state. A highly purified intrinsic or substantially highly purified intrinsic oxide semiconductor film has few carrier generation sources, and thus can have a low carrier density. Therefore, a transistor including the oxide semiconductor film rarely has negative threshold voltage (is rarely normally on). The highly purified intrinsic or substantially highly purified intrinsic oxide semiconductor film has few carrier traps. Accordingly, the transistor including the oxide semiconductor film has little variation in electrical characteristics and high reliability. Electric charge trapped by the carrier traps in the oxide semiconductor film takes a long time to be released and might behave like fixed electric charge. Thus, the transistor including the oxide semiconductor film having high impurity concentration and a high density of defect states has unstable electrical characteristics in some cases.

The characteristics of an oxide semiconductor having impurities or defects might be changed by light, heat, or the like. Impurities contained in the oxide semiconductor might serve as carrier traps or carrier generation sources, for example. Furthermore, oxygen vacancies in the oxide semiconductor serve as carrier traps or serve as carrier generation sources when hydrogen is captured therein.

The CAAC-OS having small amounts of impurities and oxygen vacancies is an oxide semiconductor with low carrier density. Specifically, an oxide semiconductor with a carrier density of lower than $8 \times 10^{11}/cm^3$, preferably lower than $1 \times 10^{11}/cm^3$, further preferably lower than $1 \times 10^{10}/cm^3$, and higher than or equal to $1 \times 10^{-9}/cm^3$ can be used. Such an oxide semiconductor is referred to as a highly purified intrinsic or substantially highly purified intrinsic oxide semiconductor. A CAAC-OS has a low impurity concentration and a low density of defect states. Thus, the CAAC-OS can be referred to as an oxide semiconductor having stable characteristics.

With the use of the CAAC-OS film in a transistor, variation in the electrical characteristics of the transistor due to irradiation with visible light or ultraviolet light is small.

Next, a microcrystalline oxide semiconductor film will be described.

A microcrystalline oxide semiconductor film has a region in which a crystal part is observed and a region in which a crystal part is not clearly observed in a high-resolution TEM image. In most cases, the size of a crystal part included in the microcrystalline oxide semiconductor film is greater than or equal to 1 nm and less than or equal to 100 nm, or greater than or equal to 1 nm and less than or equal to 10 nm. A microcrystal with a size greater than or equal to 1 nm and less than or equal to 10 nm, or a size greater than or equal to 1 nm and less than or equal to 3 nm, is specifically referred to as nanocrystal (nc). An oxide semiconductor film including nanocrystal is referred to as an nc-OS (nanocrystalline oxide semiconductor) film. In a high-resolution TEM image of the nc-OS film, for example, a grain boundary is not clearly observed in some cases.

In the nc-OS film, a microscopic region (for example, a region with a size greater than or equal to 1 nm and less than or equal to 10 nm, in particular, a region with a size greater than or equal to 1 nm and less than or equal to 3 nm) has a periodic atomic arrangement. There is no regularity of crystal orientation between different crystal parts in the nc-OS film. Thus, the orientation of the whole film is not observed. Accordingly, in some cases, the nc-OS film cannot be distinguished from an amorphous oxide semiconductor film depending on an analysis method. For example, when the nc-OS film is subjected to structural analysis by an out-of-plane method with an XRD apparatus using an X-ray having a diameter larger than the size of a crystal part, a peak indicating a crystal plane does not appear. Further, a halo pattern is shown in a selected-area electron diffraction pattern of the nc-OS film obtained by using an electron beam having a probe diameter (e.g., 50 nm or larger) larger than the size of a crystal part. Meanwhile, spots are shown in a nanobeam electron diffraction pattern of the nc-OS film obtained by using an electron beam having a probe diameter close to or smaller than the size of a crystal part. Furthermore, in a nanobeam electron diffraction pattern of the nc-OS film, regions with high luminance in a circular (ring) pattern are shown in some cases. Moreover, in a nanobeam electron diffraction pattern of the nc-OS film, a plurality of spots are shown in a ring-like region in some cases.

The nc-OS film is an oxide semiconductor film that has high regularity as compared with an amorphous oxide semiconductor film. Therefore, the nc-OS film has a lower density of defect states than an amorphous oxide semiconductor film. Note that there is no regularity of crystal orientation between different crystal parts in the nc-OS film. Therefore, the nc-OS film has a higher density of defect states than the CAAC-OS film.

Next, an amorphous oxide semiconductor film will be described.

The amorphous oxide semiconductor film has disordered atomic arrangement and no crystal part. For example, the amorphous oxide semiconductor film does not have a specific state as in quartz.

In a high-resolution TEM image of the amorphous oxide semiconductor film, crystal parts cannot be found.

When the amorphous oxide semiconductor film is subjected to structural analysis by an out-of-plane method with an XRD apparatus, a peak which shows a crystal plane does not appear. A halo pattern is observed when the amorphous oxide semiconductor film is subjected to electron diffraction. Furthermore, a spot is not observed and a halo pattern appears when the amorphous oxide semiconductor film is subjected to nanobeam electron diffraction.

Note that an oxide semiconductor film may have a structure having physical properties intermediate between the nc-OS film and the amorphous oxide semiconductor film. The oxide semiconductor film having such a structure is specifically referred to as an amorphous-like oxide semiconductor (a-like OS) film.

In a high-resolution TEM image of the a-like OS film, a void may be observed. Furthermore, in the high-resolution TEM image, there are a region where a crystal part is clearly observed and a region where a crystal part is not observed. In some cases, growth of the crystal part occurs due to the crystallization of the a-like OS film, which is induced by a slight amount of electron beam employed in the TEM observation. In contrast, in the nc-OS film that has good quality, crystallization hardly occurs by a slight amount of electron beam used for TEM observation.

Note that the crystal part size in the a-like OS film and the nc-OS film can be measured using high-resolution TEM images. For example, an $InGaZnO_4$ crystal has a layered structure in which two Ga—Zn—O layers are included between In—O layers. A unit cell of the $InGaZnO_4$ crystal has a structure in which nine layers including three In—O layers and six Ga—Zn—O layers are stacked in the c-axis direction. Accordingly, the distance between the adjacent layers is equivalent to the lattice spacing on the (009) plane (also referred to as d value). The value is calculated to be 0.29 nm from crystal structural analysis. Thus, focusing on lattice fringes in the high-resolution TEM image, each of lattice fringes in which the lattice spacing therebetween is greater than or equal to 0.28 nm and less than or equal to 0.30 nm corresponds to the a-b plane of the InGaZnO$_4$ crystal.

Furthermore, the density of an oxide semiconductor film varies depending on the structure in some cases. For example, when the composition of an oxide semiconductor film is determined, the structure of the oxide semiconductor film can be expected by comparing the density of the oxide semiconductor film with the density of a single crystal oxide semiconductor having the same composition as the oxide semiconductor film. For example, the density of the a-like OS film is higher than or equal to 78.6% and lower than 92.3% of the density of the single crystal oxide semiconductor having the same composition. For example, the density of each of the nc-OS film and the CAAC-OS film is higher than or equal to 92.3% and lower than 100% of the density of the single crystal oxide semiconductor having the same composition. Note that it is difficult to deposit an oxide semiconductor film having a density of lower than 78% of the density of the single crystal oxide semiconductor.

Specific examples of the above description are given. For example, in the case of an oxide semiconductor film having an atomic ratio of In:Ga:Zn=1:1:1, the density of single crystal InGaZnO$_4$ with a rhombohedral crystal structure is 6.357 g/cm$^3$. Accordingly, in the case of the oxide semiconductor film having an atomic ratio of In:Ga:Zn=1:1:1, the density of the a-like OS film is higher than or equal to 5.0 g/cm$^3$ and lower than 5.9 g/cm$^3$. For example, in the case of the oxide semiconductor film having an atomic ratio of In:Ga:Zn=1:1:1, the density of each of the nc-OS film and the CAAC-OS film is higher than or equal to 5.9 g/cm$^3$ and lower than 6.3 g/cm$^3$.

Note that there is a possibility that an oxide semiconductor having a certain composition cannot exist in a single crystal structure. In that case, single crystal oxide semiconductors with different compositions are combined at an adequate ratio, which makes it possible to calculate density equivalent to that of a single crystal oxide semiconductor with the desired composition. The density of a single crystal oxide semiconductor having the desired composition can be calculated using a weighted average according to the combination ratio of the single crystal oxide semiconductors with different compositions. Note that it is preferable to use as few kinds of single crystal oxide semiconductors as possible to calculate the density.

Note that an oxide semiconductor film may be a stacked film including two or more films of an amorphous oxide semiconductor film, an a-like OS film, a microcrystalline oxide semiconductor film, and a CAAC-OS film, for example.

This embodiment can be implemented in appropriate combination with any of the other embodiments.

This application is based on Japanese Patent Application serial no. 2014-242053 filed with Japan Patent Office on Nov. 28, 2014, the entire contents of which are hereby incorporated by reference.

What is claimed is:

1. An electronic device comprising:
   a first board;
   a second board facing the first board;
   a display portion between the first board and the second board, the display portion having flexibility; and
   a power storage device between the first board and the second board, the power storage device comprising:
   an exterior body comprising a laminate film; and
   an electrolyte comprising lithium ions,
   wherein the display portion comprises a first surface facing the power storage device,
   wherein the first surface comprises a first region which is not in contact with the power storage device when the electronic device has a first shape and is in contact with the power storage device when the electronic device has a second shape, and
   wherein the first region overlaps with a display region of the display portion.

2. The electronic device according to claim 1, further comprising a space between the display portion and the power storage device.

3. The electronic device according to claim 1, further comprising a shock-absorbing buffer member between the display portion and the power storage device.

4. The electronic device according to claim 1,
   wherein the display portion comprises a first end portion and a second end portion,
   wherein the power storage device comprises a third end portion and a fourth end portion,
   wherein the first end portion and the third end portion are fixed to each other, and
   wherein a distance between the second end portion and the fourth end portion changes when a shape of the electronic device changes.

5. The electronic device according to claim 1, further comprising a circuit board,
   wherein the display portion comprises a first end portion and a second end portion,
   wherein the power storage device comprises a third end portion and a fourth end portion,
   wherein the first end portion and the third end portion are fixed to the circuit board, and
   wherein a distance between the second end portion and the fourth end portion changes when a shape of the electronic device changes.

6. The electronic device according to claim 1, wherein the electronic device is configured to be worn such that the second board is in contact with a user's arm.

7. An electronic device comprising:
   a first board;
   a second board facing the first board;
   a display portion between the first board and the second board, the display portion having flexibility;
   a power storage device between the first board and the second board, the power storage device comprising:
   an exterior body comprising a laminate film; and
   an electrolyte comprising lithium ions; and
   an adhesive layer,
   wherein the display portion is provided on the first board with the adhesive layer provided therebetween,
   wherein the power storage device is in contact with the second board,
   wherein a region of the power storage device is configured to being in contact with the display portion when the electronic device has a first shape, and
   wherein the region of the power storage device is configured to being apart from the display portion when the electronic device has a second shape.

8. The electronic device according to claim 7, further comprising a space between the display portion and the power storage device.

9. The electronic device according to claim 7, further comprising a shock-absorbing buffer member between the display portion and the power storage device.

10. The electronic device according to claim 7,
wherein the display portion comprises a first end portion and a second end portion,
wherein the power storage device comprises a third end portion and a fourth end portion,
wherein the first end portion and the third end portion are fixed to each other, and
wherein a distance between the second end portion and the fourth end portion changes when a shape of the electronic device changes.

11. The electronic device according to claim 7, further comprising a circuit board,
wherein the display portion comprises a first end portion and a second end portion,
wherein the power storage device comprises a third end portion and a fourth end portion,
wherein the first end portion and the third end portion are fixed to the circuit board, and
wherein a distance between the second end portion and the fourth end portion changes when a shape of the electronic device changes.

12. The electronic device according to claim 7, wherein the electronic device is configured to be worn such that the second board is in contact with a user's arm.

* * * * *